United States Patent
Ariki et al.

(10) Patent No.: US 12,441,164 B2
(45) Date of Patent: Oct. 14, 2025

(54) LOW-PROFILE AIR-CONDITIONING REGISTER

(71) Applicant: TOYODA GOSEI CO., LTD., Kiyosu (JP)

(72) Inventors: Daigo Ariki, Kiyosu (JP); Yasuyuki Mitsui, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 334 days.

(21) Appl. No.: 18/123,524

(22) Filed: Mar. 20, 2023

(65) Prior Publication Data
US 2023/0311620 A1 Oct. 5, 2023

(30) Foreign Application Priority Data
Mar. 30, 2022 (JP) .................................. 2022-057054

(51) Int. Cl.
*B60H 1/34* (2006.01)
(52) U.S. Cl.
CPC .................................. *B60H 1/3421* (2013.01)
(58) Field of Classification Search
CPC ..................................................... B60H 1/3421
USPC ....................................................... 454/155
See application file for complete search history.

(56) References Cited

U.S. PATENT DOCUMENTS

| | | | |
|---|---|---|---|
| 10,500,927 B2 * | 12/2019 | Araujo Nieto | B60H 1/3421 |
| 11,554,643 B2 * | 1/2023 | Kim | B60H 1/3421 |
| 11,719,313 B2 * | 8/2023 | Bui | B60H 1/3421 |
| | | | 454/155 |
| 2011/0237176 A1 * | 9/2011 | Shibata | B60H 1/3428 |
| | | | 454/330 |
| 2014/0302769 A1 * | 10/2014 | Sawada | F24F 13/1413 |
| | | | 454/315 |
| 2015/0174989 A1 * | 6/2015 | Oe | F24F 13/14 |
| | | | 454/152 |
| 2024/0227510 A1 * | 7/2024 | Lee | B60H 1/3421 |

FOREIGN PATENT DOCUMENTS

JP 2016-032958 A 3/2016

* cited by examiner

*Primary Examiner* — Avinash A Savani
*Assistant Examiner* — Dana K Tighe
(74) *Attorney, Agent, or Firm* — Posz Law Group, PLC

(57) ABSTRACT

A low-profile air-conditioning register includes a retainer, an upstream fin, and downstream fins. The downstream fins include two facing first downstream fins extending in a longitudinal direction and two facing second downstream fins extending in the longitudinal direction of the first downstream fins on an upstream side of the first downstream fins. The low-profile air-conditioning register includes a downstream transmission mechanism. When one of the first downstream fins is tilted toward a tilt position, the downstream transmission mechanism holds, at a neutral position, an other one of the first downstream fins and one of the second downstream fins located at a diagonal position with respect to the other one of the first downstream fins and tilts, toward the tilt position, one of the second downstream fins located at a diagonal position with respect to the one of the first downstream fins.

16 Claims, 23 Drawing Sheets

LOW-PROFILE AIR-CONDITIONING REGISTER

BACKGROUND

The present disclosure relates to a low-profile air-conditioning register that has a rectangular outlet port and uses fins to, for example, change the direction of air-conditioning air that is delivered from an air conditioner and blown out from the outlet port.

Vehicles have air-conditioning registers that are installed in the instrument panel to, for example, change the direction of air-conditioning air delivered from the air conditioner and blown into the passenger compartment from an outlet port.

The air-conditioning registers include a cross-fin type an air-conditioning register. This type of air-conditioning register includes a retainer with an air passage. The air passage has an outlet port at a downstream end of the retainer in a flow direction of air-conditioning air. Upstream fins and downstream fins are disposed upstream of the outlet port of the air passage (see, for example, Japanese Laid-Open Patent Publication No. 2016-32958).

In the air-conditioning register, the air-conditioning air flowing through the air passage flows along the upstream fins and the downstream fins and is then blown out from the outlet port. When the upstream fins and the downstream fins are tilted, the air-conditioning air flows along the tilted upstream fins and downstream fins. Thus, the blowing direction of the air-conditioning air from the outlet port is changed.

The cross-fin type air-conditioning register includes a low-profile air-conditioning register having a rectangular outlet port. The outlet port of the low-profile air-conditioning register is defined by two facing short side portions and two facing long side portions that are respectively orthogonal to the short side portions. The long side portions are respectively longer than the short side portions.

In the low-profile air-conditioning register, in the same manner as a general non-low-profile air-conditioning register, components disposed in the air passage are resistant to ventilation. The indices of the ventilation resistance include an actual opening area (ventilation effective area). The actual opening area is the area of a portion where the components are not projected on a projection surface of the outlet port of the air passage that is orthogonal to the flow direction. As the actual opening area becomes smaller, the ventilation resistance becomes larger.

In the low-profile air-conditioning register, the outlet port is smaller in the direction along the short side portion than in a general non-low-profile air-conditioning register. Thus, the influence of the downstream fins on the actual opening area of the outlet port (i.e., the degree of reduction in the actual opening area) increases. Accordingly, the ventilation resistance increases. As a result, the pressure loss caused by the downstream fins increases.

SUMMARY

A low-profile air-conditioning register according to a first aspect of the present disclosure includes a retainer including an air passage having an outlet port at a downstream end of the retainer in a flow direction of air-conditioning air and an upstream fin and downstream fins located upstream of the outlet port in the air passage. The downstream fins include two facing first downstream fins extending in a longitudinal direction and two facing second downstream fins extending in the longitudinal direction of the first downstream fins on an upstream side of the first downstream fins. Each of the first downstream fins includes a fin shaft. Each of the second downstream fins includes a fin shaft, a flow direction of the air-conditioning air that has passed through the upstream fin and has not passed through the second downstream fins is defined as an inflow direction. The two first downstream fins and the two second downstream fins are each tiltable about a corresponding one of the fin shafts between a neutral position along the inflow direction and a tilt position tilted with respect to the inflow direction that approaches an inner side of the air passage toward a downstream side. The low-profile air-conditioning register further includes a downstream transmission mechanism. When one of the first downstream fins is tilted toward the tilt position, the downstream transmission mechanism holds, at the neutral position, an other one of the first downstream fins and one of the second downstream fins located at a diagonal position with respect to the other one of the first downstream fins and tilts, toward the tilt position, one of the second downstream fins located at a diagonal position with respect to the one of the first downstream fins.

A low-profile air-conditioning register according to a second aspect of the present disclosure includes a retainer including an air passage having an outlet port at a downstream end of the retainer in a flow direction of air-conditioning air, an upstream fin and downstream fins located upstream of the outlet port in the air passage, and an operation knob operably disposed on the retainer. The outlet port includes two facing long side portions as two facing side portions and two facing short side portions that are respectively orthogonal to the long side portions. The outlet port has a rectangular shape in which a dimension of each of the two long side portions is longer than an interval between the long side portions. The downstream fins include two first downstream fins extending in a direction along the long side portions on an upstream side of the long side portions and facing each other in a direction along the short side portions and two second downstream fins extending in the direction along the long side portions on an upstream side of the first downstream fins and facing each other in the direction along the short side portions. An upstream end of each of the first downstream fins includes a fin shaft. An upstream end of each of the second downstream fins includes a fin shaft. The two first downstream fins and the two second downstream fins are supported on the retainer by the fin shafts of the first downstream fins and the fin shafts of the second downstream fins, respectively. A flow direction of the air-conditioning air that has passed through the upstream fin and has not passed through the second downstream fins is defined as an inflow direction. The two first downstream fins and the two second downstream fins are each tiltable about a corresponding one of the fin shafts between a neutral position along the inflow direction and a tilt position tilted with respect to the inflow direction that approaches an inner side of the air passage toward a downstream side. The low-profile air-conditioning register further includes a downstream transmission mechanism located at a section from the operation knob to the two first downstream fins and the two downstream fins. When one of the first downstream fins is tilted toward the tilt position by an operation performed on the operation knob, the downstream transmission mechanism holds, at the neutral position, an other one of the first downstream fins and one of the second downstream fins located at a diagonal position with respect to the other one of the first downstream fins and tilts, toward the tilt position, one of the second downstream fins located at a diagonal position with respect to the one of the first downstream fins.

BRIEF DESCRIPTION OF DRAWINGS

The features of the present disclosure that are believed to be novel are set forth with particularity in the appended claims. The disclosure, together with objects and advantages thereof, may best be understood by reference to the following description of the presently preferred embodiments together with the accompanying drawings.

DETAILED DESCRIPTION

First Embodiment

A low-profile air-conditioning register for a vehicle according to a first embodiment will now be described with reference to FIGS. 1 to 23.

In the following description, the direction in which the vehicle advances (moves forward) will be referred to as the front, and the reverse direction will be referred to as the rear. The height direction of the vehicle will be referred to as an up-down direction of the vehicle. The width direction (the left-right direction) of the vehicle is defined with reference to the state in which the vehicle is viewed from the rear.

In the passenger compartment, an instrument panel is disposed in front of front seats (a driver seat and a passenger seat) of the vehicle, and low-profile air-conditioning registers are incorporated in a central portion, side portions, and the like of the instrument panel in the left-right direction. In the same manner as a general non-low-profile air-conditioning register, the low-profile air-conditioning register mainly functions to change the direction of air-conditioning air delivered from an air-conditioning device and blown into the passenger compartment.

Figure 1:
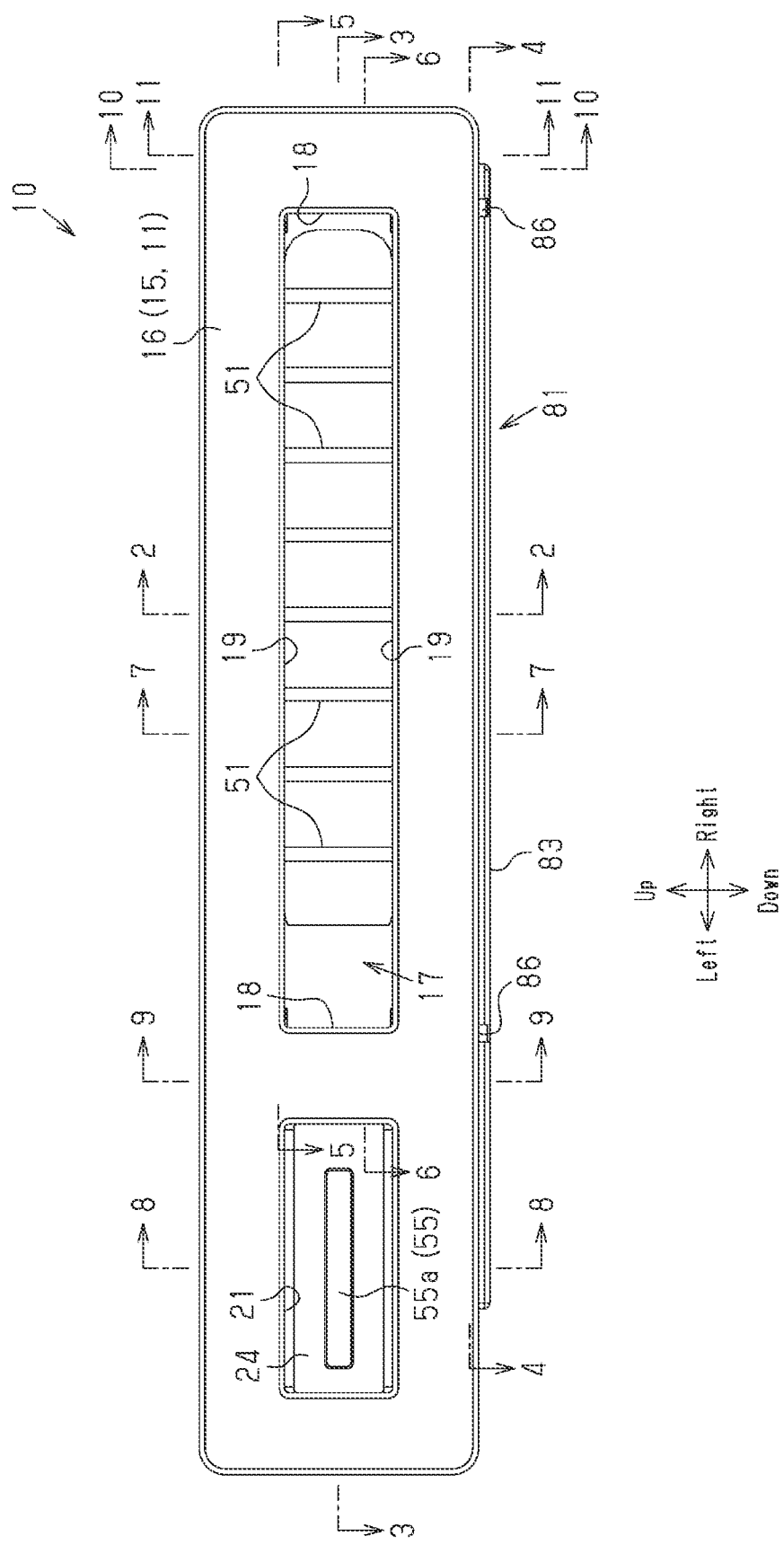
FIG. 1 is a front view of a low-profile air-conditioning register in which all downstream fins are held at a neutral position in a first embodiment.
Figure 2:
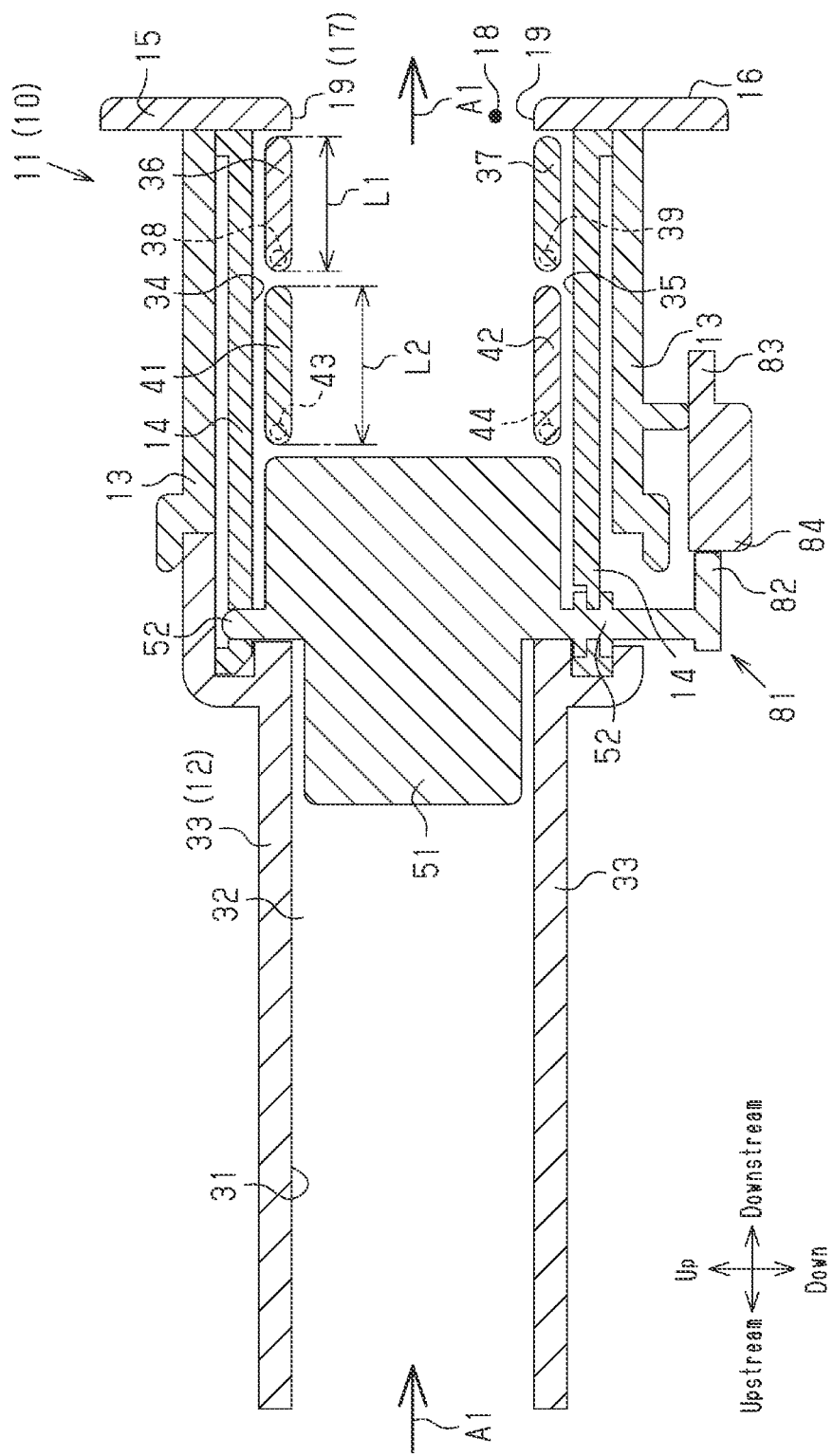
FIG. 2 is a cross-sectional view taken along line 2-2 in FIG. 1.
Figure 3:
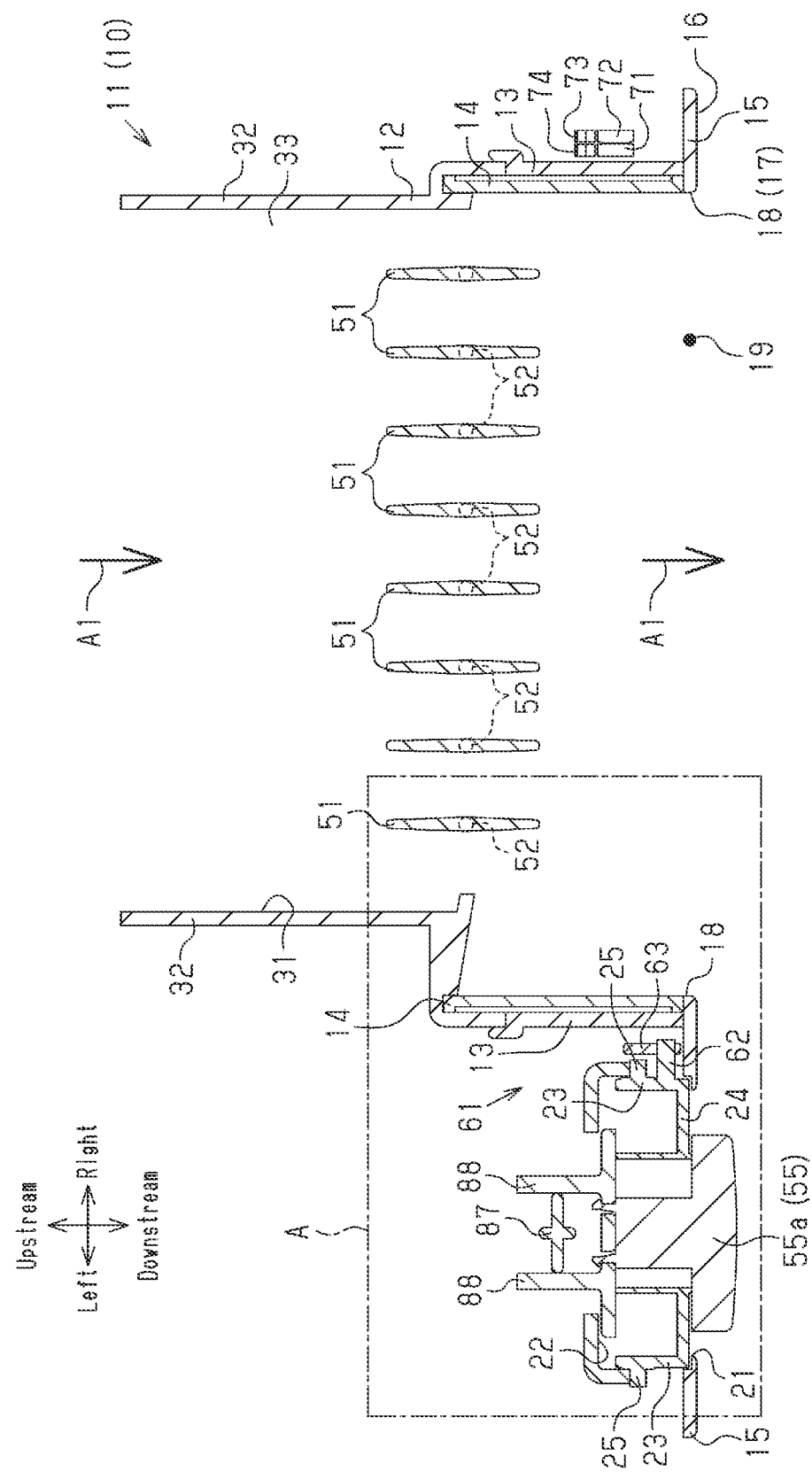
FIG. 3 is a cross-sectional view taken along line 3-3 in FIG. 1.

As shown in FIGS. 1 to 3, a low-profile air-conditioning register 10 includes a retainer 11, four downstream fins, upstream fins 51, an operation knob 55 as an operation portion, a downstream transmission mechanism 61, and an upstream transmission mechanism 81. The configuration of each part included in the low-profile air-conditioning register 10 will now be described.

Retainer 11

Referring to FIGS. 2 and 3, the retainer 11 connects a ventilation duct (not shown) of an air conditioner to an opening (not shown) disposed in the instrument panel, and includes an upstream retainer 12, a downstream outer retainer 13, a downstream inner retainer 14, and a bezel 15. The retainer 11 has a tubular shape having open opposite ends. The interior space of the retainer 10 provides a passage for air-conditioning air A1 (hereinafter referred to as an air passage 31).

With regard to the direction in which the air-conditioning air A1 flows, the side closer to the air conditioner will be referred to as "upstream" or the like, and the side farther from the air conditioner will be referred to as "downstream" or the like. In the description of the positional relationship of the components of the low-profile air-conditioning register 10, the side closer to the air passage 31 in a thickness direction of walls (a vertical wall 32 and a horizontal wall 33) of the retainer 11, which will be described later, is referred to as "inward," "inside," or the like. In the thickness direction, the side farther from the air passage 31 is referred to as "outward," "outside," or the like.

The upstream retainer 12 is a member of an upstream portion of the retainer 11. The upstream retainer 12 has a tubular shape in which its upstream and downstream ends are open and the dimension in the left-right direction is larger than that in the up-down direction.

The downstream outer retainer 13 and the downstream inner retainer 14 are members of a downstream portion of the retainer 11, and are located downstream of the upstream retainer 12. In the same manner as the upstream retainer 12, each of the downstream outer retainer 13 and the downstream inner retainer 14 has a tubular shape in which its upstream and downstream ends are open and the dimension in the left-right direction is larger than that in the up-down direction. The downstream inner retainer 14 is located inside the downstream outer retainer 13.

The bezel 15 is located along a vertical plane on the downstream side of the downstream outer retainer 13 and the downstream inner retainer 14. A downstream end surface of the bezel 15 defines a design surface 16 of the low-profile air-conditioning register 10. An outlet port 17 extends through the bezel 15. As shown in FIG. 1, the outlet port 17 includes two short side portions 18 facing each other in the left-right direction and two long side portions 19 facing each other in the up-down direction, which is orthogonal to the short side portions 18. The long side portions 19 are longer than the short side portions 18. Because of the short side portions 18 and the long side portions 19, the outlet port 17 has a horizontally long rectangular shape that is longer in the left-right direction than in the up-down direction. That is, the outlet port 17 includes the two long side portions 19 as two facing side portions, and has a shape in which the dimension of each long side portion 19 is longer than the interval between the two long side portions 19. In the present embodiment, the up-down direction corresponds to the direction in which the two long side portions 19 face each other, and the left-right direction corresponds to the direction along the long side portions 19.

The bezel 15 includes a window 21 at a portion farther from the outlet port 17 toward one side (leftward in the first embodiment) in the left-right direction. The window 21 extends through that portion in the flow direction. The window 21 has a rectangular shape that is longer in the left-right direction than in the up-down direction.

Figure 8:
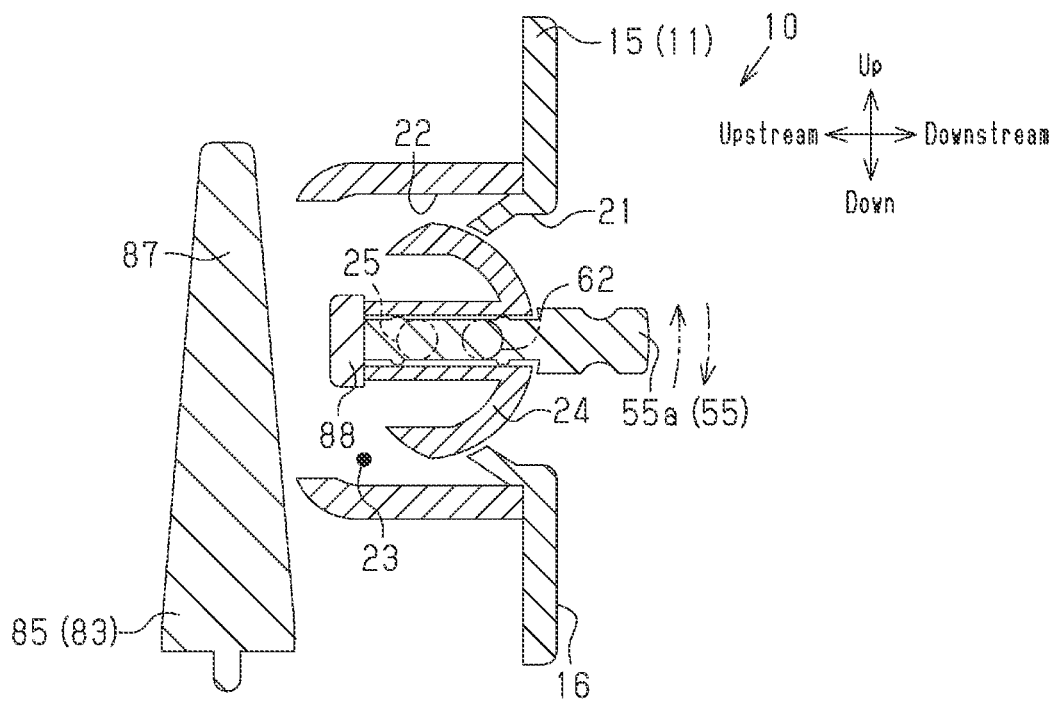
FIG. 8 is a cross-sectional view taken along line 8-8 in FIG. 1.
Figure 12:
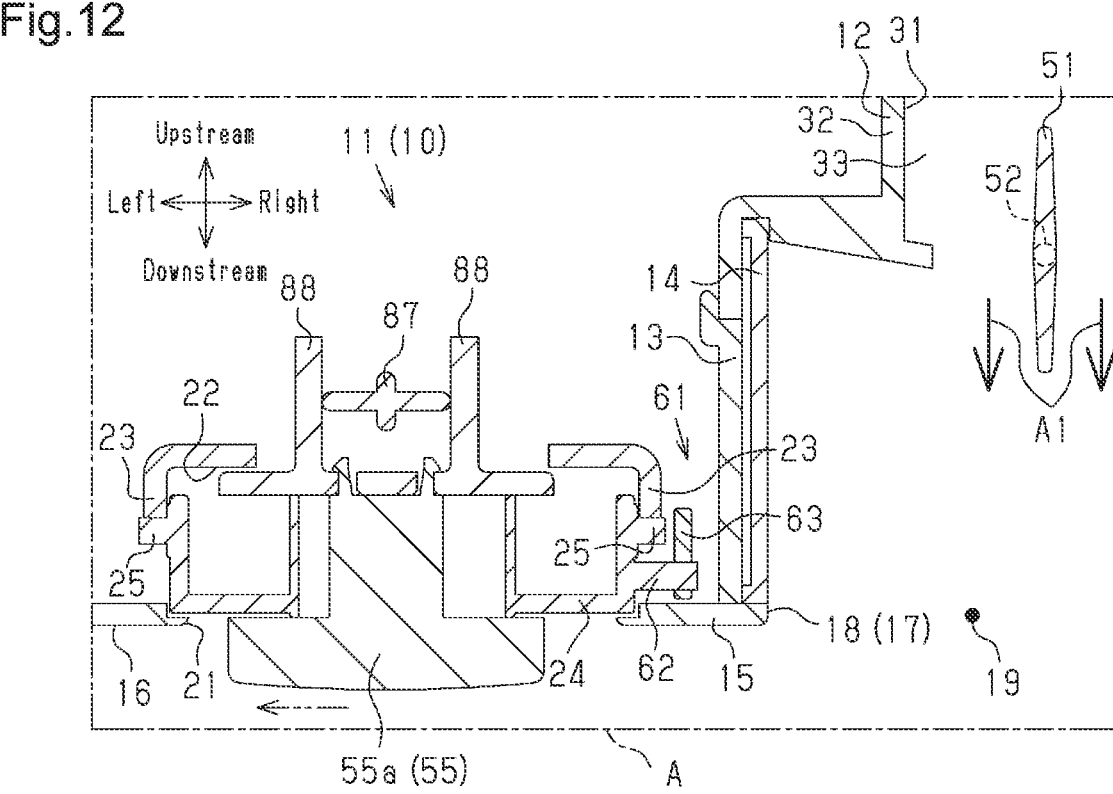
FIG. 12 is an enlarged partial plan cross-sectional view showing portion A of FIG. 3.

As shown in FIGS. 8 and 12, the bezel 15 includes a knob operation chamber 22 at a position adjacent to the window 21 on the upstream side. The knob operation chamber 22 is separated from the downstream outer retainer 13 toward the left side. The knob operation chamber 22 includes two facing side walls 23 that are separated from each other in the left-right direction. A knob mounting member 24 is disposed between the two side walls 23. The knob mounting member 24 includes support shafts 25 protruding toward the opposite sides in the left-right direction. The knob mounting member 24 is supported by the two support shafts 25 to be tiltable in the up-down direction with respect to the two side walls 23, but is restricted from moving in the left-right direction.

As shown in FIGS. 2 and 3, the air passage 31 is surrounded by four walls of the retainer 11. The four walls include two vertical walls 32 that face each other in the left-right direction, and two horizontal walls 33 that face each other in the up-down direction.

Figure 5:
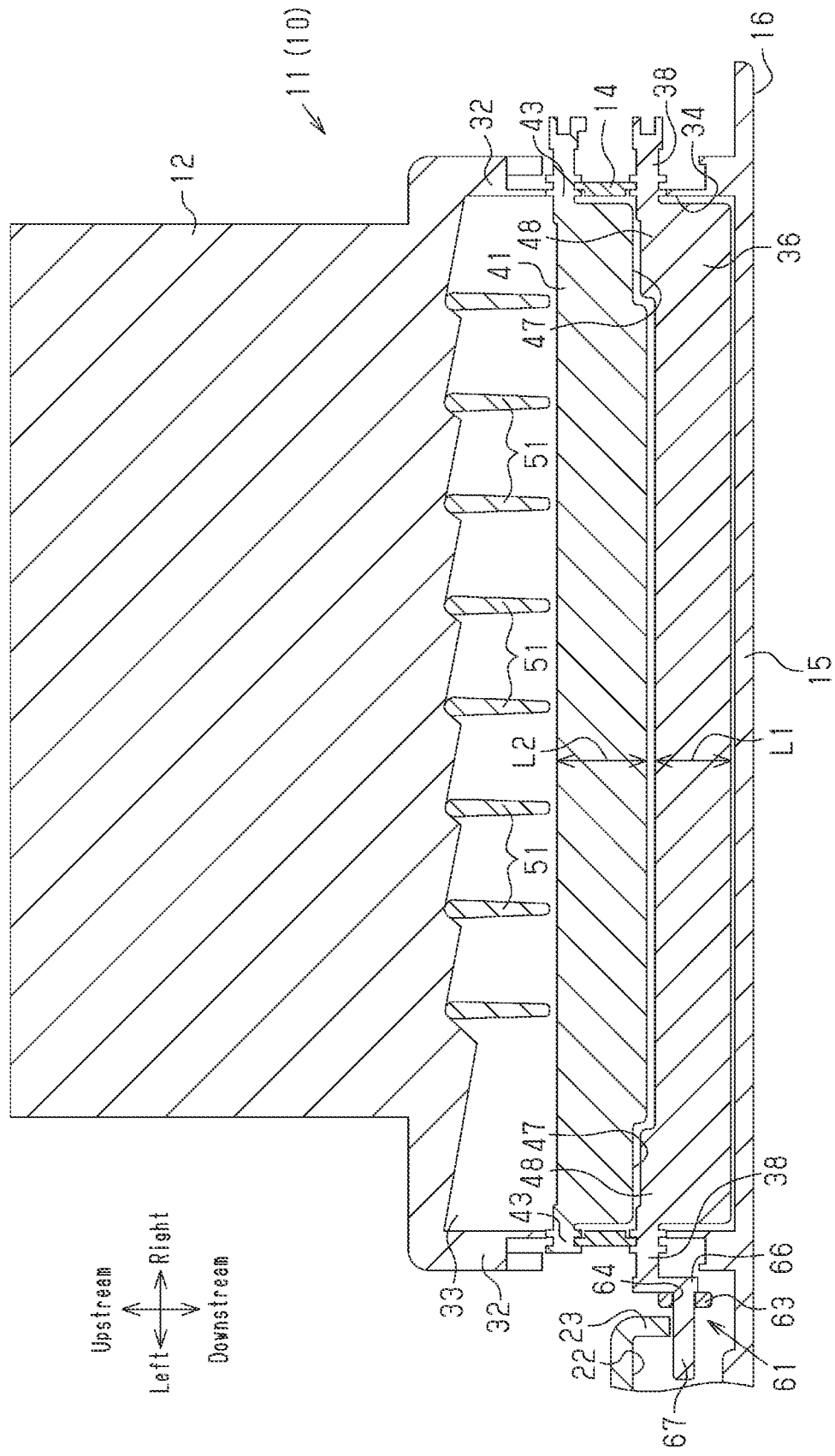
FIG. 5 is a cross-sectional view taken along line 5-5 in FIG. 1.
Figure 6:
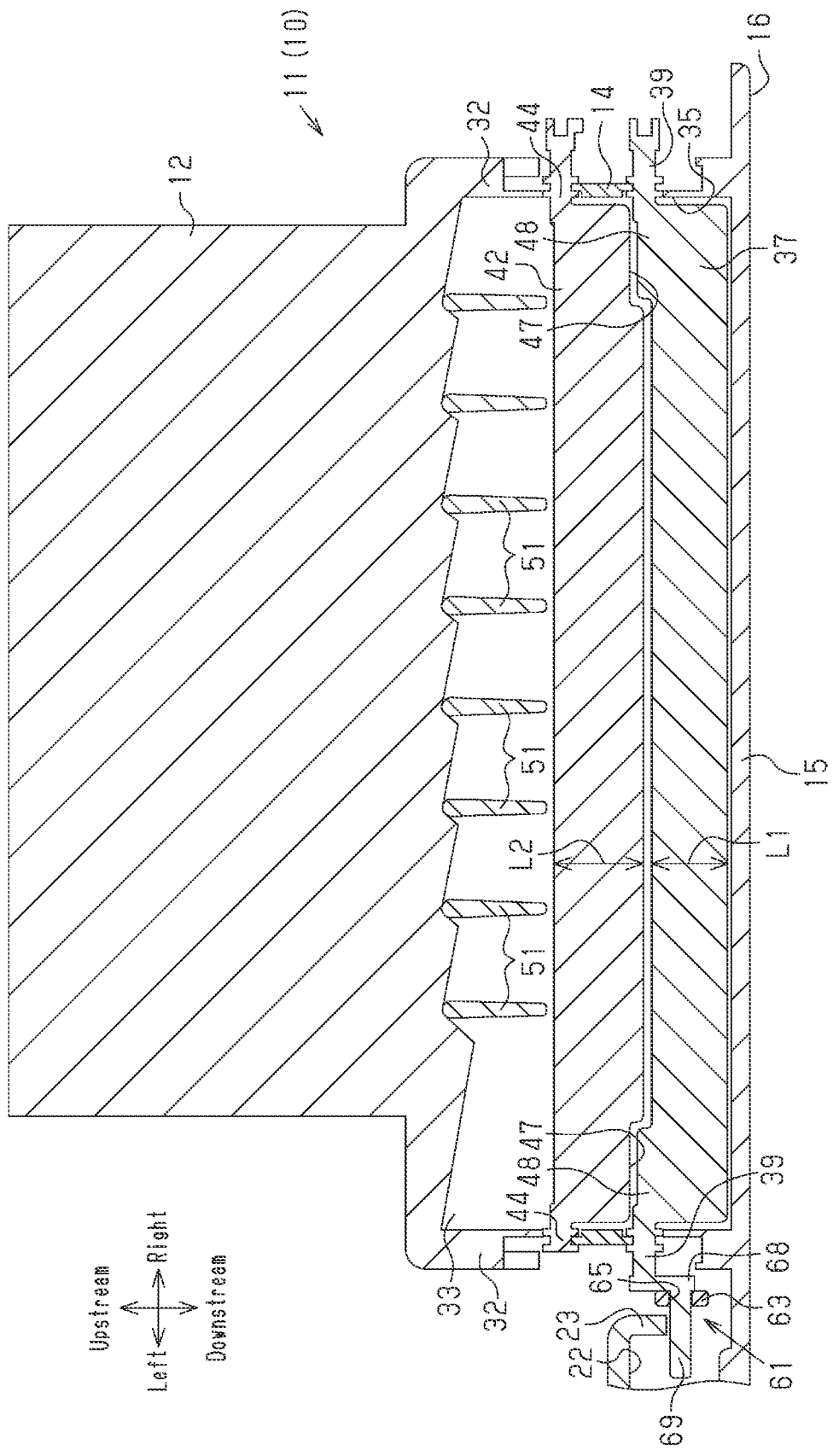
FIG. 6 is a cross-sectional view taken along line 6-6 in FIG. 1.

As shown in FIGS. 2, 5, and 6, fin accommodation chambers 34, 35 are respectively disposed at two positions in the downstream inner retainer 14 outward from the outlet port 17 in the up-down direction.

Downstream Fins

The downstream fins include two first downstream fins 36, 37 and two second downstream fins 41, 42. Each of the first downstream fins 36, 37 and each of the second downstream fins 41, 42 are flat, horizontally elongated plates extending in the left-right direction inside the downstream inner retainer 14. The two first downstream fins 36, 37 have the same shape, and face each other in the up-down direction. The two second downstream fins 41, 42 have the same shape, and face each other in the up-down direction. That is, the up-down direction (the direction in which the two long side portions 19 face each other) also corresponds to the direction in which the first downstream fins 36, 37 face each other, and the left-right direction (the direction along the long side portions 19) also corresponds to the longitudinal direction of the first downstream fins 36, 37. Thus, the second downstream fins 41, 42 extend in the longitudinal direction of the first downstream fins 36, 37. The second downstream fin 41 is adjacent to the first downstream fin 36 on the upstream side, and the second downstream fin 42 is adjacent to the first downstream fin 37 on the upstream side.

Fin shafts 38 that protrude toward the opposite sides in the left-right direction are disposed at the upstream end of the upper first downstream fin 36. Fin shafts 39 that protrude toward the opposite sides in the left-right direction are disposed at the upstream end of the lower first downstream fin 37.

The two fin shafts 38 are supported at positions of upper ends of the two vertical walls 32 that are located above the outlet port 17 and separated from the outlet port 17 toward the upstream side. The two fin shafts 39 are supported at positions of lower ends of the two vertical walls 32 that are located above the outlet port 17 and separated from the outlet port 17 toward the downstream side. The two fin shafts 39 are respectively located below the two fin shafts 38.

Fin shafts 43 that protrude toward the opposite sides in the left-right direction are disposed at the upstream end of the upper second downstream fin 41. Fin shafts 44 that protrude toward the opposite sides in the left-right direction are disposed at the upstream end of the lower second downstream fin 42.

The two fin shafts 43 are supported at upper ends of the two vertical walls 32 at positions separated from the fin shafts 38 toward a further upstream side. The fin shafts 44 are supported at lower ends of the two vertical walls 32 at positions separated from the fin shafts 39 toward a further upstream side. The two fin shafts 44 are respectively located below the two fin shafts 43.

The fin shafts 38 of the first downstream fin 36 and the fin shafts 43 of the second downstream fin 41 are located outward from the upper fin accommodation chamber 34 in the left-right direction. The fin shafts 39 of the first downstream fin 37 and the fin shafts 44 of the second downstream fin 42 are located outward from the lower fin accommodation chamber 35 in the left-right direction.

Figure 16:
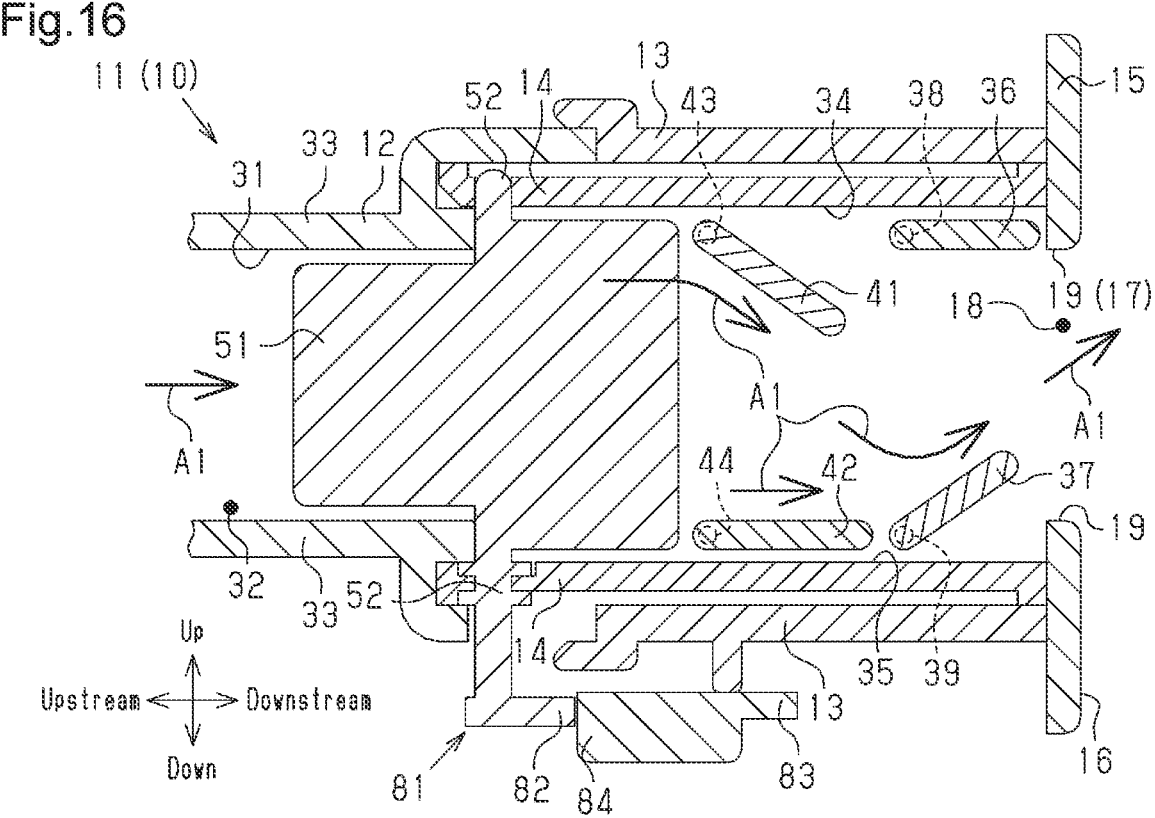
FIG. 16 is a partial side cross-sectional view showing a state in which the lower first downstream fin is tilted from the state of FIG. 2 to become higher toward the downstream side in response to an operation performed on the operation knob.
Figure 20:
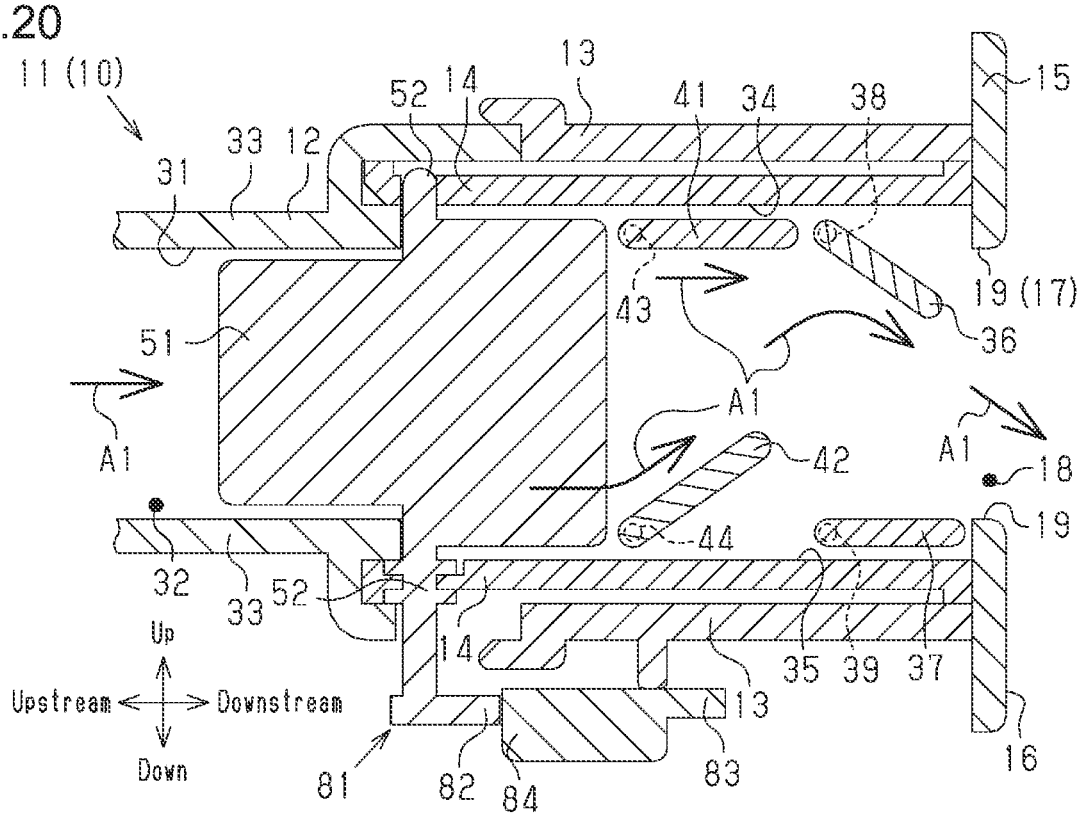
FIG. 20 is a partial side cross-sectional view showing a state in which the upper first downstream fin is tilted from the state of FIG. 2 to become lower toward the downstream side in response to an operation performed on the operation knob.

The first downstream fin 36 is tiltable about the two fin shafts 38 between a neutral position (FIG. 2) and a tilt position (FIG. 20). The first downstream fin 37 is tiltable about the two fin shafts 39 between the neutral position (FIG. 2) and the tilt position (FIG. 16). The second downstream fin 41 is tiltable about the two fin shafts 43 between the neutral position (FIG. 2) and the tilt position (FIG. 16). The second downstream fin 42 is tiltable about the two fin shafts 44 between the neutral position (FIG. 2) and the tilt position (FIG. 20). The tilt position is a position tilted upward or downward by a possible maximum angle from the neutral position.

The flow direction of the air-conditioning air A1 that has passed through the upstream fins 51 (described later) and has not passed through the second downstream fins 41, 42 is referred to as an inflow direction. That is, the inflow direction is the flow direction of the air-conditioning air A1 prior to being changed by the second downstream fins 41, 42. When the upstream fins 51 are each located at the neutral position, the inflow direction is the same as the direction in which the air-conditioning air A1 flows into the retainer 11.

At the neutral position, the first downstream fins 36, 37 and the second downstream fins 41, 42 each extend along the inflow direction. At the tilt position, the first downstream fins 36, 37 and the second downstream fins 41, 42 are each tilted with respect to the inflow direction that approaches the inner side of the air passage 31 toward the downstream side.

When the first downstream fin 36 and the second downstream fin 41 are each located at the neutral position, at least part of (in the first embodiment, the entirety of) the first downstream fin 36 and the second downstream fin 41 in the thickness direction (up-down direction) are accommodated in the fin accommodation chamber 34. When the first downstream fin 37 and the second downstream fin 42 are each located at the neutral position, at least part of (in the first embodiment, the entirety of) the first downstream fin 36 and the second downstream fin 41 in the thickness direction (up-down direction) are accommodated in the fin accommodation chamber 35.

In at least part of the first downstream fins 36, 37 and the second downstream fins 41, 42 in the left-right direction, length L2 of the second downstream fins 41, 42 in the flow direction of the air-conditioning air A1 is set to be longer than length L1 of the first downstream fins 36, 37.

Specifically, as shown in FIGS. 5 and 6, the downstream end of each of the second downstream fins 41, 42 includes a notch 47 recessed toward the upstream side. The notches 47 are respectively located on the opposite sides of the second downstream fins 41, 42 in the left-right direction. The upstream end of each of the first downstream fins 36, 37 includes a protrusion 48 protruding toward the upstream side. The protrusions 48 are respectively located on the opposite sides of the first downstream fins 36, 37 in the left-right direction.

When the first downstream fins 36, 37 and the second downstream fins 41, 42 respectively adjacent to the first downstream fins 36, 37 on the upstream side are each located at the neutral position, each protrusion 48 is configured to be fitted into a corresponding notch 47.

The two fin shafts 38 of the first downstream fin 36 and the two fin shafts 39 of the first downstream fin 37 are both located on the protrusions 48. Length L2 of a portion of each of the second downstream fins 41, 42 sandwiched between the two notches 47 in the flow direction is set to be longer than length L1 of a portion of a corresponding one of the first downstream fins 36, 37 sandwiched between the two protrusions 48.

Upstream Fins 51

As shown in FIGS. 2 and 3, the upstream fins 51 are disposed further upstream of the second downstream fins 41, 42 in the air passage 31. Each upstream fin 51 is a plate extending in the up-down direction in the air passage 31. The upstream fins 51 are spaced apart from each other in parallel at equal intervals in the left-right direction.

Fin shafts 52 protruding toward the opposite sides in the up-down direction are disposed at an intermediate portion of each upstream fin 51 in the flow direction. The fin shafts 52 are respectively supported by the horizontal walls 33 of the downstream inner retainer 14 at positions further upstream of the fin shafts 43, 44. Each upstream fin 51 is tiltable in the left-right direction about the two fin shafts 52.

In the tilting direction of each upstream fin 51, the position parallel to the flow direction of the air-conditioning air A1 flowing into the air passage 31 (i.e., the position parallel to the vertical walls 32) is referred to as a neutral position of each upstream fin 51

Operation Knob 55

As shown in FIGS. 8 and 12, the operation knob 55 (operation portion) is a member operated by the occupant to change the blowing direction of the air-conditioning air A1 from the outlet port 17. The operation knob 55 is operably disposed on the retainer 11. Specifically, the operation knob 55 is mounted on the knob mounting member 24 to be movable in the left-right direction. The operation knob 55 is integrated with the knob mounting member 24 and can be operated (tilted) in the up-down direction about the two support shafts 25.

Referring to FIG. 1, the position at a central portion in the left-right direction and a central portion in the up-down direction in the window 21 is referred to as a reference position of the operation knob 55.

The operation knob 55 includes a downstream portion 55a that is exposed from the bezel 15 through the window 21 toward the downstream side. The occupant of the vehicle can operate the operation knob 55 by touching the exposed portion.

Downstream Transmission Mechanism 61

The downstream transmission mechanism 61 is used to transmit the movement of the operation knob 55 in the up-down direction to the two first downstream fins 36, 37 and the two second downstream fins 41, 42 of FIG. 2 so that they are tilted.

The downstream transmission mechanism 61 is located at a section from the operation knob 55 to the two first downstream fins 36, 37 and the two second downstream fins 41, 42. In response to an operation performed on the operation knob 55, the downstream transmission mechanism 61 actuates the two first downstream fins 36, 37 and the two second downstream fins 41, 42 to satisfy the following conditions 1 and 2.

Condition 1: As shown in FIGS. 16 and 20, when one of the first downstream fins 36, 37 is tilted toward the tilt position, the other one of the first downstream fins 37, 36 and one of the second downstream fins 41, 42 at a diagonal position with respect to the other one of the first downstream fins 37, 36 are each held at the neutral position.

Condition 2: One of the second downstream fins 42, 41 at a diagonal position with respect to the one of the first downstream fins 36, 37 is tilted toward the tilt position.

In the first embodiment, the downstream transmission mechanism 61 has the following configuration.

As shown in FIGS. 8 and 12, the knob mounting member 24 includes a coupling pin 62 extending rightward at a position shifted downstream from the right support shaft 25. As the knob mounting member 24 tilts, the coupling pin 62 turns around the support shaft 25.

Figure 9:
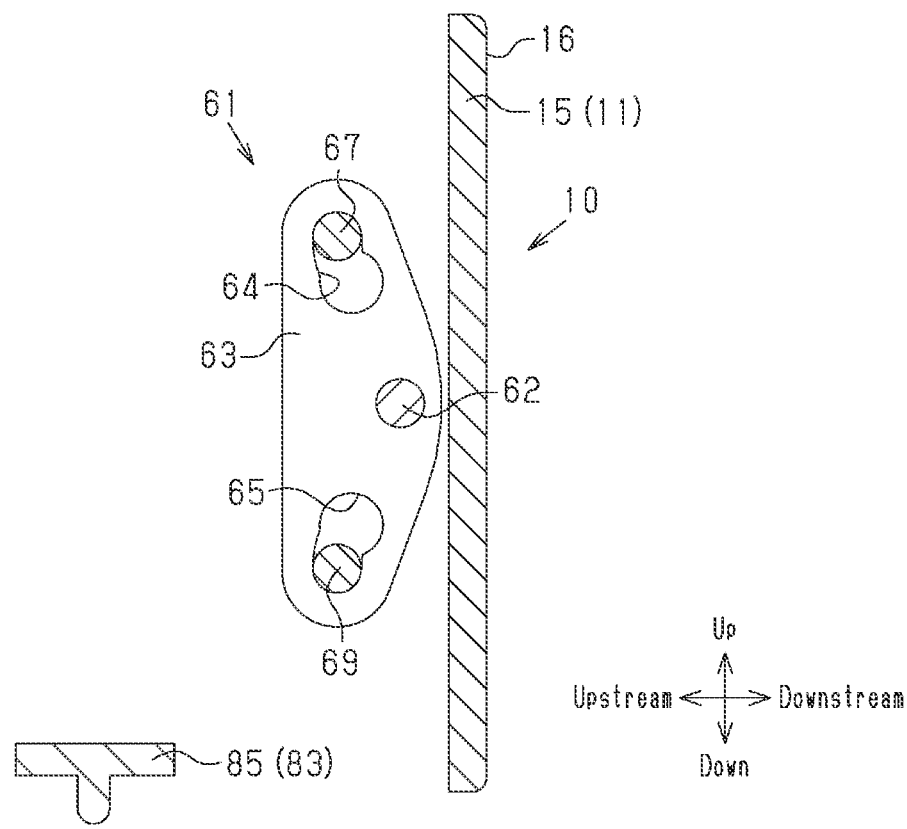
FIG. 9 is a cross-sectional view taken along line 9-9 in FIG. 1.

As shown in FIGS. 9 and 12, a coupling plate 63 is disposed between the knob operation chamber 22 and the downstream outer retainer 13. The coupling plate 63 is a plate elongated in the up-down direction. The coupling plate 63 is supported by the coupling pin 62 at a downstream position of an intermediate portion of the coupling plate 63 in the up-down direction. The coupling plate 63 has an upper cam hole 64 extending in the up-down direction at a position upstream and above the coupling pin 62. The coupling plate 63 also has a lower cam hole 65 extending in the up-down direction at a position upstream and below the coupling pin 62.

As shown in FIG. 5, an arm 66 extends downstream from the left fin shaft 38 of the upper first downstream fin 36. A transmission pin 67 protrudes leftward from the downstream end of the arm 66 to engage the upper cam hole 64 (see FIG. 9).

As shown in FIG. 6, an arm 68 extends downstream from the left fin shaft 39 of the lower first downstream fin 37. A transmission pin 69 protrudes leftward from the downstream end of the arm 68 to engage the lower cam hole 65 (see FIG. 9).

As shown in FIGS. 5, 6, 10, and 11, a sectoral driving gear 71 is fixed on the right fin shaft 38 of the first downstream fin 36. A sectoral driving gear 72 is fixed on the right fin shaft 39 of the first downstream fin 37 at a position rightward from the driving gear 71. The teeth of the driving gear 71 are arranged along an arc centered on the fin shaft 38. The teeth of the driving gear 72 are arranged along an arc centered on the fin shaft 39.

A sectoral driven gear 73 is fixed on the right fin shaft 43 of the second downstream fin 41. A sectoral driven gear 74 is fixed on the right fin shaft 44 of the second downstream fin 42 at a position rightward from the driven gear 73. The teeth of the driven gear 73 are arranged along an arc centered on the fin shaft 43. The teeth of the driven gear 74 are arranged along an arc centered on the fin shaft 44.

Figure 10:
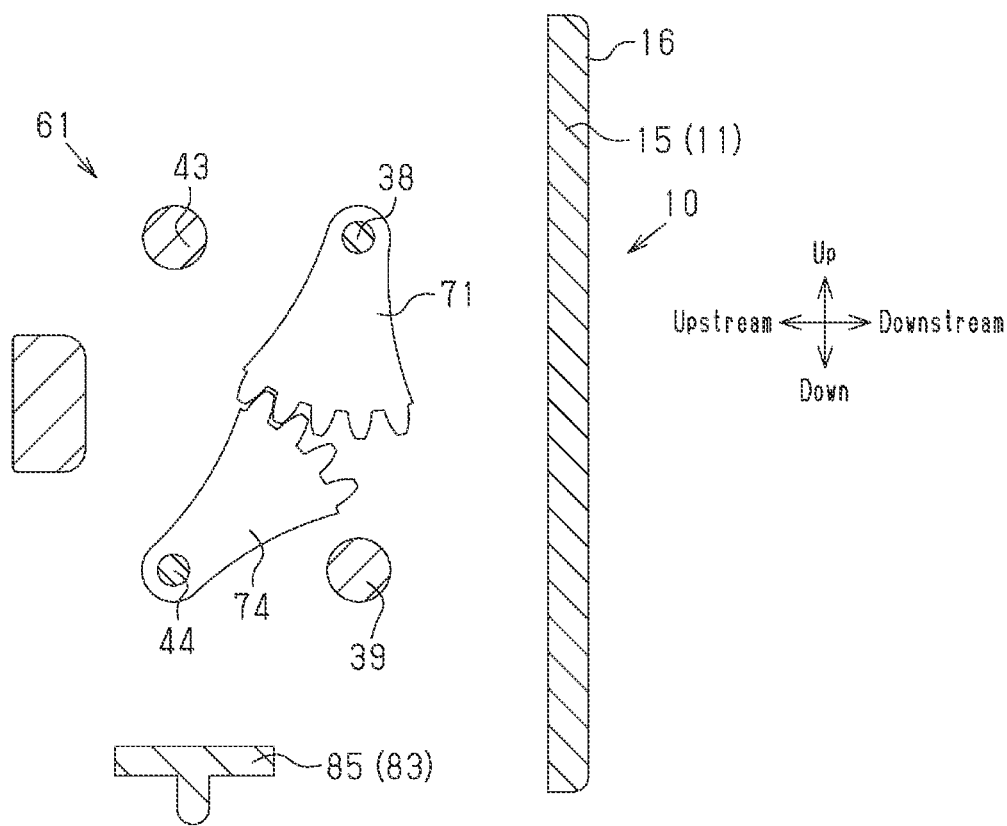
FIG. 10 is a cross-sectional view taken along line 10-10 in FIG. 1.
Figure 11:
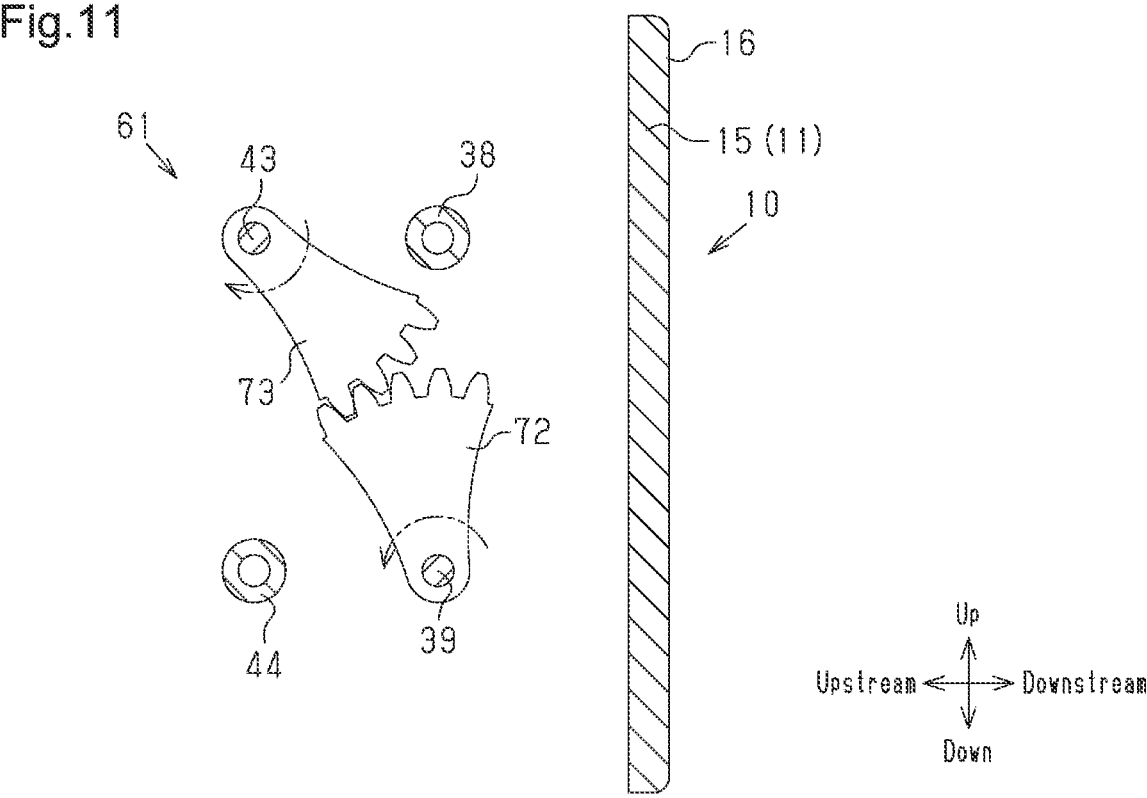
FIG. 11 is a cross-sectional view taken along line 11-11 in FIG. 1.

As shown in FIG. 10, the driving gear 71 of the upper first downstream fin 36 meshes with the driven gear 74 of the lower second downstream fin 42 at a diagonal position with respect to the driving gear 71. As shown in FIG. 11, the driving gear 72 of the lower first downstream fin 37 meshes with the driven gear 73 of the upper second downstream fin 41 at a diagonal position with respect to the driving gear 72.

Upstream Transmission Mechanism 81

Figure 4:
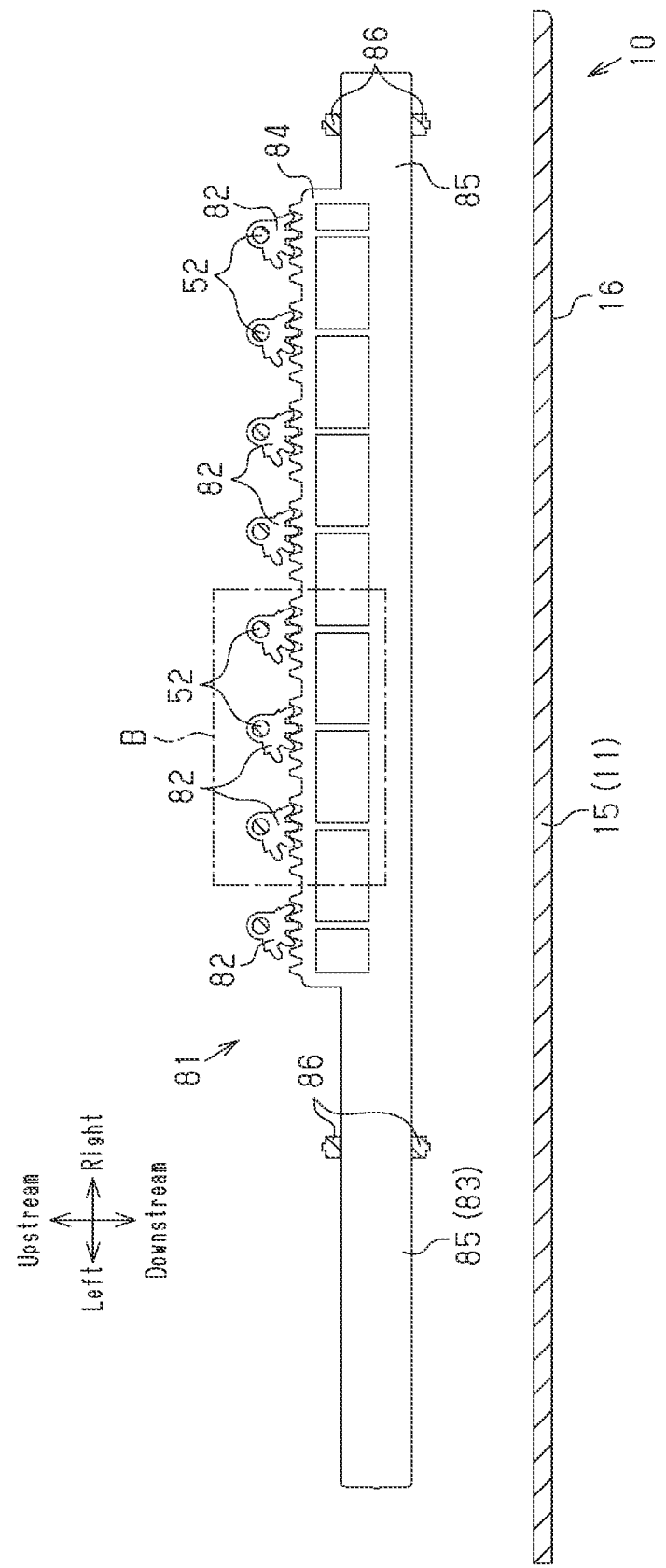
FIG. 4 is a cross-sectional view taken along line 4-4 in FIG. 1.

Referring to FIGS. 2 to 4, the upstream transmission mechanism 81 is used to transmit movement of the operation knob 55 in the left-right direction (linear motion of the operation knob 55) to the upstream fins 51 so that the upstream fins 51 are tilted in synchronization about the fin shafts 52.

The lower fin shaft 52 of each upstream fin 51 extends to a position below the downstream outer retainer 13. A sectoral driven gear 82 is disposed at a lower end of each fin shaft 52. The teeth of the driven gear 82 are arranged along an arc centered on the fin shaft 52.

A transmission member 83 extending in the left-right direction is disposed below the downstream outer retainer 13 on the downstream side of the driven gears 82. A rack gear 84 having teeth arranged in the left-right direction is disposed at an upstream portion of the transmission member 83 on the downstream side of the driven gears 82. The rack gear 84 meshes with the driven gear 82 of each upstream fin 51.

The transmission member 83 includes plates 85 extending in the left-right direction on the opposite sides of the rack gear 84 in the left-right direction. The left plate 85 of the transmission member 83 is coupled to the operation knob 55.

As shown in FIGS. 3 and 8, the left plate 85 includes a transmission column 87 protruding upward. The operation knob 55 includes two forks 88 that extend toward the upstream side and are separated from each other in the left-right direction. The two forks 88 sandwich the transmission column 87 from the left and right sides. Thus, the movement of the operation knob 55 in the up-down direction is not transmitted to the transmission member 83. Instead, the movement of the operation knob 55 in the left-right direction can be transmitted to the transmission member 83.

As shown in FIG. 4, the bottom of the downstream outer retainer 13 includes two supports 86 at positions where each plate 85 is sandwiched from the opposite sides in the flow direction. Each plate 85 is supported by the two supports 86 to be movable in the left-right direction.

The operation of the first embodiment will now be described. The advantages resulting from the operation will also be described.

(1) When Operation Knob 55 is at Reference Position (1-1) FIGS. 1 to 12 show the state of each component of the low-profile air-conditioning register 10 when the operation knob 55 is located at the reference position.

As shown in FIG. 4, the transmission member 83 is located at a central portion of the movable range. As shown in FIGS. 3, 5, 6, and 12, each upstream fin 51 is held at the neutral position parallel to the two vertical walls 32.

As shown in FIG. 9, the upper transmission pin 67 is engaged with the upper portion of the upper cam hole 64, and the lower transmission pin 69 is engaged with the lower portion of the lower cam hole 65. The lower driving gear 72 and the upper driven gear 73 mesh with each other at the position shown in FIG. 11, and the upper driving gear 71 and the lower driven gear 74 mesh with each other at the position shown in FIG. 10.

Figure 7:
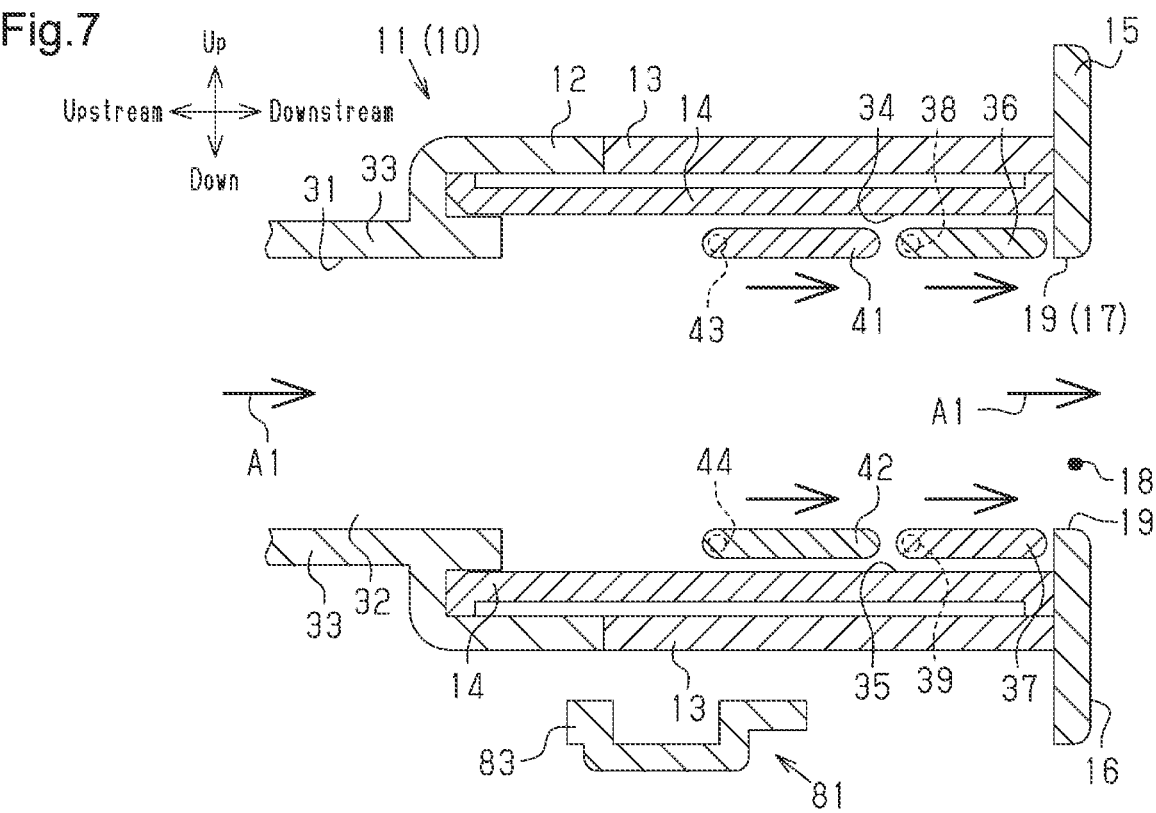
FIG. 7 is a partial cross-sectional view taken along line 7-7 in FIG. 1.

As shown in FIGS. 2 and 7, each of the first downstream fins 36, 37 and each of the second downstream fins 41, 42 are held at the neutral position.

In this manner, each upstream fin 51, each of the second downstream fins 41, 42, and each of the first downstream fins 36, 37 are arranged along the flow direction of the air-conditioning air A1 flowing into the air passage 31. Thus, as shown in FIGS. 2 and 3, the air-conditioning air A1 flows along the upstream fins 51 and the vertical walls 32 between adjacent ones of upstream fins 51 and between each vertical wall 32 and the upstream fin 51 adjacent to that vertical wall 32. Further, the air-conditioning air A1 flows between and along the two second downstream fins 41, 42, and flows between and along the two first downstream fins 36, 37. The air-conditioning air A1 flows in the same direction as the inflow direction. The air-conditioning air A1 that has passed between the two first downstream fins 36, 37 is blown out straight toward the downstream side from the outlet port 17.

Figure 14:
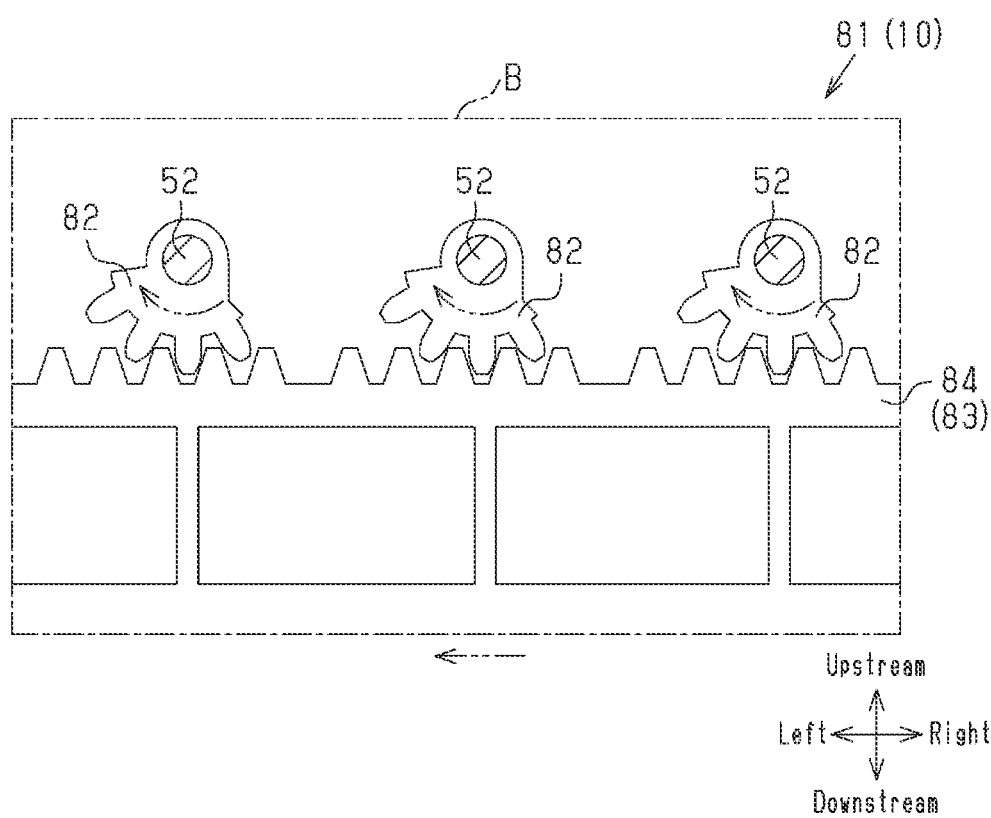
FIG. 14 is an enlarged partial plan cross-sectional view showing portion B in FIG. 4.

(2) When Operation Knob 55 is Operated in Left-Right Direction (2-1) First, as shown in FIGS. 12 and 14, a case in which a force is applied to the downstream portion 55a of the operation knob 55 at the reference position in the left-right direction (e.g., in the leftward direction as indicated by the long dashed double-short dashed line) in FIG. 12 will be described.

Figure 13:
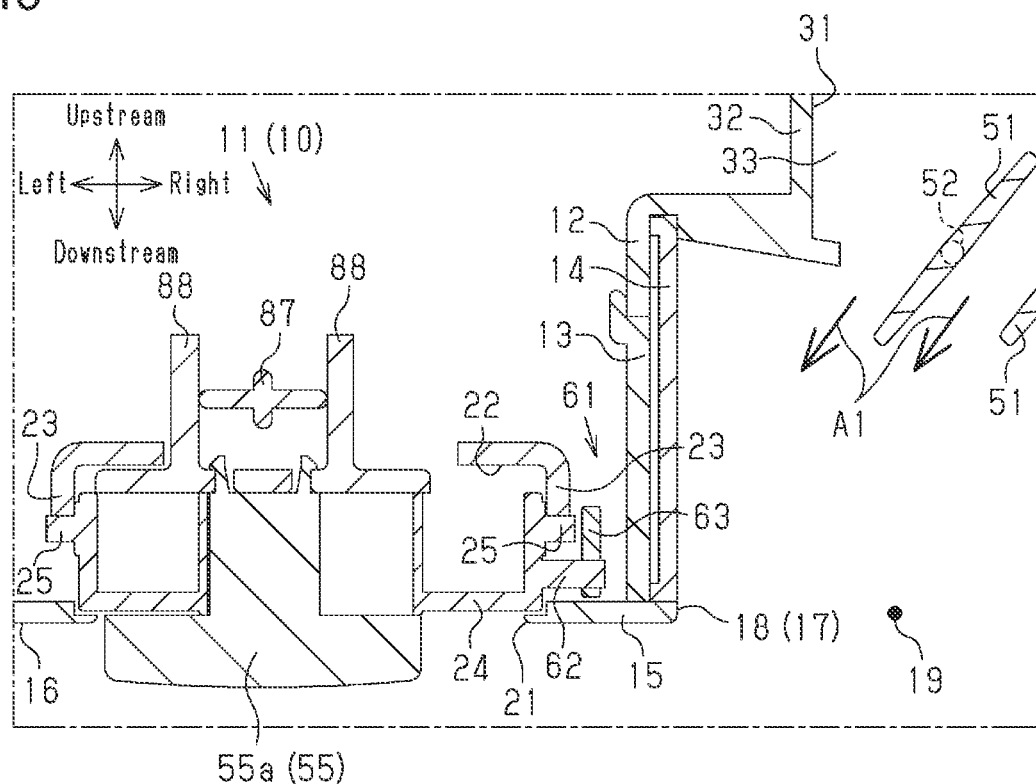
FIG. 13 is a partial plan cross-sectional view showing a state in which the operation knob is moved leftward from the state shown in FIG. 12.
Figure 15:
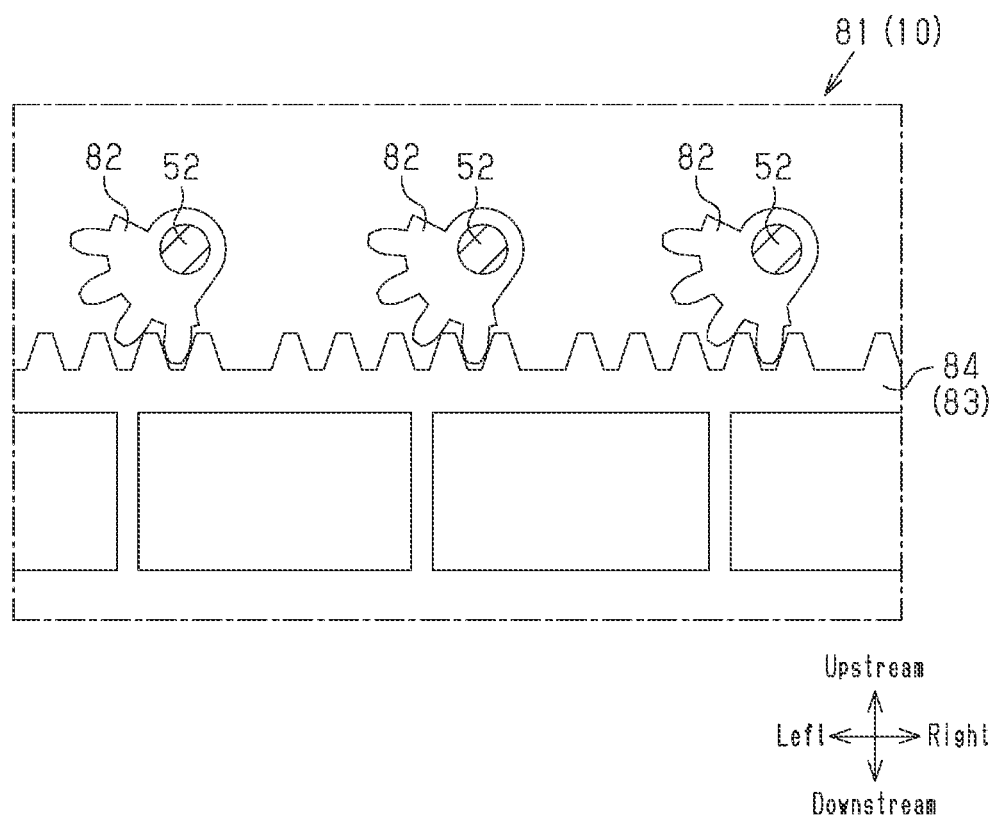
FIG. 15 is a partial plan sectional view showing a state in which the transmission member is moved leftward from the state of FIG. 14 in response to an operation performed on the operation knob.

In this case, as shown in FIGS. 13 and 15, the operation knob 55 moves in the left-right direction together with the transmission member 83. The position at which the rack gear 84 meshes with all the driven gears 82 in the transmission member 83 changes so that the driven gears 82 are rotated in the clockwise direction in plan view. Accordingly, as shown in FIG. 13, all the upstream fins 51 synchronously tilt in the same direction about the fin shafts 52. Each upstream fin 51 is tilted to approach the left side toward the downstream side. The air-conditioning air A1 that has flowed into the air passage 31 flows along the tilted upstream fins 51 as described above. This changes the flow direction of the air-conditioning air A1 to an obliquely leftward direction.

When the operation knob 55 that has been moved leftward from the reference position as described above is moved rightward, the upstream transmission mechanism 81 performs an operation opposite to the above operation. As shown in FIGS. 3 and 12, the upstream fins 51 are all rearranged along the flow direction of the air-conditioning air A1 flowing into the air passage 31.

Figure 17:
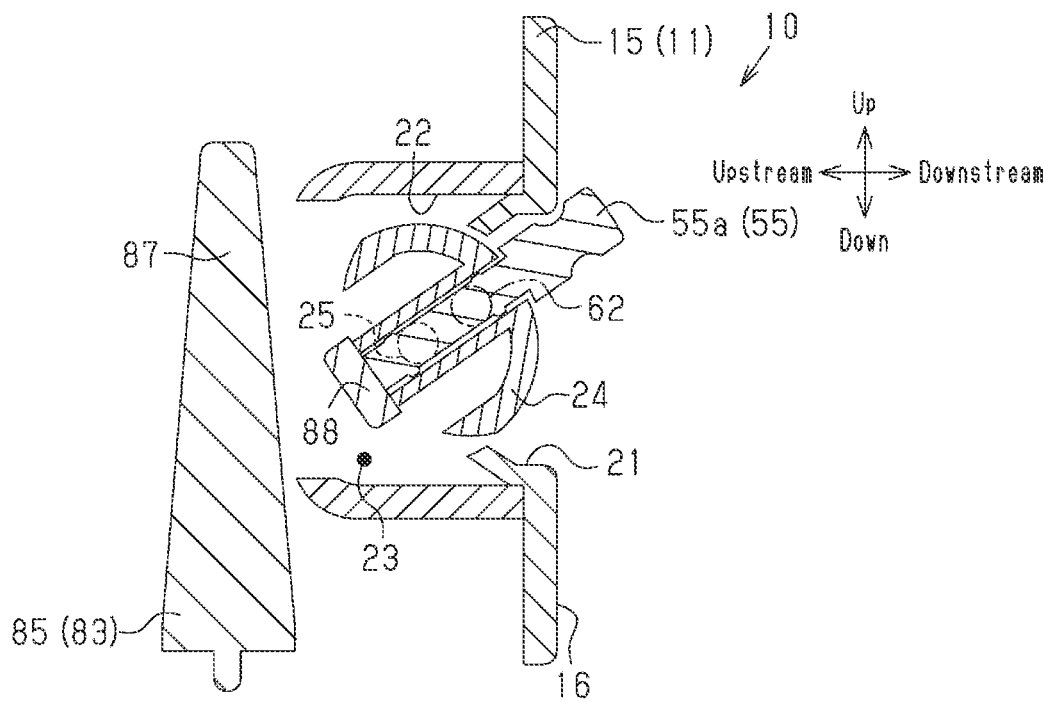
FIG. 17 is a side cross-sectional view showing a state in which the operation knob is operated upward from the state of FIG. 8.

(3) When Operation Knob 55 is Operated in Up-Down Direction (3-1) When a force acting in the up-down direction (e.g., in the upward direction) is applied to the downstream portion 55a of the operation knob 55 at the reference position as shown in FIG. 8, the operation knob 55 is tilted upward about the support shaft 25 as shown in FIG. 17. The movement of the operation knob 55 is transmitted to the two first downstream fins 36, 37 and the two second downstream fins 41, 42 by the downstream transmission mechanism 61, which is shown in FIGS. 5 and 6.

Figure 18:
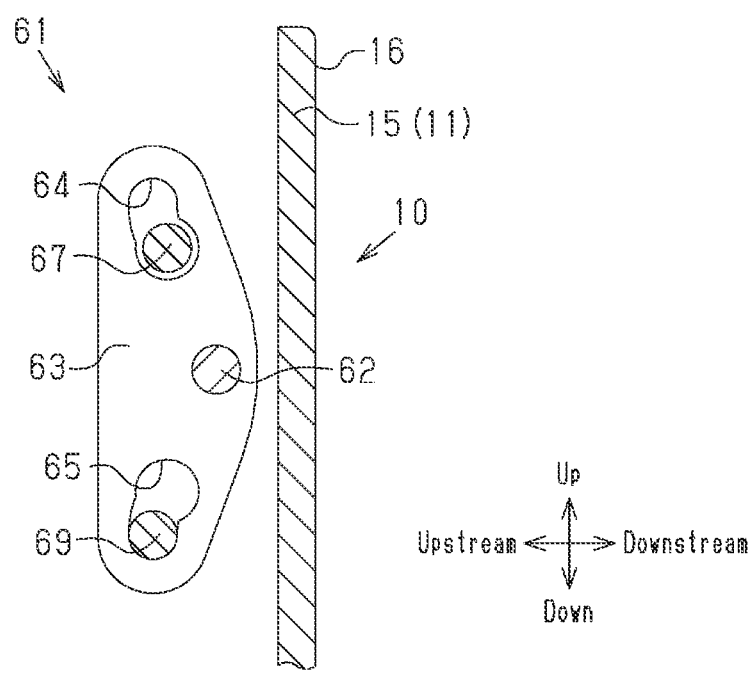
FIG. 18 is a partial side cross-sectional view showing a state in which the coupling plate is moved upward from the state of FIG. 9 in response to an operation performed on the operation knob.

Specifically, as shown in FIGS. 17 and 18, the coupling pin 62 rotates upward about the support shaft 25, and the coupling plate 63 moves upward. Further, the upper cam hole 64 and the lower cam hole 65 in the coupling plate 63 move upward. The upper cam hole 64 does not press the upper transmission pin 67 upward, whereas the lower cam hole 65 presses the lower transmission pin 69 upward.

The upper transmission pin 67 that is not pressed by the upper cam hole 64 does not move. However, since the upper cam hole 64 moves upward, the portion of the upper cam hole 64 engaged with the upper transmission pin 67 changes from the upper portion (see FIG. 9) to the lower portion of the upper cam hole 64.

Referring to FIG. 5, the fin shaft 38 coupled to the transmission pin 67 by the arm 66 does not rotate. As shown in FIGS. 10 and 16, the upper first downstream fin 36 is held at the neutral position. Further, the driving gear 71 fixed to the fin shaft 38 does not rotate. Accordingly, the lower driven gear 74 meshed with the driving gear 71 does not rotate. In addition, the fin shaft 44 to which the driven gear 74 is fixed does not rotate. The lower second downstream fin 42 is held at the neutral position.

Figure 19:
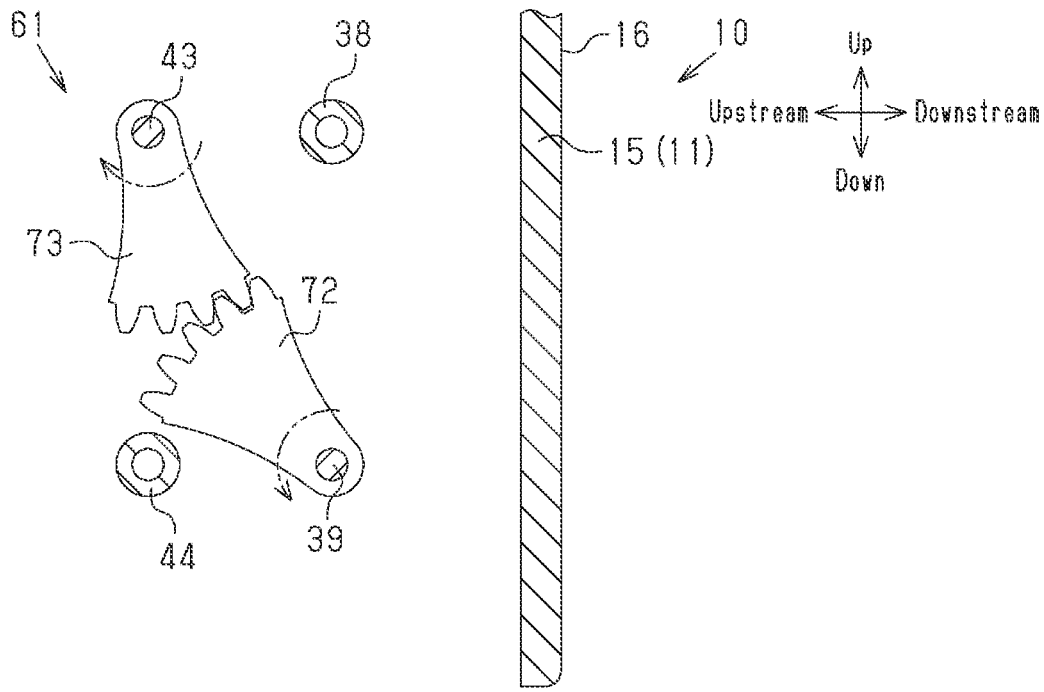
FIG. 19 is a partial side cross-sectional view showing a state in which the lower driving gear and the upper driven gear are rotated from the state of FIG. 11 in response to an operation performed on the operation knob.

By contrast, the lower transmission pin 69 (see FIG. 18) pressed by the lower cam hole 65 moves upward. The fin shaft 39 coupled to the transmission pin 69 by the arm 68 as shown in FIG. 6 is rotated counterclockwise as shown in FIGS. 16 and 19 in the left side view. This tilts the lower first downstream fin 37 inward (upward) in the air passage 31 about the fin shaft 39 so that the lower first downstream fin 37 is tilted to become higher toward the downstream side. Further, the driving gear 72 fixed to the fin shaft 39 is rotated in the counterclockwise direction in the left side view.

Accordingly, the upper driven gear 73 meshed with the driving gear 72 rotates in the opposite direction to the driving gear 72 (i.e., in the clockwise direction in the left side view). The fin shaft 43 to which the driven gear 73 is fixed also rotates in the clockwise direction. This tilts the upper second downstream fin 41 inward (downward) in the air passage 31 about the fin shaft 43 so that the upper second downstream fin 41 is tilted to become lower toward the downstream side.

In this manner, when the lower first downstream fin 37 is tilted toward the tilt position in response to the upward operation of the operation knob 55 (see FIG. 17), the upper first downstream fin 36 and the lower second downstream fin 42 at a diagonal position with respect to the upper first downstream fin 36 are each held at the neutral position. The upper second downstream fin 41 at a diagonal position with respect to the lower first downstream fin 37 is tilted toward the tilt position.

As shown in FIG. 16, the air-conditioning air A1 flowing through the lower portion of the air passage 31 flows along the lower second downstream fin 42 at the neutral position and then flows along the tilted first downstream fin 37. This changes the flow direction of the air-conditioning air A1 to a direction inward (upward) in the air passage 31.

The air-conditioning air A1 flowing through the upper portion of the air passage 31 flows along the second downstream fin 41. This changes the flow direction of the air-conditioning air A1 to a direction inward (downward) in the air passage 31.

The tilted second downstream fin 41 faces the first downstream fin 37 tilted toward the opposite side. Thus, the air-conditioning air A1 flowing along the second downstream fin 41 is collected on the tilted first downstream fin 37 and strikes the first downstream fin 37 so that the air-conditioning air A1 flows along the first downstream fin 37, thereby changing the flow direction. Accordingly, a larger amount of the air-conditioning air A1 flows along the tilted first downstream fin 37 than when the second downstream fin 41 is not disposed or tilted in the above manner.

Since the first downstream fin 36 on the downstream side of the second downstream fin 41 is held at the neutral position, the change in the flow direction caused by the second downstream fin 41 and the first downstream fin 37 is less likely to be affected than when the first downstream fin 36 is tilted.

As described above, the air-conditioning air A1 in which the flow direction has been changed by the tilted first downstream fin 37 is blown out obliquely upward from the outlet port 17.

When the operation knob 55 tilted as described above is operated downward about the support shaft 25, the downstream transmission mechanism 61 performs an operation opposite to the above operation. As shown in FIGS. 7 and 16, the first downstream fin 37 and the second downstream fin 41 are each returned to the neutral position whereas the first downstream fin 36 and the second downstream fin 42 are each held at the neutral position.

(3-2) A case in which a downward force is applied to the downstream portion 55a of the operation knob 55 at the reference position will now be described. In this case, each component of the low-profile air-conditioning register 10 moves in a manner opposite to the above (3-1).

Figure 21:
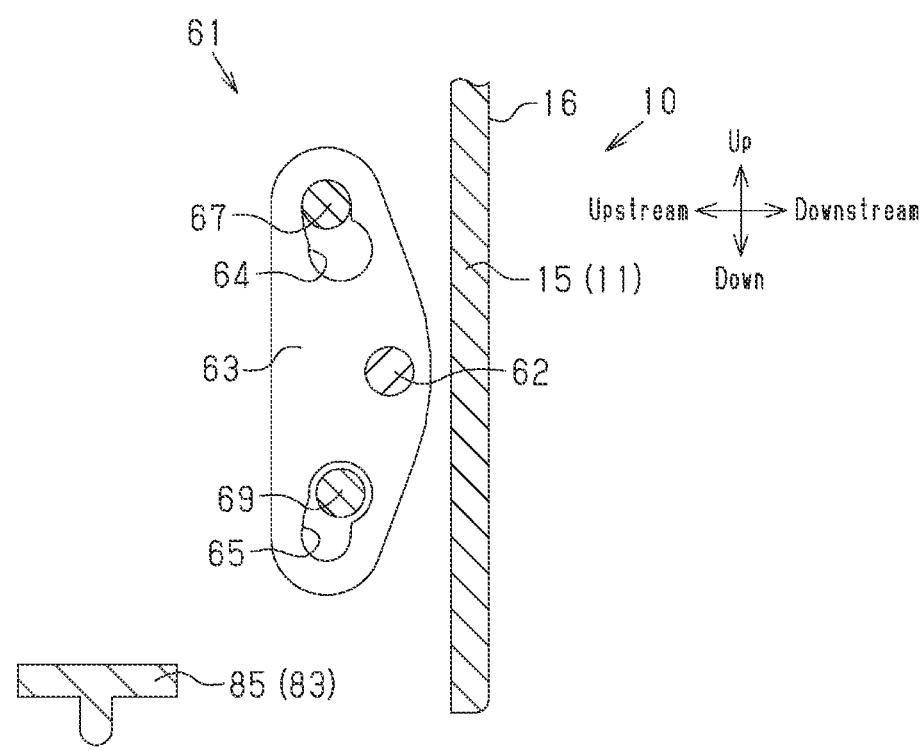
FIG. 21 is a partial side cross-sectional view showing a state in which the coupling plate is moved downward from the state of FIG. 9 in response to an operation performed on the operation knob.

Specifically, the operation knob 55 shown in FIG. 8 is tilted downward about the support shaft 25. The coupling pin 62 turns downward about the support shaft 25. As shown in FIG. 21, the coupling plate 63 moves downward. The lower cam hole 65 does not press the lower transmission pin 69 downward, whereas the upper cam hole 64 presses the upper transmission pin 67 downward.

The lower transmission pin 69 that is not pressed by the lower cam hole 65 does not move. However, since the lower cam hole 65 moves downward, the portion of the lower cam hole 65 engaged with the lower transmission pin 69 changes from the lower portion (see FIG. 9) to the upper portion of the lower cam hole 65.

Referring to FIG. 6, the fin shaft 39 coupled to the transmission pin 69 by the arm 68 does not rotate. As shown in FIGS. 11 and 20, the lower first downstream fin 37 is held at the neutral position. Further, the driving gear 72 fixed to the fin shaft 39 does not rotate. Accordingly, the upper driven gear 73 meshed with the driving gear 72 does not rotate. In addition, the fin shaft 43 to which the driven gear 73 is fixed does not rotate. The upper second downstream fin 41 is held at the neutral position.

Figure 22:
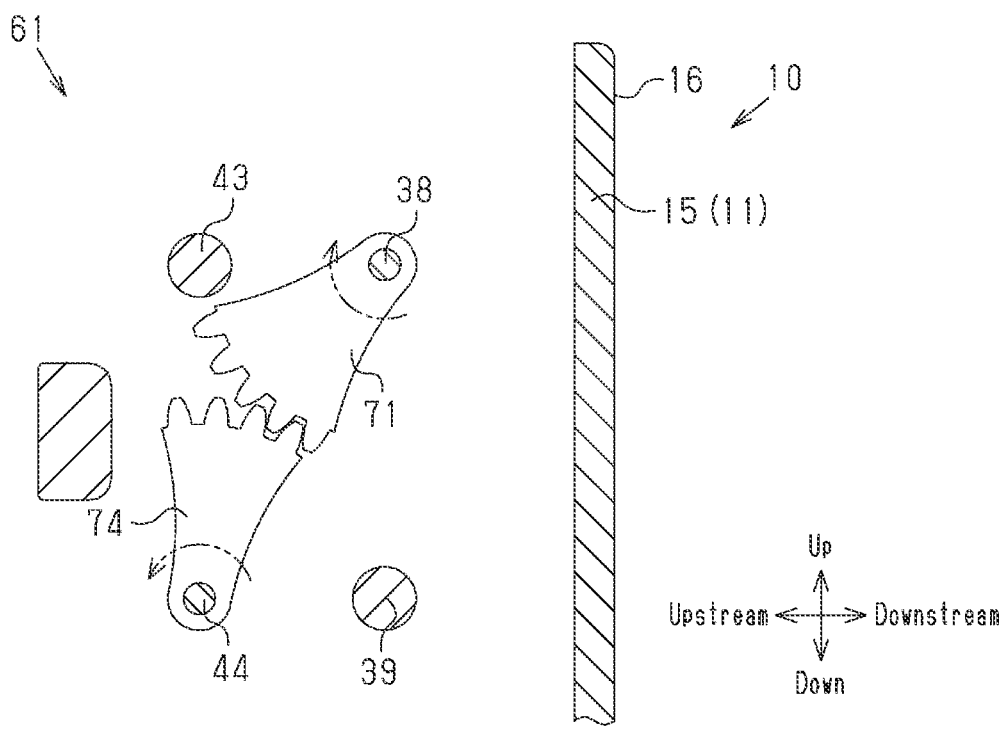
FIG. 22 is a partial side cross-sectional view showing a state in which the upper driving gear and the lower driven gear are rotated from the state of FIG. 10 in response to an operation performed on the operation knob.

By contrast, as shown in FIG. 21, the upper transmission pin 67 pressed by the upper cam hole 64 moves downward. The fin shaft 38 coupled to the transmission pin 67 by the arm 66 as shown in FIG. 5 is rotated clockwise as shown in FIGS. 20 and 22 in the left side view. This tilts the upper first downstream fin 36 inward (downward) in the air passage 31 about the fin shaft 38 so that the upper first downstream fin 36 is tilted to become lower toward the downstream side. Further, the driving gear 71 fixed to the fin shaft 38 is rotated in the clockwise direction in the left side view.

Accordingly, the lower driven gear 74 meshed with the driving gear 71 rotates in the opposite direction to the driving gear 71 (i.e., in the counterclockwise direction in the left side view). The fin shaft 44 to which the driven gear 74 is fixed also rotates in the counterclockwise direction. This tilts the lower second downstream fin 42 inward (upward) in the air passage 31 about the fin shaft 44 so that the lower second downstream fin 42 is tilted to become higher toward the downstream side.

In this manner, when the upper first downstream fin 36 is tilted toward the tilt position in response to the downward operation of the operation knob 55, the lower first downstream fin 37 and the upper second downstream fin 41 at a diagonal position with respect to the lower first downstream fin 37 are each held at the neutral position. The lower second downstream fin 42 at a diagonal position with respect to the upper first downstream fin 36 is tilted toward the tilt position.

The air-conditioning air A1 flowing through the upper portion of the air passage 31 flows along the upper second downstream fin 41 located at the neutral position and then flows along the tilted first downstream fin 36. This changes the flow direction of the air-conditioning air A1 to a direction inward (downward) in the air passage 31.

The air-conditioning air A1 flowing through the lower portion of the air passage 31 flows along the second downstream fin 42. This changes the flow direction of the air-conditioning air A1 to a direction inward (downward) in the air passage 31.

The tilted second downstream fin 42 faces the first downstream fin 36 tilted toward the opposite side of the second downstream fin 42. Thus, the air-conditioning air A1 flowing along the second downstream fin 42 is collected on the tilted first downstream fin 36 and strikes the first downstream fin 36 so that the air-conditioning air A1 flows along the first downstream fin 36, thereby changing the flow direction. Accordingly, a larger amount of the air-conditioning air A1 flows along the tilted first downstream fin 36 than when the second downstream fin 42 is not disposed or tilted in the above manner.

Since the first downstream fin 37 on the downstream side of the second downstream fin 42 is held at the neutral position, the change in the flow direction caused by the second downstream fin 42 and the first downstream fin 36 is less likely to be affected than when the first downstream fin 37 is tilted.

As described above, the air-conditioning air A1 in which the flow direction has been changed by the tilted first downstream fin 36 is blown out obliquely downward from the outlet port 17.

When the operation knob 55 tilted as described above is operated upward about the support shaft 25, the downstream transmission mechanism 61 performs an operation opposite to the above operation. As shown in FIGS. 7 and 20, the first downstream fin 36 and the second downstream fin 42 are each returned to the neutral position whereas the first downstream fin 37 and the second downstream fin 41 are each held at the neutral position.

(3-3) As described in (3-1) and (3-2) above, the blowing direction of the air-conditioning air A1 in the up-down direction is changed. This eliminates the need for disposing an additional downstream fin on the upstream side of an intermediate portion of the outlet port 17 in the up-down direction to change the blowing direction of the air-conditioning air A1 in the up-down direction.

Thus, the influence of the downstream fin on the actual opening area of the outlet port 17 (the degree to which the actual opening area is reduced) is smaller than that in a case in which downstream fins are disposed upstream of the intermediate portion of the outlet port 17 in the up-down direction. Thus, pressure loss caused by the downstream fins is reduced.

(3-4) As shown in FIG. 2, in the first embodiment, when the first downstream fin 36 and the second downstream fin 41 are each located at the neutral position, the entire fins 36, 41 in the thickness direction are accommodated in the upper fin accommodation chamber 34.

When the first downstream fin 37 and the second downstream fin 42 are each located at the neutral position, the entire fins 37, 42 in the thickness direction is accommodated in the lower fin accommodation chamber 35.

Because of the accommodation, the entire first downstream fins 36, 37 in the thickness direction and the entire second downstream fins 41, 42 in the thickness direction are respectively located upstream of two positions outward from the outlet port 17 in the up-down direction.

Thus, the portions of the first downstream fins 36, 37 and the second downstream fins 41, 42 located upstream of the outlet port 17 are made smaller than those in a case in which the entire first downstream fins 36, 37 and the entire second downstream fins 41, 42 are located. Accordingly, the influence of the downstream fins on the actual opening area of the outlet port 17 is further reduced. In addition, the ventilation resistance caused by the downstream fins is further reduced.

(3-5) If length L2 of the second downstream fins 41, 42 in the flow direction is shorter than length L1 of the first downstream fins 36, 37 at any position in the left-right direction, the following problem would occur.

As shown in FIGS. 16 and 20, when the second downstream fins 41, 42 are tilted inward of the air passage 31, the air-conditioning air flows along the second downstream fins 41, 42 to change the flow direction, thereby reducing the amount of the air-conditioning air A1 striking the first downstream fins 37, 36 at the diagonal positions. Instead of the flow direction being changed by the second downstream fins 41, 42, the amount of the air-conditioning air A1 flowing in the same direction as the inflow direction increases. This increases the amount of the air-conditioning air A1 blown out from the outlet port 17 without striking the first downstream fins 36, 37.

As shown in FIGS. 5 and 6, the first embodiment at least includes a portion in the left-right direction in which length L2 of the second downstream fins 41, 42 in the flow direction is longer than length L1 of the first downstream fins 36, 37. Thus, as shown in FIGS. 16 and 20, when the second downstream fins 41, 42 are tilted inward of the air passage 31, the amount of the air-conditioning air flowing along the second downstream fins 41, 42 and striking the first downstream fins 37, 36 is increased in the portion having a relatively long length L2. Instead of the flow direction being changed by the second downstream fins 41, 42, the amount of the air-conditioning air A1 flowing in the same direction as the inflow direction decreases. This reduces the amount of the air-conditioning air A1 blown out from the outlet port 17 without striking the first downstream fins 36, 37.

(3-6) Particularly, in the first embodiment, as shown in FIGS. 5 and 6, the relationship L2>L1 is satisfied between the portion of each of the second downstream fins 41, 42 between the two notches 47 and the portion of each of the first downstream fins 36, 37 between the two protrusions 48. That is, the relationship of L2>L1 is satisfied between most of the second downstream fins 41, 42 in the left-right direction and most of the first downstream fins 36, 37 in the left-right direction.

Thus, as shown in FIGS. 16 and 20, the air-conditioning air A1 flows along the portion of the second downstream fin 41, 42 tilted inward of the air passage 31 that satisfies the relationship L2>L1 to change the flow direction, thereby increasing the air-conditioning air A1 striking the first downstream fin 37, 36 at the diagonal position.

Instead of the flow direction being changed by the second downstream fins 41, 42, the amount of the air-conditioning air A1 flowing in the same direction as the inflow direction decreases. This reduces the amount of the air-conditioning air A1 blown out from the outlet port 17 without striking the first downstream fins 36, 37.

Figure 23:
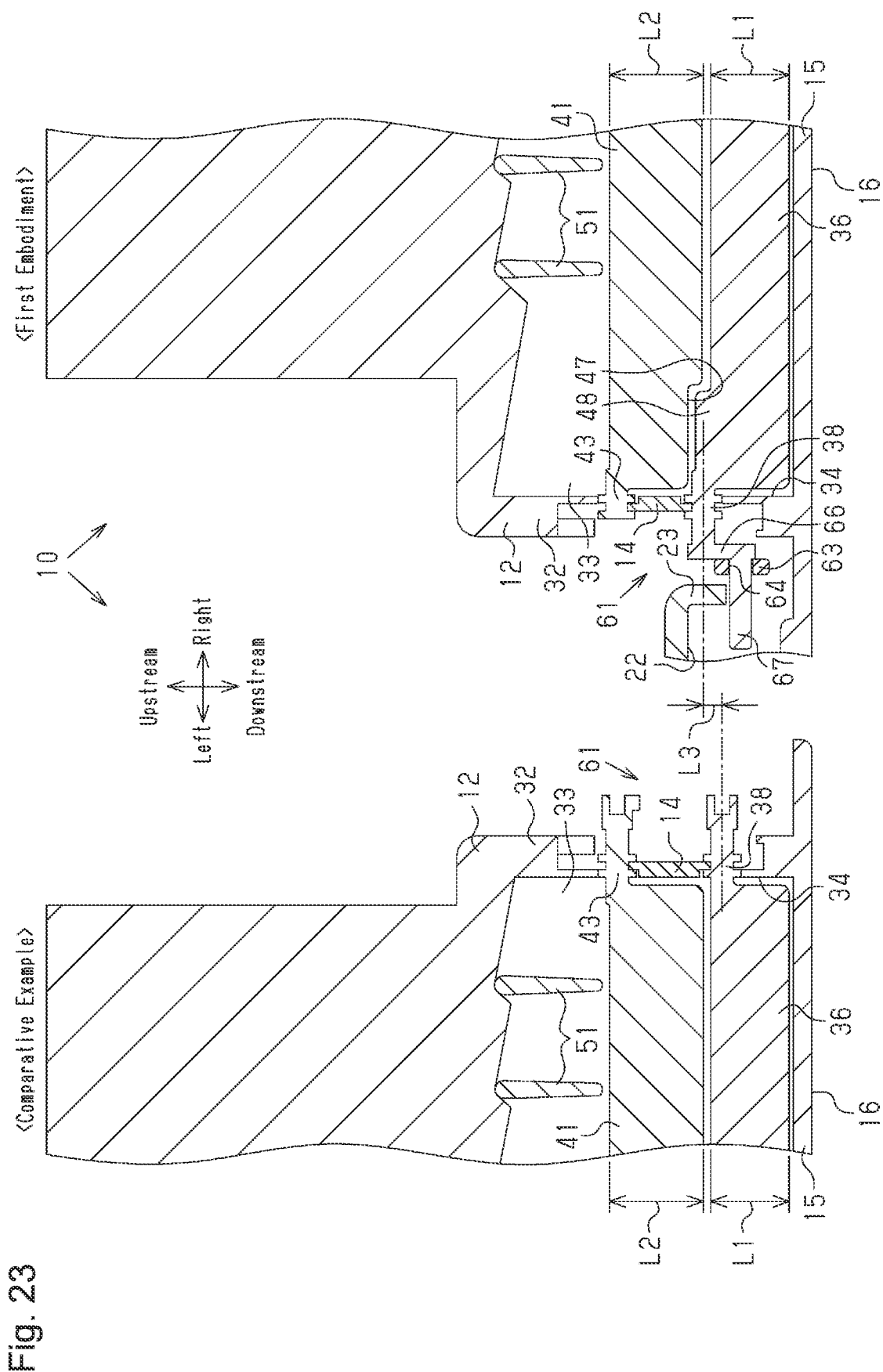
FIG. 23 is a partial plan cross-sectional view showing part of FIG. 5 in comparison with part of a low-profile air-conditioning register according to a comparative example.

Further, as shown in FIGS. 5, 6, and 23, the protrusions 48 on the opposite sides of the first downstream fin 36 in the left-right direction are the upstream ends of the first downstream fin 36, and the fin shafts 38 are respectively located on the upstream ends of the first downstream fin 36. Further, the protrusions 48 on the opposite sides of the first downstream fin 37 in the left-right direction are the upstream ends of the first downstream fin 37, and the fin shafts 39 are respectively located on the upstream ends of the first downstream fin 37.

The left side of FIG. 23 shows the low-profile air-conditioning register 10 of a comparative example that includes no protrusions 48. The low-profile air-conditioning register 10 of the comparative example satisfies the above relationship L2>L1. In the first embodiment, the fin shafts 38, 39 are located upstream of those of the comparative example by length L3.

In the first downstream fin 36, 37, the length from the fin shaft 38, 39 to the downstream end (i.e., the radius of tilting) is longer than that in the comparative example, which includes no protrusions 48. Accordingly, the two first downstream fins 36, 37 and the two second downstream fins 41, 42 can be employed in the low-profile air-conditioning register 10 in which the short side portions 18 are relatively long (i.e., the distance between the two long side portions 19 is relatively long) and the outlet port 17 has a relatively large opening area. In this case, the influence of the downstream fins on the actual opening area of the outlet port 17 is reduced. Hence, the pressure loss caused by the downstream fins is reduced.

(4) Appearance of Low-Profile Air-Conditioning Register 10

(4-1) In the first embodiment, as described above in (3-3), no downstream fins are disposed upstream of the intermediate portion of the outlet port 17 in the up-down direction.

Thus, when an occupant sees the low-profile air-conditioning register 10 in which all the downstream fins are located at the neutral position from the downstream side of the outlet port 17, the downstream fins are invisible at the intermediate portion of the outlet port 17 in the up-down direction. This improves the appearance of the low-profile air-conditioning register 10.

(4-2) In the first embodiment, as shown in FIGS. 2 and 7, when each of the first downstream fin 36 and the second downstream fin 41 is located at the neutral position, the entire fins 36 and 41 in the thickness direction are accommodated in the upper fin accommodation chamber 34. When the first downstream fin 37 and the second downstream fin 42 are each located at the neutral position, the entire fins 37, 42 in the thickness direction are accommodated in the lower fin accommodation chamber 35.

Thus, when the occupant sees the low-profile air-conditioning register 10 from the downstream side of the outlet port 17, the first downstream fin 36, 37 and the second downstream fins 41, 42 are invisible or difficult to see. This further improves the appearance of the low-profile air-conditioning register 10.

(5) Other Operation and Advantages (5-1) The operation knob 55 is located outside the outlet port 17. Thus, the influence of the operation knob 55 on the actual opening area of the outlet port 17 is smaller than that in a case in which the operation knob 55 is disposed inside the outlet port 17. This reduces the pressure loss.

Second Embodiment

The low-profile air-conditioning register 10 for the vehicle according to a second embodiment will now be described with reference to FIGS. 24 to 27.

The second embodiment is different from the first embodiment in that the operation knob 55 is inserted into the outlet port 17. The downstream portion 55a of the operation knob 55 is exposed from the bezel 15 toward the downstream side through the outlet port 17.

In the second embodiment, the retainer 11 includes support walls 91 that are respectively located upstream of two positions outward from the outlet port 17 in the left-right direction. A support shaft 92 extending in the left-right direction on the upstream side of the outlet port 17 is disposed between the support walls 91. Opposite ends of the support shaft 92 are rotationally supported by the two support walls 91, respectively. The operation knob 55 is attached to the support shaft 92 to be integrally rotatable and movable in the left-right direction.

A downstream transmission mechanism (not shown) having the same function as that of the first embodiment is disposed at a section from the operation knob 55 to the two first downstream fins 36, 37 and the two second downstream fins 41, 42. An upstream transmission mechanism (not shown) having the same function as that of the first embodiment is disposed between the operation knob 55 and the upstream fin 51.

In the second embodiment, the downstream portion of the retainer 11 includes the downstream outer retainer 13. Accordingly, the fin shafts 52 of the upstream fin 51 are tiltably supported by the downstream outer retainer 13 instead of the downstream inner retainer 14. The same applies to a third embodiment shown in FIGS. 28, 31 and 32, a fourth embodiment shown in FIGS. 33, 36 and 37, and modifications shown in FIGS. 40 to 45.

The upper fin accommodation chamber 34 is defined in the upper portion of the downstream outer retainer 13. The lower fin accommodation chamber 35 is defined in the lower portion of the downstream outer retainer 13.

Figure 25:
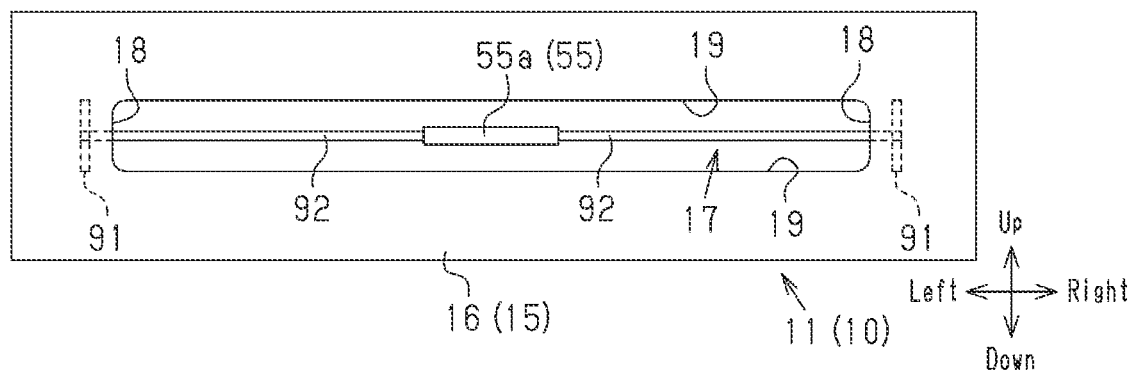
FIG. 25 is a front view of the low-profile air-conditioning register of FIG. 24.

The upstream fins 51 are not shown in FIG. 25. The same applies to modifications shown in FIGS. 38 and 39.

Other than the above differences, the second embodiment is the same as the first embodiment. Thus, like or the same reference numerals are given to those components that are like or the same as the corresponding components of the first embodiment and redundant explanations are omitted.

The low-profile air-conditioning register 10 of the second embodiment has the same configuration as that of the first embodiment except for the position of the operation knob 55, and thus operates in the same manner as that of the first embodiment.

Figure 24:
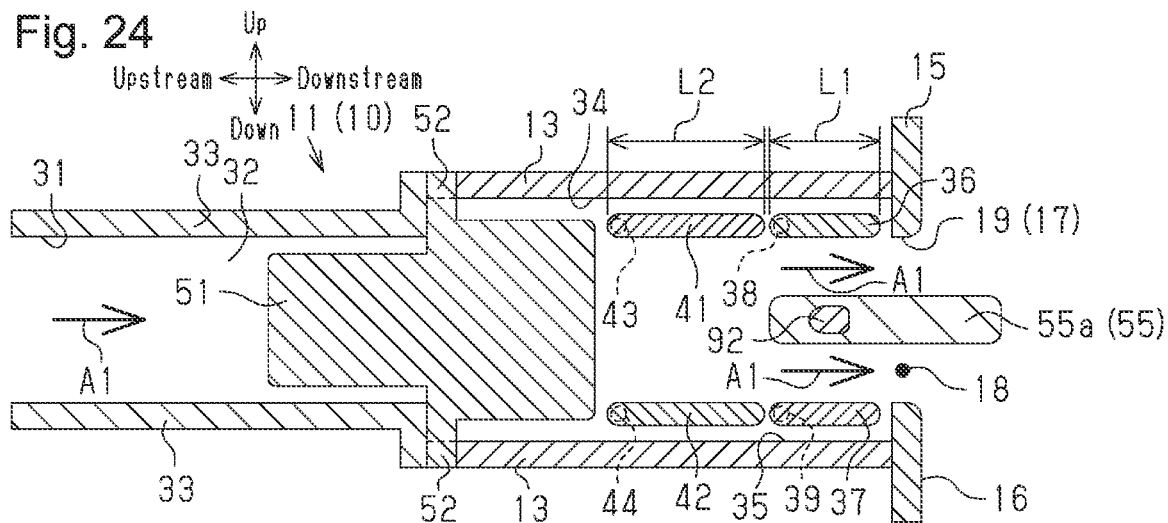
FIG. 24 is a side cross-sectional view of the low-profile air-conditioning register in which all the downstream fins are located at the neutral position in a second embodiment.

When the operation knob 55 is located at the reference position as shown in FIG. 24, the upstream fins 51, the first downstream fins 36, 37, and the second downstream fins 41, 42 are each held at the neutral position.

Thus, the air-conditioning air A1 flows along the upstream fins 51 and the vertical walls 32 between adjacent ones of upstream fins 51 and between each vertical wall 32 and the upstream fin 51 adjacent to that vertical wall 32. Further, the air-conditioning air A1 flows between and along the two second downstream fins 41, 42, and flows between and along the two first downstream fins 36, 37. After flowing in the same direction as the inflow direction, the air-conditioning air A1 is blown out straight from the outlet port 17 toward the downstream side.

Figure 26:
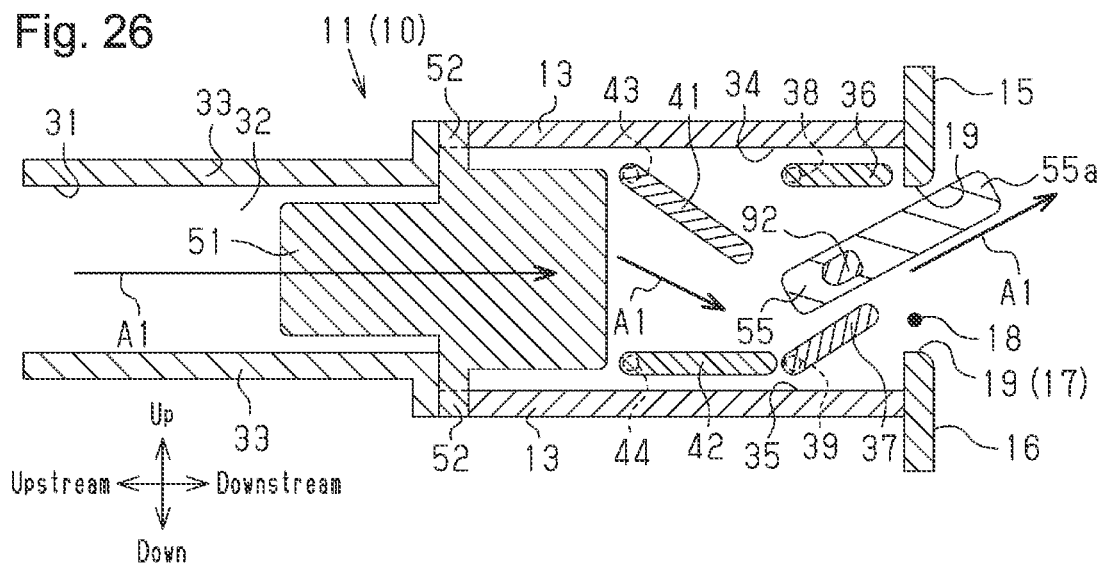
FIG. 26 is a side cross-sectional view of the low-profile air-conditioning register when the operation knob is operated upward from the state shown in FIG. 24.

As shown in FIG. 26, when an upward force is applied to the downstream portion 55a of the operation knob 55 at the reference position, the operation knob 55 is tilted upward about the support shafts 92. The movement of the operation knob 55 is transmitted to the two first downstream fins 36, 37 and the two second downstream fins 41, 42 by the downstream transmission mechanism.

This tilts the lower first downstream fin 37 inward (upward) in the air passage 31 about the fin shaft 39 so that the lower first downstream fin 37 is tilted to become higher toward the downstream side. Further, the upper second downstream fin 41 at a diagonal position with respect to the lower first downstream fin 37 is tilted inward (downward) in the air passage 31 about the fin shaft 43 so that the upper second downstream fin 41 is tilted to become lower toward the downstream side. The upper first downstream fin 36 and the lower second downstream fin 42 at a diagonal position with respect to the upper first downstream fin 36 are each held at the neutral position.

The flow direction of the air-conditioning air A1 is changed by the second downstream fin 41 and the first downstream fin 37 that are tilted in the opposite directions. This causes the air-conditioning air A to be blown out obliquely upward from the outlet port 17.

When the operation knob 55 in FIG. 26 is operated downward about the support shaft 92, the downstream transmission mechanism performs an operation opposite to the above operation. As shown in FIGS. 24 and 26, the first downstream fin 37 and the second downstream fin 41 are each returned to the neutral position whereas the first downstream fin 36 and the second downstream fin 42 are each held at the neutral position.

Figure 27:
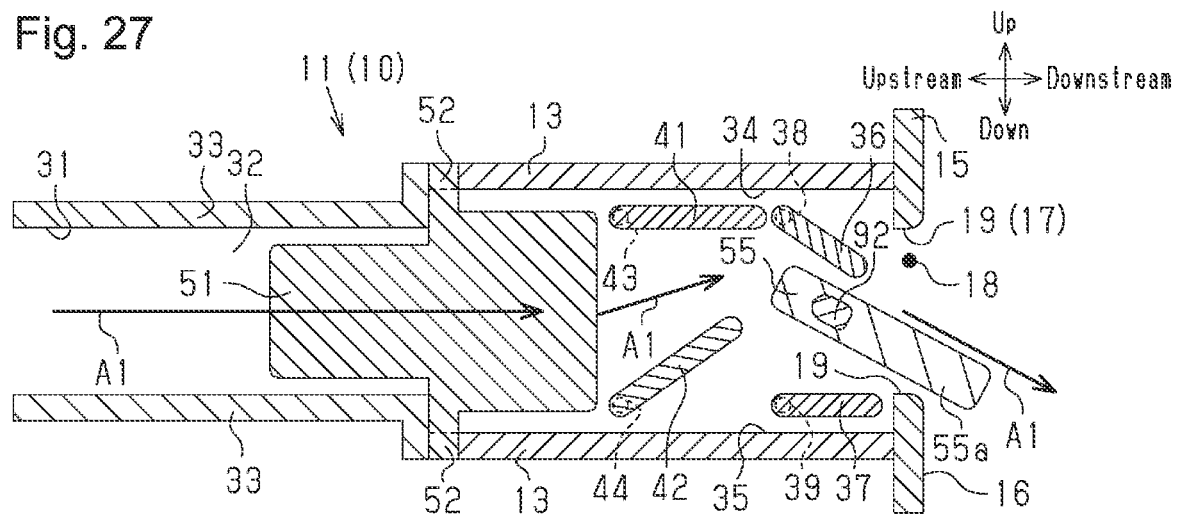
FIG. 27 is a side cross-sectional view of the low-profile air-conditioning register when the operation knob is operated downward from the state shown in FIG. 24.

As shown in FIG. 27, when a downward force is applied to the downstream portion 55a of the operation knob 55 at the reference position, the operation knob 55 is tilted downward about the support shafts 92. The movement of the operation knob 55 is transmitted to the two first downstream fins 36, 37 and the two second downstream fins 41, 42 by the downstream transmission mechanism.

This tilts the upper first downstream fin 36 inward (downward) in the air passage 31 about the fin shaft 38 so that the upper first downstream fin 36 is tilted to become lower toward the downstream side. Further, the lower second downstream fin 42 at a diagonal position with respect to the upper first downstream fin 36 is tilted inward (upward) in the air passage 31 about the fin shaft 44 so that the lower second downstream fin 42 is tilted to become higher toward the downstream side. The lower first downstream fin 37 and the upper second downstream fin 41 at a diagonal position with respect to the lower first downstream fin 37 are each held at the neutral position.

The flow direction of the air-conditioning air A1 is changed by the second downstream fin 42 and the first downstream fin 36 that are tilted in the opposite directions. This causes the air-conditioning air A1 to be blown out obliquely upward from the outlet port 17.

When the operation knob 55 in FIG. 27 is operated upward, the first downstream fin 36 and the second downstream fin 42 are each returned to the neutral position whereas the first downstream fin 37 and the second downstream fin 41 are each held at the neutral position as shown in FIGS. 7 and 20.

Accordingly, in the second embodiment, although the actual opening area of the outlet port 17 is reduced by an amount corresponding to the operation knob 55 and the support shafts 92, the same advantage as that of the first embodiment is obtained.

Third Embodiment

The low-profile air-conditioning register 10 for the vehicle according to the third embodiment will now be described with reference to FIGS. 28 to 32.

Figure 28:
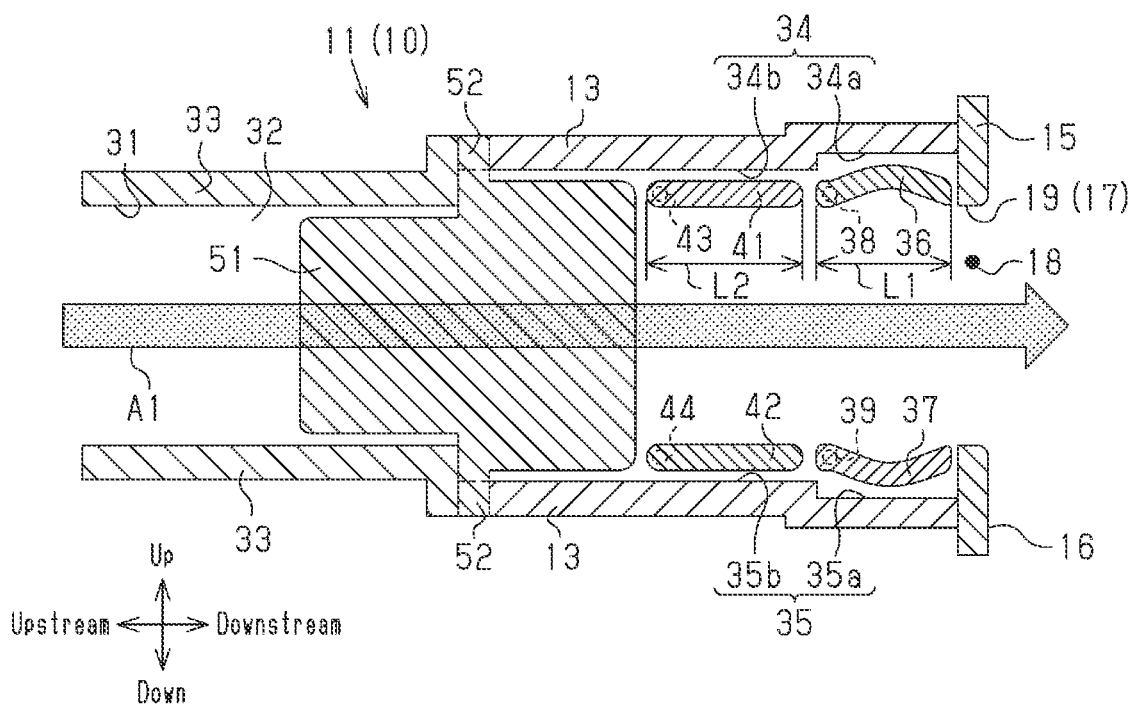
FIG. 28 is a side cross-sectional view of the low-profile air-conditioning register in which all the downstream fins are located at the neutral position in a third embodiment.

As shown in FIG. 28, the third embodiment is different from the first embodiment in the shapes of the first downstream fins 36, 37. Accordingly, the shapes of the fin accommodation chambers 34, 35 are different from those of the first embodiment.

The upper fin accommodation chamber 34 is defined in the upper portion of the downstream outer retainer 13. The fin accommodation chamber 34 includes a fin accommodation portion 34a adjacent to the outlet port 17 on the upstream side and a fin accommodation portion 34b adjacent to the fin accommodation portion 34a on the upstream side. The fin accommodation portion 34a is wider than the fin accommodation portion 34b and is located above the fin accommodation portion 34b.

The lower fin accommodation chamber 35 is defined in the lower portion of the downstream outer retainer 13. The fin accommodation chamber 35 includes a fin accommodation portion 35a adjacent to the outlet port 17 on the upstream side and a fin accommodation portion 35a adjacent to the fin accommodation portion 35b on the upstream side. The fin accommodation portion 35a is wider than the fin accommodation portion 35b and is located above the fin accommodation portion 35b.

Figure 29:
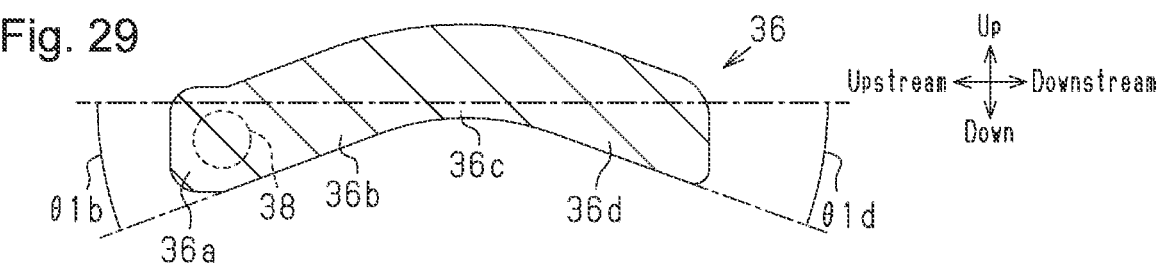
FIG. 29 is an enlarged side cross-sectional view showing the upper first downstream fin in FIG. 28.

As shown in FIGS. 28 and 29, the upper first downstream fin 36 includes an upstream end 36a, an upstream portion 36b, an intermediate portion 36c, and a downstream portion 36d arranged in this order from the upstream side toward the downstream side. The upstream end 36a includes the two fin shafts 38. The two fin shafts 38 are supported by the upper ends of the vertical walls 32, respectively.

Figure 30:
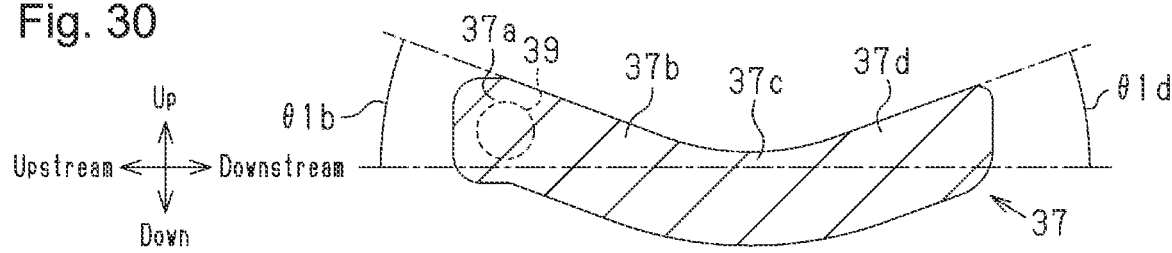
FIG. 30 is an enlarged side cross-sectional view showing the lower first downstream fin in FIG. 28.

As shown in FIGS. 28 and 30, the lower first downstream fin 37 includes an upstream end 37a, an upstream portion 37b, an intermediate portion 37c, and a downstream portion 37d arranged in this order from the upstream side toward the downstream side. The upstream end 37a includes the two fin shafts 39. The two fin shafts 39 are respectively located below the two fin shafts 38. The two fin shafts 39 are supported by the lower ends of the vertical walls 32, respectively.

As shown in FIGS. 28 to 30, the upstream portion 36b and the downstream portion 36d of the upper first downstream fin 36 are bent or curved to become farther from the intermediate portion 36c toward the inner side (lower side) of the air passage 31 as the upstream portion 36b and the downstream portion 36d become farther from the intermediate portion 36c in the flow direction.

Further, the upstream portion 37b and the downstream portion 37d of the lower first downstream fin 37 are bent or curved to become farther from the intermediate portion 37c toward the inner side (upper side) of the air passage 31 as the upstream portion 37b and the downstream portion 37d become farther from the intermediate portion 37c in the flow direction.

The curved shape refers to a shape in which the entire upstream portions 36b, 37b, intermediate portions 36c, 37c, and downstream portions 36d, 37d of the first downstream fins 36, 37 are arcuate. Shapes other than the curved shape are referred to as bent shapes. In a case in which at least one of the components of the first downstream fins 36, 37 has a flat shape, the first downstream fins 36, 37 have a bent shape. For example, when only the intermediate portions 36c, 37c are arcuate, the first downstream fins 36, 37 have a bent shape. The features regarding the curved and bent shapes applies to the second downstream fins 41, 42, which will be described later.

In the third embodiment, all of the first downstream fins 36, 37 are bent. The intermediate portion 36c of the first downstream fin 36 is curved to bulge upward. The upstream end 36a, the upstream portion 36b, and the downstream portion 36d have a flat shape. The intermediate portion 37c of the first downstream fin 37 is curved to bulge downward. The upstream end 37a, the upstream portion 37b, and the downstream portion 37d have a flat shape.

To express the degree of bending of the first downstream fin 36, 37, the angle formed by the upstream portion 36b, 37b with respect to the inflow direction of the air-conditioning air A1 when the first downstream fin 36, 37 is located at a neutral position (described later) is referred to as a first tilt angle θ1b. The angle formed by the downstream portion 36d, 37d with respect to the inflow direction is referred to as a first tilt angle θ1d. In the third embodiment, each of the first tilt angles θ1b, θ1d is set to 15° or greater.

Figure 31:
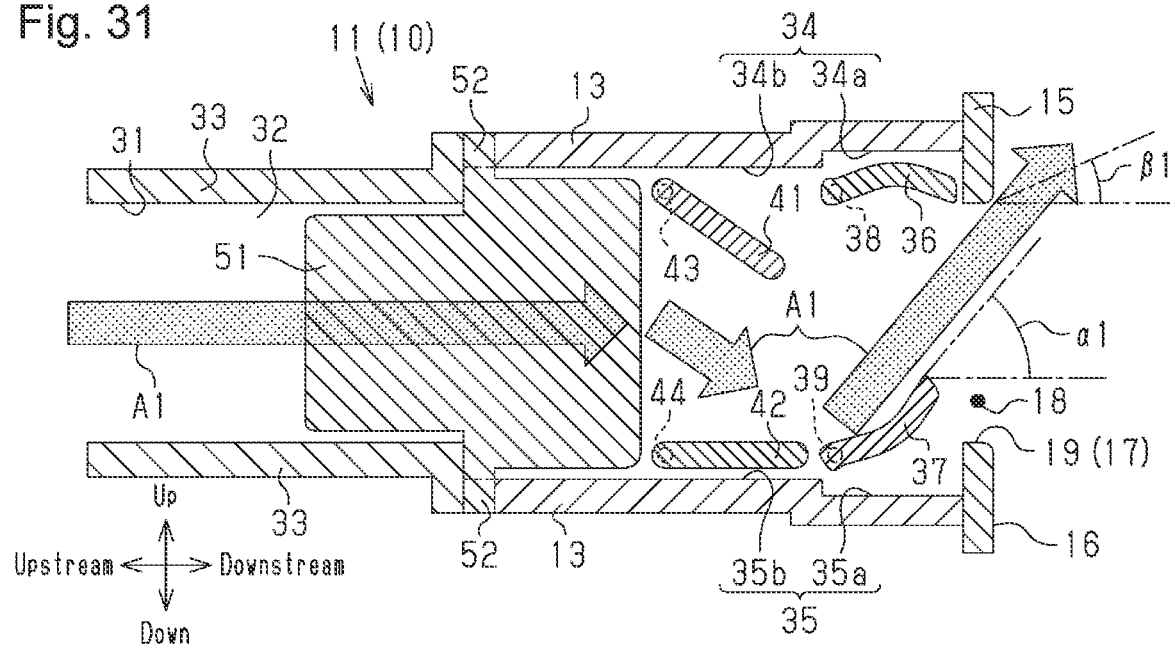
FIG. 31 is a side cross-sectional view of the low-profile air-conditioning register when the operation knob is operated upward from the state shown in FIG. 28.
Figure 32:
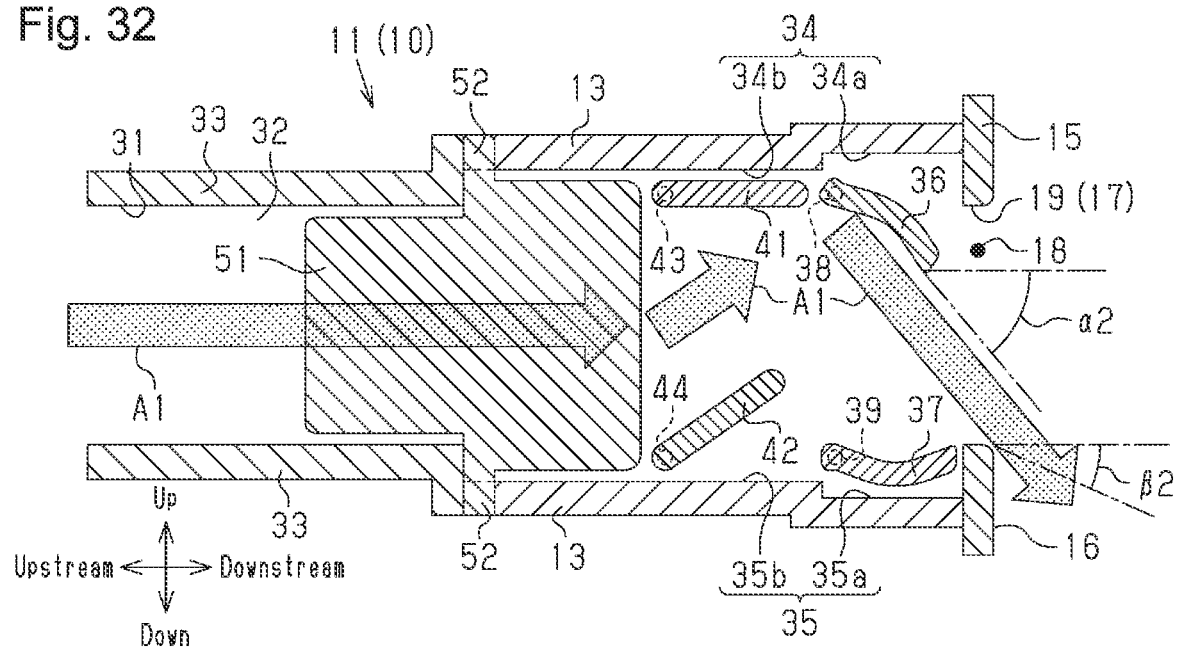
FIG. 32 is a side cross-sectional view of the low-profile air-conditioning register when the operation knob is operated downward from the state shown in FIG. 28.

The first downstream fin 36 is tiltable about the fin shafts 38 between the neutral position (FIG. 31) and a tilt position (FIG. 32). The first downstream fin 37 is tiltable about the fin shafts 39 between the neutral position (FIG. 32) and a tilt position (FIG. 31).

At the neutral position, the first downstream fins 36, 37 are arranged along the inflow direction of the air-conditioning air A1. At the neutral position, the downstream portions 36d, 37d are respectively located downstream of the upstream portions 36b, 37b.

At the tilt position, the first downstream fin 36 is tilted with respect to the inflow direction such that it approaches the inner (lower) side of the air passage 31 toward the downstream side. The downstream portion 36d becomes closer to the inner (lower) side of the air passage 31 than the upstream portion 36b. At the tilt position, the first downstream fin 37 is tilted with respect to the inflow direction such that it approaches the inner (lower) side of the air passage 31 toward the upstream side. The downstream portion 37d becomes closer to the inner (upper) side of the air passage 31 than the upstream portion 37b.

As shown in FIG. 28, when the first downstream fins 36, 37 are each located at the neutral position, at least part of (in the third embodiment, the entirety of) the first downstream fins 36, 37 in the thickness direction (up-down direction) are accommodated in the fin accommodation portions 34a, 35a.

The second downstream fins 41, 42 have the same configuration as those of the first embodiment. However, when the second downstream fins 41, 42 are each located at the neutral position, at least part of (in the third embodiment, the entirety of) the first downstream fins 36, 37 in the thickness direction (up-down direction) are accommodated in the fin accommodation portions 34b, 35b.

In at least part of the first downstream fins 36, 37 and the second downstream fins 41, 42 in the left-right direction, length L2 of the second downstream fins 41, 42 in the flow direction of the air-conditioning air A1 is set to be longer than length L1 of the first downstream fins 36, 37. This feature is the same as that of the first embodiment.

Other than the above differences, the third embodiment is the same as the first embodiment. Thus, like or the same reference numerals are given to those components that are like or the same as the corresponding components of the first embodiment and redundant explanations are omitted.

The operation of the third embodiment will now be described. The advantages resulting from the operation will also be described. In the third embodiment, the shapes of the fin accommodation chambers 34, 35 and the first downstream fins 36, 37 are changed.

Thus, the third embodiment provides the same operation and advantages as (2), (3-4) to (3-6), (4-1), (4-2), and (5-1) in the first embodiment. In addition to the ones listed above, the third embodiment achieves the following operation and advantages.

In the following, items in which a prime symbol (') is added to the last number in parentheses correspond to items with the same number in which the prime symbol (') is not added to the last number in the first embodiment. For example, (3-1') in the third embodiment corresponds to (3-1) in the first embodiment.

(1) When Operation Knob 55 is at Reference Position (1-1') FIGS. 28 to 30 show the state of each component of the low-profile air-conditioning register 10 when the operation knob 55 is located at the reference position. Each of the upstream fins 51, the first downstream fins 36, 37, and the second downstream fins 41, 42 is held at the neutral position. At the neutral position, the second downstream fins 41, 42 are arranged along the inflow direction of the air-conditioning air A1. Thus, the air-conditioning air A1 that has passed through the upstream fins 51 flows between the two second downstream fins 41, 42 along the second downstream fins 41, 42. Subsequently, the air-conditioning air A1 flows between the first downstream fins 36, 37. Each of the first downstream fins 36, 37 is bent. However, in the first downstream fins 36, 37, the downstream portions 36d, 37d are respectively located downstream of the upstream portions 36b, 37b. Thus, most of the air-conditioning air A1 flows between the first downstream fins 36, 37 in the same direction as the inflow direction, and is blown out straight from the outlet port 17 toward the downstream side.

(3) When Operation Knob 55 is Operated in Up-Down Direction (3-1') When the operation knob 55 at the reference position is operated upward, the upper first downstream fin 36 and the lower second downstream fin 42 are each held at the neutral position as shown in FIG. 31.

The lower first downstream fin 37 is tilted inward (upward) in the air passage 31 about the fin shafts 39. When tilted to the tilt position, the first downstream fin 37 is tilted to become higher toward the downstream side. Specifically, at the tilt position, the upstream portion 37b of the first downstream fin 37 is tilted with respect to the inflow direction of the air-conditioning air A1. In addition, the downstream portion 37d is tilted at an angle larger than the angle at which the upstream portion 37b is tilted with respect to the inflow direction. The downstream portion 37d is tilted at an angle larger than the angle at which the flat first downstream fin 37 of the first embodiment is tilted with respect to the inflow direction. The downstream portion 37d becomes closer to the inner (upper) side of the air passage 31 than the upstream portion 37b.

As the lower first downstream fin 37 tilts, the upper second downstream fin 41 at a diagonal position with respect to the lower first downstream fin 37 tilts toward the tilt position.

The air-conditioning air A1 flowing through the lower portion of the air passage 31 flows along the lower second downstream fin 42 located at the neutral position and then flows along the tilted first downstream fin 37. This changes the flow direction of the air-conditioning air A1 to a direction inward (upward) in the air passage 31. In the third embodiment, since the first downstream fin 37 is bent, the flow direction of the air-conditioning air A1 is changed upward more greatly than in the first embodiment, in which the first downstream fin 37 is not bent and is flat.

The air-conditioning air A1 flowing through the upper portion of the air passage 31 flows along the second downstream fin 41. This changes the flow direction of the air-conditioning air A1 to a direction inward (downward) in the air passage 31. The tilted second downstream fin 41 faces the first downstream fin 37 tilted toward the opposite side. Thus, the air-conditioning air A1 flowing along the second downstream fin 41 is collected on the tilted first downstream fin 37 and strikes the first downstream fin 37 so that the air-conditioning air A1 flows along the first downstream fin 37, thereby changing the flow direction.

As described above, the air-conditioning air A1 in which the flow direction has been changed by the tilted first downstream fin 37 is blown out obliquely upward from the outlet port 17.

When the tilted operation knob 55 is operated downward as described above, the first downstream fin 37 and the second downstream fin 41 are each returned to the neutral position whereas the first downstream fin 36 and the second downstream fin 42 are each held at the neutral position as shown in FIGS. 28 and 31.

Thus, the third embodiment provides not only the same operation and advantage as (3-1) but also the operation and advantages related to a maximum tilt angle $\alpha 1$.

As shown in FIGS. 28 and 31, the maximum tilt angle $\alpha 1$ is a tilt angle required for the first downstream fin 37 at the neutral position to move to the tilt position. In other words, the tilt angle of the first downstream fin 37 is a maximum possible tilt angle obtained when the first downstream fin 37 tilts upward from the neutral position.

As described above, at the tilt position, the downstream portion 37d is tilted at an angle larger than the angle at which the first downstream fin 37 of the first embodiment is tilted with respect to the inflow direction. Thus, the maximum tilt angle $\alpha 1$ of the third embodiment is larger than that of the first embodiment.

(3-2') When the operation knob 55 at the reference position is operated downward, the lower first downstream fin 37 and the upper second downstream fin 41 are each held at the neutral position as shown in FIG. 32.

The upper first downstream fin 36 is tilted inward (downward) in the air passage 31 about the fin shafts 38. When the first downstream fin 36 is tilted to the tilt position, the upstream portion 36b is tilted with respect to the inflow direction of the air-conditioning air A1. In addition, the downstream portion 36d is tilted at an angle larger than the angle at which the upstream portion 36b is tilted with respect to the inflow direction. The downstream portion 36d is tilted at an angle larger than the angle at which the flat first downstream fin 36 of the first embodiment is tilted with respect to the inflow direction. The downstream portion 36d becomes closer to the inner (lower) side of the air passage 31 than the upstream portion 36b.

As the upper first downstream fin 36 tilts, the lower second downstream fin 42 at the diagonal position with respect to the upper first downstream fin 36 tilts toward the tilt position.

The air-conditioning air A1 flowing through the upper portion of the air passage 31 flows along the upper second downstream fin 41 located at the neutral position and then flows along the tilted first downstream fin 36. This changes the flow direction of the air-conditioning air A1 to a direction inward (downward) in the air passage 31. In the third embodiment, since the first downstream fin 36 is bent, the flow direction of the air-conditioning air A1 is changed downward more greatly than in the first embodiment, in which the first downstream fin 37 is not bent and is flat.

The air-conditioning air A1 flowing through the lower portion of the air passage 31 flows along the second downstream fin 42. This changes the flow direction of the air-conditioning air A1 to a direction inward (downward) in the air passage 31. The tilted second downstream fin 42 faces the first downstream fin 36 tilted toward the opposite side. Thus, the air-conditioning air A1 flowing along the second downstream fin 42 is collected on the tilted first downstream fin 36 and strikes the first downstream fin 36 so that the air-conditioning air A1 flows along the first downstream fin 36, thereby changing the flow direction.

As described above, the air-conditioning air A1 in which the flow direction has been changed by the tilted first downstream fin 36 is blown out obliquely downward from the outlet port 17.

When the tilted operation knob 55 is operated upward as described above, the first downstream fin 36 and the second downstream fin 42 are each returned to the neutral position whereas the first downstream fin 37 and the second downstream fin 41 are each held at the neutral position as shown in FIGS. 28 and 32.

Thus, the third embodiment provides not only the same operation and advantage as (3-2) but also the operation and advantages related to a maximum tilt angle $\alpha 2$.

As shown in FIGS. 28 and 32, the maximum tilt angle $\alpha 2$ is a tilt angle required for the first downstream fin 36 at the neutral position to move to the tilt position. In other words, the tilt angle of the first downstream fin 36 is a maximum possible tilt angle obtained when the first downstream fin 37 tilts downward from the neutral position.

As described above, at the tilt position, the downstream portion 36d is tilted at an angle larger than the angle at which the first downstream fin 36 of the first embodiment is tilted with respect to the inflow direction. Thus, the maximum tilt angle $\alpha 2$ of the third embodiment is larger than that of the first embodiment.

(3-3') As described above in (3-1') and (3-2'), the blowing direction of the air-conditioning air A1 in the up-down direction is changed. Thus, in the same manner as (3-3) in the first embodiment, downstream fins do not need to be disposed on the upstream side of the intermediate portion of the outlet port 17 in the up-down direction. This reduces the pressure loss.

(3-7) In the field of automobiles, there is a demand to reduce the dimension of an instrument panel in the up-down direction (i.e., to reduce the thickness of the instrument panel). Thus, when the upper surface of the instrument panel is lowered, the low-profile air-conditioning register 10 is accordingly disposed at a lower position.

When the low-profile air-conditioning register 10 is located at a relatively low position as described above and the maximum tilt angle $\alpha 1$ is relatively small, the air-conditioning air A1 can be blown toward a section from the abdominal region to the throat of an occupant, for example. However, the air-conditioning air A1 may be unable to be blown toward the head or the like above the throat.

As described in (3-1'), the third embodiment provides a larger maximum tilt angle $\alpha 1$. Thus, even when the low-profile air-conditioning register 10 of the third embodiment is installed at a relatively low position of the instrument panel as described above, the third embodiment allows the air-conditioning air A1 to strike a relatively wide section including the abdominal region and the head of the occupant.

(3-8) As described above, the flow direction of the air-conditioning air A1 can be changed to the lower or upper side more greatly when the first downstream fins 36, 37 are bent than when they are not bent (i.e., are flat).

As shown in FIGS. 31 and 32, a possible maximum value of the angle formed by the direction in which the air-conditioning air A1 is blown upward from the outlet port 17 with respect to the inflow direction is referred to as a direction angle $\beta 1$. A possible maximum value of the angle formed by the direction in which the air-conditioning air A1 is blown downward from the outlet port 17 with respect to the inflow direction is referred to as a direction angle $\beta 2$.

The first downstream fins 36, 37 do not extend to the downstream side of the outlet port 17. Thus, the direction angle $\beta 1$ is smaller than the maximum tilt angle at, and the direction angle $\beta 2$ is smaller than the maximum tilt angle $\alpha 2$.

In the low-profile air-conditioning register 10 of the present embodiment, the first downstream fins 36, 37 are disposed upstream of the opposite ends only in the direction along the short side portions 18. In this configuration, the air-conditioning air A1 flowing near the intermediate portion in the direction along the short side portions 18 travels straight instead of being guided by the fins. Thus, the direction angles $\beta 1$, $\beta 2$ tend to be relatively small.

Study was conducted to find the relationship between the degree of bending (first tilt angles $\theta 1b$, $\theta 1d$) in the first downstream fins 36, 37 and the direction angles $\beta 1$, $\beta 2$.

When at least one of the first tilt angles $\theta 1b$, $\theta 1d$ was less than 15°, the direction angles $\beta 1$, $\beta 2$ were less than 21°. When the first tilt angles $\theta 1b$, $\theta 1d$ were 15° or greater, the direction angles $\beta 1$, $\beta 2$ were 22.9° to 24.0°. In other words, the angle changed in the flow direction is larger when the first tilt angles $\theta 1b$, $\theta 1d$ are 15° or greater than that when the first tilt angles $\theta 1b$, $\theta 1d$ are less than 15°.

Based on this relationship, the first tilt angles $\theta 1b$, $\theta 1d$ are set to 15° or greater in the third embodiment. This provides larger direction angles $\theta 1$, $\beta 2$ (the angle changed in the flow direction). Accordingly, the air-conditioning air A1 is blown out from the outlet port 17 over a wider angle range in the up-down direction.

(3-9) As described above, the first tilt angles θ1b, θ1d are preferably greater than or equal to 15°. However, as the first tilt angles θ1b, θ1d increase, the degree of bending of the first downstream fins 36, 37 increases. Accordingly, the installment space for the first downstream fin 36, 37 becomes larger in the direction along the short side portion 18. Further, the dimensions of the fin accommodation portions 34a, 35a in the up-down direction becomes larger. Furthermore, the dimension of the downstream outer retainer 13 in the up-down direction becomes larger. This may cause the downstream outer retainer 13 to interfere with its peripheral members. Thus, it is desired that the first tilt angles θ1b, θ1d be relatively large on condition that such interference does not occur.

Fourth Embodiment

The low-profile air-conditioning register 10 for the vehicle according to the fourth embodiment will now be described with reference to FIGS. 33 to 37.

Figure 33:
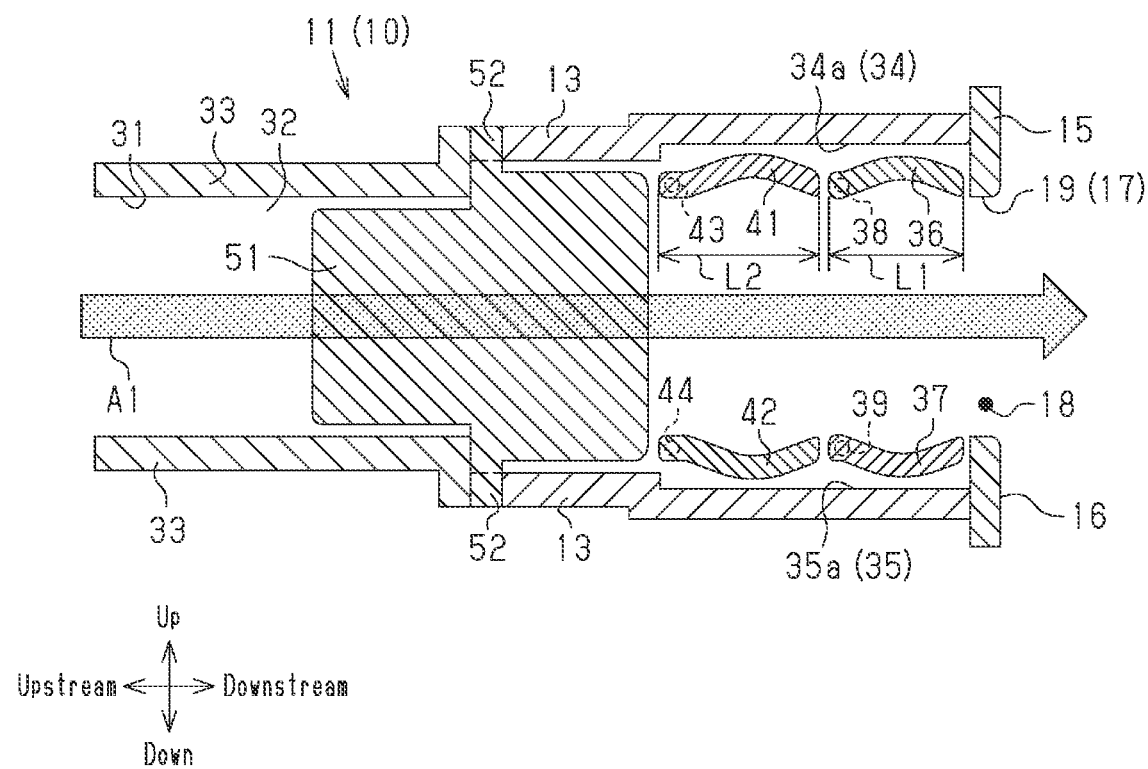
FIG. 33 is a side cross-sectional view of the low-profile air-conditioning register in which all the downstream fins are located at the neutral position in a fourth embodiment.

As shown in FIG. 33, the fourth embodiment is different from the first embodiment in the shapes of the two second downstream fins 41, 42. Accordingly, the shapes of the fin accommodation chambers 34, 35 are different from those of the third embodiment.

The upper fin accommodation chamber 34 includes only the fin accommodation portion 34a. The lower fin accommodation chamber 35 includes only the fin accommodation portion 35a. Thus, the portions of the fin accommodation chambers 34, 35 in which the second downstream fins 41, 42 are accommodated are enlarged in the up-down direction in the same manner as the portions of the fin accommodation chambers 34, 35 in which the first downstream fins 36, 37 are accommodated.

Figure 34:
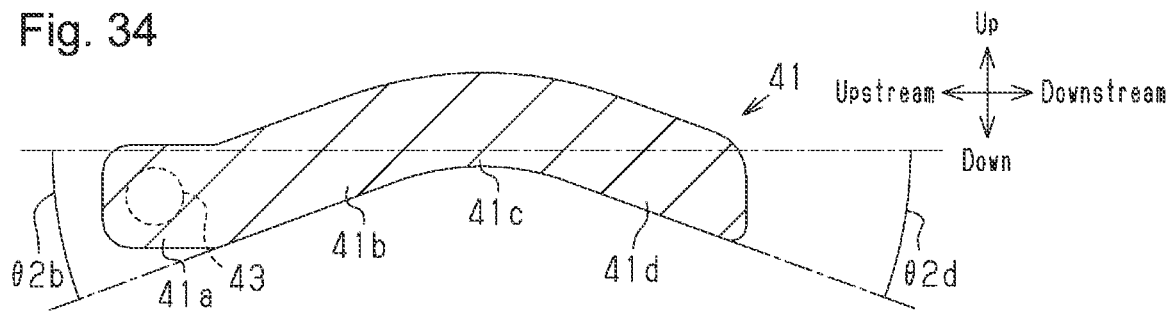
FIG. 34 is an enlarged side cross-sectional view showing the upper second downstream fin in FIG. 33.

As shown in FIGS. 33 and 34, the upper second downstream fin 41 includes an upstream end 41a, an upstream portion 41b, an intermediate portion 41c, and a downstream portion 41d arranged in this order from the upstream side toward the downstream side. The upstream end 41a includes the two fin shafts 43. The two fin shafts 43 are respectively supported by the upper ends of the two vertical walls 32 at positions further upstream of the fin shafts 38.

The upstream portion 41b and the downstream portion 41d of the upper second downstream fin 41 are bent to become farther from the intermediate portion 41c toward the inner side (lower side) of the air passage 31 as the upstream portion 41b and the downstream portion 41d become farther from the intermediate portion 41c in the flow direction.

Figure 35:
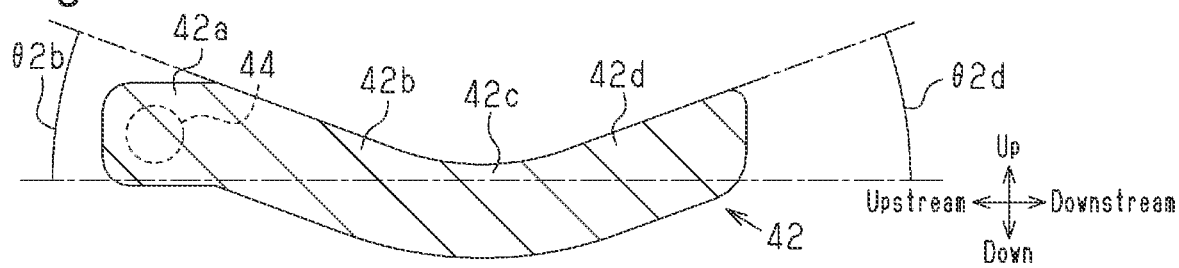
FIG. 35 is an enlarged side cross-sectional view showing the lower second downstream fin in FIG. 33.

As shown in FIGS. 33 and 35, the lower second downstream fin 42 includes an upstream end 42a, an upstream portion 42b, an intermediate portion 42c, and a downstream portion 42d arranged in this order from the upstream side toward the downstream side. The upstream end 42a includes the two fin shafts 44. The two fin shafts 44 are respectively located below the two fin shafts 43. The two fin shafts 44 are respectively supported by the lower ends of the two vertical walls 32 at positions further upstream from the fin shafts 39.

The upstream portion 42b and the downstream portion 42d of the lower second downstream fin 42 are bent to become farther from the intermediate portion 42c toward the inner side (upper side) of the air passage 31 as the upstream portion 42b and the downstream portion 42d become farther from the intermediate portion 42c in the flow direction.

The intermediate portion 41c of the second downstream fin 41 is curved to bulge upward. The upstream end 41a, the upstream portion 41b, and the downstream portion 41d have a flat shape.

The intermediate portion 42c of the first downstream fin 42 is curved to bulge downward. The upstream end 42a, the upstream portion 42b, and the downstream portion 42d have a flat shape.

To express the degree of bending of the first downstream fin 41, 42, the angle formed by the upstream portion 41b, 42b with respect to the inflow direction of the air-conditioning air A1 when the second downstream fin 36, 37 is located at a neutral position (described later) is referred to as a second tilt angle θ2b. The angle formed by the downstream portion 41d, 42d with respect to the inflow direction is referred to as a second tilt angle θ2d. In the fourth embodiment, each of the second tilt angles θ2b, θ2d is set to 15° or greater.

Figure 36:
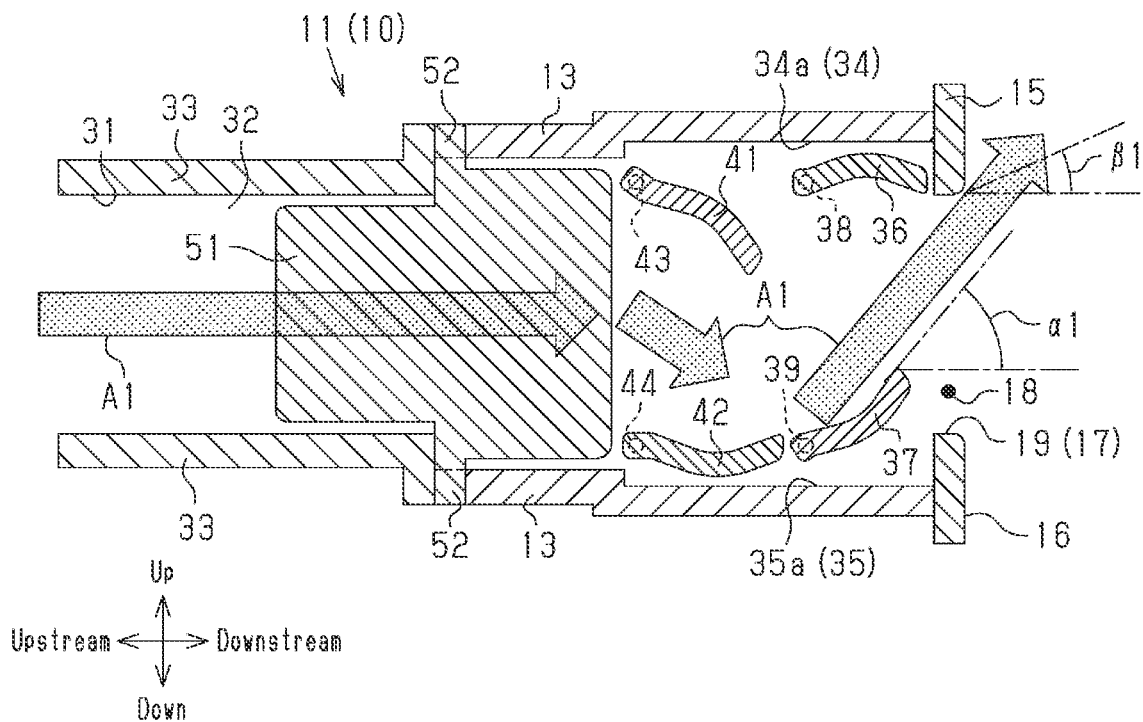
FIG. 36 is a side cross-sectional view of the low-profile air-conditioning register when the operation knob is operated upward from the state shown in FIG. 33.
Figure 37:
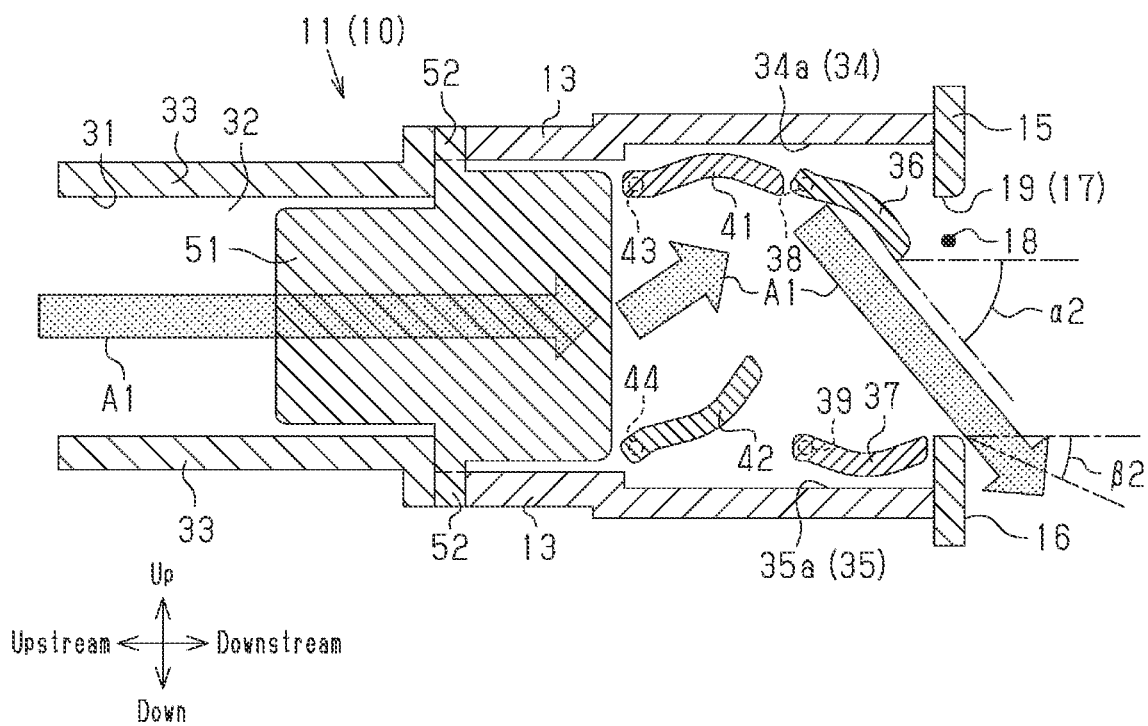
FIG. 37 is a side cross-sectional view of the low-profile air-conditioning register when the operation knob is operated downward from the state shown in FIG. 33.

The second downstream fin 41 is tiltable about the two fin shafts 43 between the neutral position (FIGS. 33 and 37) and a tilt position (FIG. 36). The second downstream fin 42 is tiltable about the two fin shafts 44 between the neutral position (FIGS. 33 and 36) and a tilt position (FIG. 37).

At the neutral position, each of the second downstream fins 41, 42 extends along the inflow direction of the air-conditioning air A1. At the neutral position, the downstream portions 41d, 42d are located downstream of the upstream portions 41b, 42b.

At the tilt position, each of the second downstream fins 41, 42 is tilted with respect to the inflow direction such that it approaches the inner side of the air passage 31 toward the downstream side. At the tilt position, the downstream portions 41d, 42d are located inward of the upstream portions 41b, 42b in the air passage 31.

When the second downstream fins 41, 42 are each located at the neutral position, at least part of (in the fourth embodiment, the entirety of) the first downstream fins 36, 37 in the thickness direction (up-down direction) is accommodated in the fin accommodation portions 34a, 35a.

In at least part of the first downstream fins 36, 37 and the second downstream fins 41, 42 in the left-right direction, length L2 of the second downstream fins 41, 42 in the flow direction of the air-conditioning air A1 is set to be longer than length L1 of the first downstream fins 36, 37 (see FIG. 33). This feature is the same as that of the third embodiment.

Other than the above differences, the fourth embodiment is the same as the third embodiment. Thus, like or the same reference numerals are given to those components that are like or the same as the corresponding components of the third embodiment and redundant explanations are omitted.

The operation of the fourth embodiment will now be described. The advantages resulting from the operation will also be described. In the fourth embodiment, only the shapes of the fin accommodation chambers 34, 35 and the second downstream fins 41, 42 of the third embodiment are changed.

The fourth embodiment thus provides the same operation and advantages as the third embodiment. In addition to the ones listed above, the fourth embodiment achieves the following operation and advantages.

In the following, items in which a double prime symbol (″) is added to the last number in parentheses correspond to items with the same number in which the double prime symbol (″) is not added to the last number in the first embodiment. For example, (3-1") in the fourth embodiment corresponds to (3-1') in the third embodiment.

(1) When Operation Knob 55 is at Reference Position (1-1") FIGS. 33 to 35 show the state of each component of the low-profile air-conditioning register 10 when the operation knob 55 is located at the reference position. Each of the upstream fins 51, the first downstream fins 36, 37, and the second downstream fins 41, 42 is held at the neutral position.

The air-conditioning air A1 that has passed through the upstream fin 51 flows between the second downstream fins 41, 42. Each of the second downstream fins 41, 42 is bent. However, the second downstream fins 41, 42 respectively include the downstream portions 41d, 42d on the downstream side of the upstream portions 41b. 42b. Thus, most of the air-conditioning air A1 flows between the two first downstream fins 41, 42 in the same direction as the inflow direction, and is then blown out straight from the outlet port 17 toward the downstream side.

(3) When Operation Knob 55 is Operated in Up-Down Direction (3-1") When the operation knob 55 at the reference position is operated upward, the upper first downstream fin 36 and the lower second downstream fin 42 are both held at the neutral position as shown in FIG. 36.

The lower first downstream fin 37 is tilted inward (upward) in the air passage 31 about the fin shafts 39. With this tilting, the upper second downstream fin 41 at the diagonal position is tilted toward the tilt position. When tilted to the tilt position, the second downstream fin 41 is tilted to become higher toward the downstream side.

Specifically, at the tilt position, the upstream portion 41b of the second downstream fin 41 is tilted with respect to the inflow direction of the air-conditioning air A1. In addition, the downstream portion 41d is tilted at an angle larger than the angle at which the upstream portion 41b is tilted with respect to the inflow direction. The tilt angle of the downstream portion 41d is larger than the tilt angle of the second downstream fin 41 in the third embodiment. The downstream portion 41d becomes closer to the inner (lower) side of the air passage 31 than the upstream portion 41b.

The air-conditioning air A1 flowing through the upper portion of the air passage 31 flows along the second downstream fin 41. This changes the flow direction of the air-conditioning air A1 to a direction inward (downward) in the air passage 31. As described above, the tilt angle of the downstream portion 41d is larger than the tilt angle of the second downstream fin 41 in the third embodiment. Thus, the air-conditioning air A1 flowing along the second downstream fin 41 (in particular, along the downstream portion 41d) is collected on the tilted first downstream fin 37 and the second downstream fin 42 at the neutral position and strikes the first downstream fin 37 and the second downstream fin 42. A larger amount of air-conditioning air A1 than that in the third embodiment strikes the first downstream fin 37 and the second downstream fin 42. As a result, a larger amount of the air-conditioning air A1 flows along the first downstream fins 37 so that the flow direction of the larger amount of the air-conditioning air A1 is greatly changed upward and is blown out obliquely upward from the outlet port 17 at a relatively large direction angle β1.

When the tilted operation knob 55 is operated downward as described above, the first downstream fin 37 and the second downstream fin 41 are each returned to the neutral position whereas the first downstream fin 36 and the second downstream fin 42 are each held at the neutral position as shown in FIGS. 33 and 36.

(3-2") When the operation knob 55 at the reference position is operated downward, the lower first downstream fin 37 and the upper second downstream fin 41 are both held at the neutral position as shown in FIG. 37.

The upper first downstream fin 36 is tilted inward (downward) in the air passage 31 about the fin shafts 38. With this tilting, the lower second downstream fin 42 at the diagonal position is tilted toward the tilt position. When tilted to the tilt position, the second downstream fin 42 is tilted to become higher toward the downstream side.

Specifically, at the tilt position, the upstream portion 42b of the second downstream fin 42 is tilted with respect to the inflow direction of the air-conditioning air A1. In addition, the downstream portion 42d is tilted at an angle larger than the angle at which the upstream portion 42b is tilted with respect to the inflow direction. The tilt angle of the downstream portion 42d is larger than the tilt angle of the second downstream fin 42 in the third embodiment. The downstream portion 42d becomes closer to the inner (upper) side of the air passage 31 than the upstream portion 42b.

The air-conditioning air A1 flowing through the lower portion of the air passage 31 flows along the second downstream fin 42. This changes the flow direction of the air-conditioning air A1 to a direction inward (downward) in the air passage 31. As described above, the tilt angle of the downstream portion 42d is larger than the tilt angle of the second downstream fin 42 in the third embodiment. Thus, the air-conditioning air A1 flowing along the second downstream fin 42 (in particular, along the downstream portion 42d) is collected on the tilted first downstream fin 36 and the second downstream fin 41 at the neutral position and strikes the first downstream fin 36 and the second downstream fin 41. A larger amount of air-conditioning air A1 than that in the third embodiment strikes the first downstream fin 36 and the second downstream fin 41. As a result, a larger amount of the air-conditioning air A1 flows along the first downstream fins 37 so that the flow direction of the larger amount of the air-conditioning air A1 is changed and is blown out obliquely downward from the outlet port 17 at a relatively large direction angle β2.

When the tilted operation knob 55 is operated upward as described above, the first downstream fin 36 and the second downstream fin 42 are each returned to the neutral position whereas the first downstream fin 37 and the second downstream fin 41 are each held at the neutral position as shown in FIGS. 33 and 37.

The above embodiments may be modified as follows. The above embodiments and the following modifications can be combined as long as the combined modifications remain technically consistent with each other.

Bezel 15

The bezel 15 may be tilted with respect to the vertical plane. In this case, the design surface 16, the outlet port 17, the window 21, and the like are also tilted with respect to the vertical plane.

Downstream Fins

When the first downstream first downstream fin 36 and the second downstream fin 41 are each located at the neutral position, only a portion thereof in the thickness direction may be accommodated in the upper fin accommodation chamber 34.

When the first downstream fin 37 and the second downstream fin 42 are each located at the neutral position, only a portion thereof in the thickness direction may be accommodated in the lower fin accommodation chamber 35.

In this case, as the portions of the first downstream fins 36, 37 and the second downstream fins 41, 42 exposed from the fin accommodation chambers 34, 35 increase, the actual opening area of the outlet port 17 decreases.

The length of each of the portion exposed from the upper fin accommodation chamber 34 and the portion exposed from the lower fin accommodation chamber 35 in the direction along the short side portion 18 is referred to as the length of the exposed portion.

For the ventilation resistance and pressure loss to fall within an allowable range, it is preferred that the length of each of the upper and lower exposed portions be less than or equal to 2 mm when the length of the short side portion 18 is between 15 mm and 23 mm.

In the first downstream fins 36, 37 and the second downstream fins 41, 42 adjacent thereto on the upstream side, the positions having the relationship of L2>L1 in the left-right direction may be changed to positions different from those in the above embodiments.

For example, in the same manner as the low-profile air-conditioning register 10 shown as the comparative example in FIG. 23, the entirety in the left-right direction may satisfy the relationship L2>L1.

In the fourth embodiment, one of the second downstream fins 41, 42 may be flat in the same manner as the third embodiment, instead of being bent.

In the third and fourth embodiments, the positions and lengths of the curved portions of the first downstream fins 36, 37 may be changed. The entire first downstream fins 36, 37 may be curved.

Similarly, in the fourth embodiment, the position and the length of the curved portions of the second downstream fins 41, 42 may be changed. The entire second downstream fins 41, 42 may be curved.

In the third and fourth embodiments, a flat portion extending in the inflow direction of the air-conditioning air A1 may be disposed at a position adjacent to each of the downstream portions 36d, 37d of the first downstream fins 36, 37 on the downstream side. It is desired that the length of the flat portion in the flow direction of the air-conditioning air A1 be less than or equal to than 0.5 mm to greatly increase the direction angles β1, β2.

At least one of the first tilt angles θ1b, θ1d may be set to less than 15°. At least one of the first tilt angles θ2b, θ2d may be set to less than 15°.

In the third embodiment, when the second downstream fins 41, 42 are each located at the neutral position, it is desired that the gap between the second downstream fin 41 and its adjacent horizontal wall 33 be relatively small. For example, when the gap is set to 1 mm and a value larger than 1 mm, 1 mm is desired. The reason is as follows. When the first downstream fins 36, 37 on the downstream side of the second downstream fins 41, 42 are each located at the tilt position, the air-conditioning air A1 passing through the gap increases as the gap increases. The air-conditioning air A1 striking the first downstream fins 36, 37 on the downstream side decreases accordingly. Thus, the air-conditioning air A1 cannot efficiently strike the first downstream fins 36, 37 on the downstream side. As a result, the direction angles β1, β2 decrease.

The fin shafts 38 of the first downstream fin 36 may be supported by a bearing member coupled to the retainer 11.

The fin shafts 39 of the first downstream fin 37 may be supported by a bearing member coupled to the retainer 11.

The fin shafts 43 of the second downstream fin 41 may be supported by a bearing member coupled to the retainer 11.

The fin shafts 44 of the second downstream fin 42 may be supported by a bearing member coupled to the retainer 11.

Operation Portion

The operation portion operated by the occupant to change the blowing direction of the air-conditioning air A1 from the outlet port 17 is not limited to the operation knob 55. The operation unit may be a push button. The operating portion may be located outside the retainer. The operation unit may include a touch panel that is different from the low-profile air-conditioning register so that each fin may be tilted by the occupant touching the touch panel.

Downstream Transmission Mechanism 61

The upper cam hole 64 and the lower cam hole 65 shown in FIG. 9 and the like may be changed to grooves (cam grooves) that do not extend through the coupling plate 63.

The shapes of the driving gears 71, 72 and the driven gears 73, 74 shown in FIGS. 10 and 11 and the like may be changed from those of the above embodiments.

The downstream transmission mechanism 61 may be a mechanism having a configuration different from that of the first embodiment. For example, the downstream transmission mechanism may include a motor that is driven in response to an operation performed on the operation unit by the occupant.

Support Walls 91

Figure 38:
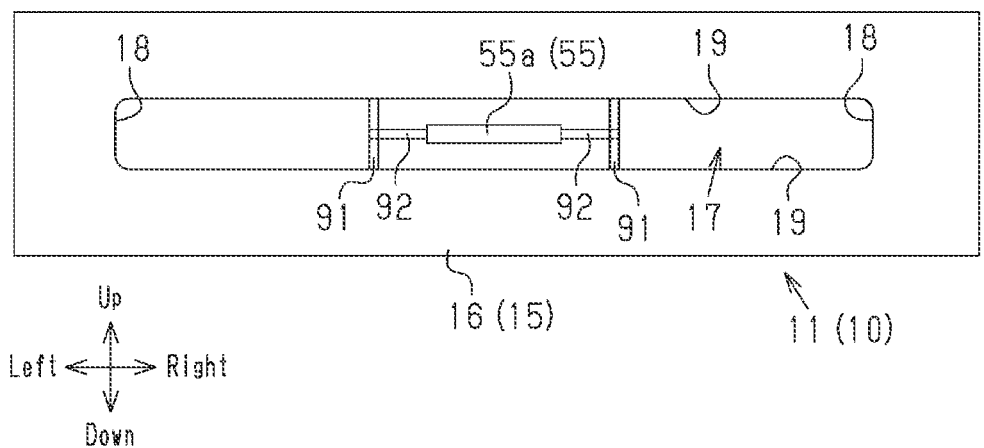
FIG. 38 is a front view of a modification of the second embodiment, showing the low-profile air-conditioning register corresponding to FIG. 25.
Figure 39:
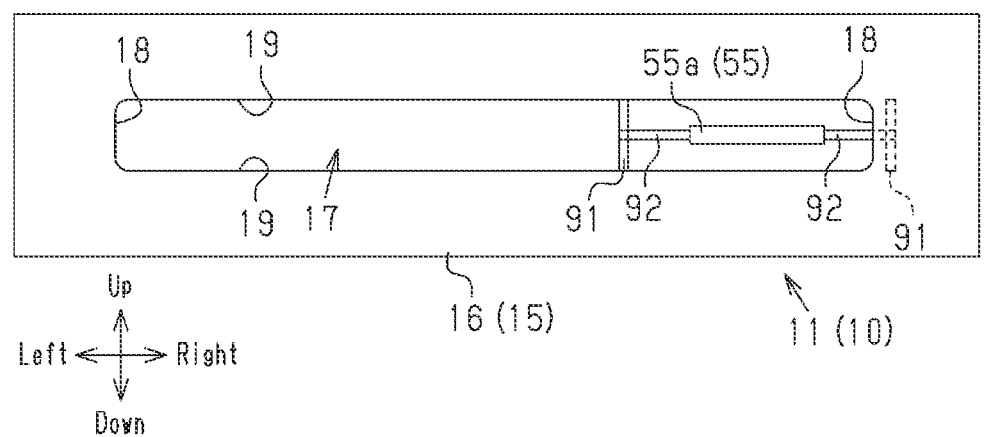
FIG. 39 is a front view of a modification of the second embodiment, showing the low-profile air-conditioning register corresponding to FIG. 25 in the same manner as FIG. 38.

The support walls 91, which support the support shaft 92 of the operation knob 55, may be located at positions different from those in the second embodiment. FIG. 38 and FIG. 39 show an example thereof.

FIG. 38 shows a modification in which the two support walls 91 are located at the intermediate portion of the outlet port 17 in the left-right direction and located upstream of portions sandwiching the central portion.

FIG. 39 shows a modification in which one (left) support wall 91 is located upstream of the outlet port 17 and the other (right) support wall 91 is located inside the retainer 11 and upstream of a position outward (rightward in FIG. 39) from the outlet port 17.

In each of the modifications shown in FIGS. 38 and 39, the two support walls 91 are located at positions where the support walls 91 do not interfere with (do not come into contact with) each other even when the operation knob 55 moves to an end of a movable region in the left-right direction.

Upstream Transmission Mechanism 81

The upstream transmission mechanism 81 may have a configuration different from that of the first embodiment. For example, the upstream transmission mechanism may include a motor that is driven in response to an operation performed on the operation unit by the occupant.

Applicability

The low-profile air-conditioning register 10 can also be employed in a low-profile air-conditioning register disposed at a place different from the instrument panel in the passenger compartment (e.g., a dashboard).

The low-profile air-conditioning register 10 does not have to be employed in vehicles and can be widely employed if the direction of the air-conditioning air A1 delivered from the air conditioner and blown into the passenger compartment can be changed by the upstream fins 51 and the downstream fins.

Other Modifications

Figure 40:
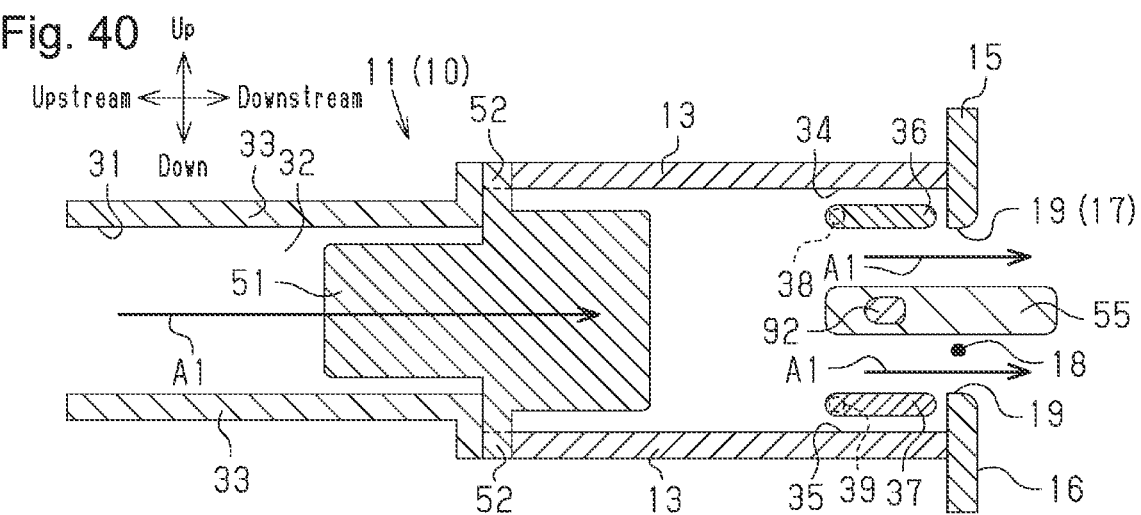
FIG. 40 is a side cross-sectional view of a modification in which the downstream fins only include two first downstream fins, showing the low-profile air-conditioning register in which the two first downstream fins are each located at the neutral position.
Figure 41:
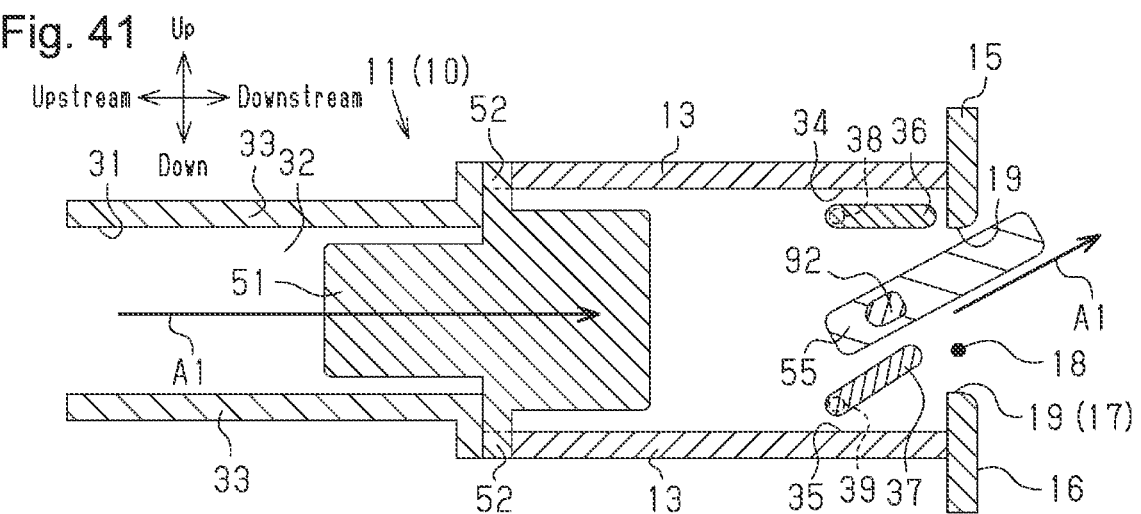
FIG. 41 is a side cross-sectional view of the low-profile air-conditioning register when the operation knob is operated upward from the state shown in FIG. 40.
Figure 42:
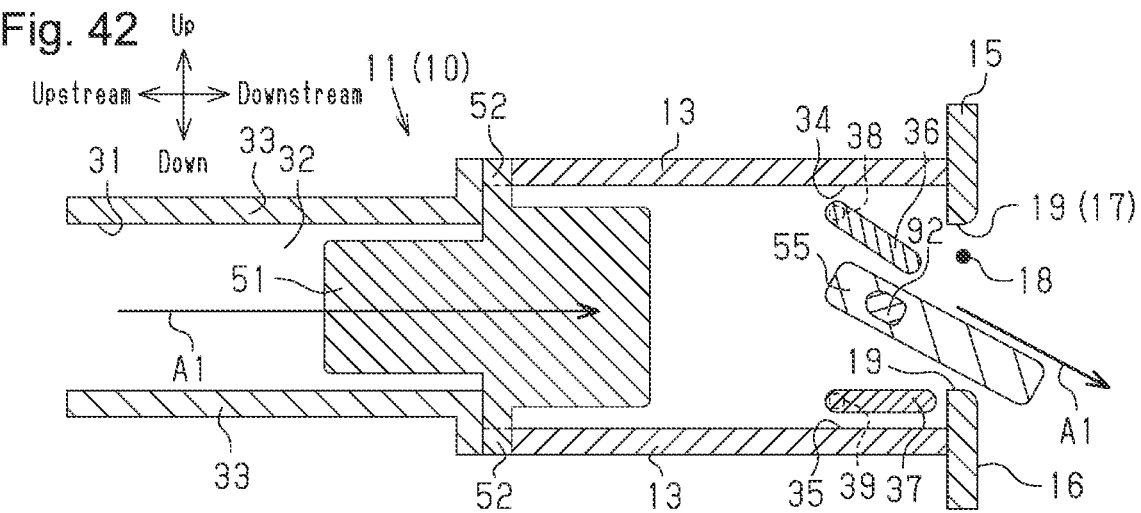
FIG. 42 is a side cross-sectional view of the low-profile air-conditioning register when the operation knob is operated downward from the state shown in FIG. 40.

As shown in FIGS. 40 to 42, the downstream fins may include only the two first downstream fins 36, 37. This modification includes an upstream transmission mechanism (not shown) and a downstream transmission mechanism (not shown). The downstream transmission mechanism has a function that is different from that of the second embodiment. That is, the function of this downstream transmission mechanism is to transmit the movement of the operation knob 55 in the up-down direction to the two first downstream fins 36, 37 to tilt them.

In this modification, as shown in FIG. 40, when the operation knob 55 is located at the reference position, the first downstream fins 36, 37 are each held at the neutral position.

Thus, the air-conditioning air A1 flows along the upstream fins 51 and the vertical walls 32, then flows along the first downstream fins 36, 37, and is blown out straight to the downstream side from the outlet port 17.

As shown in FIG. 41, when the operation knob 55 is operated upward about the support shafts 92, the movement of the operation knob 55 is transmitted to the two first downstream fins 36, 37 by the downstream transmission mechanism. This tilts the lower first downstream fin 37 inward (upward) in the air passage 31 about the fin shafts 39 so that the lower first downstream fin 37 is tilted to become higher toward the downstream side. The upper first downstream fin 36 is held at the neutral position.

The flow direction of the air-conditioning air A1 is changed by the first downstream fins 37 so that the air-conditioning air A1 is blown out obliquely upward from the outlet port 17.

As shown in FIG. 42, when the operation knob 55 is operated downward about the support shafts 92, the movement of the operation knob 55 is transmitted to the first downstream fins 36, 37 by the downstream transmission mechanism. This tilts the upper first downstream fin 36 inward (downward) in the air passage 31 about the fin shaft 38 so that the upper first downstream fin 36 is tilted to become lower toward the downstream side. The lower first downstream fin 37 is held at the neutral position.

The flow direction of the air-conditioning air A1 is changed by the first downstream fins 36 so that the air-conditioning air A1 is blown out obliquely downward from the outlet port 17.

When the operation knob 55 of FIG. 41 is operated downward or when the operation knob 55 of FIG. 42 is operated upward, the downstream transmission mechanism performs an operation opposite to that described above. As shown in FIG. 40, while one of the first downstream fins 36, 37 is held at the neutral position, the other one, which has been tilted, is returned to the neutral position.

Thus, the blowing direction of the air-conditioning air A1 from the outlet port 17 can be changed in the up-down direction by holding one of the first downstream fins 36, 37 at the neutral position and tilting the other in response to an operation performed on the operation knob 55 in the up-down direction.

This provides the same advantages as (3-3) and (3-4): that is, the advantages of reducing the influence of the downstream fins on the actual opening area of the outlet port 17 and limiting an increase in the ventilation resistance due to the downstream fins, thereby reducing the pressure loss.

In this modification, the operation knob 55 may be inserted into the outlet port 17 in the same manner as the second embodiment, or may be located outside the outlet port 17 in the same manner as the first embodiment. Further, in the same manner as the third and fourth embodiments, the first downstream fins 36, 37 may be bent or curved.

Figure 43:
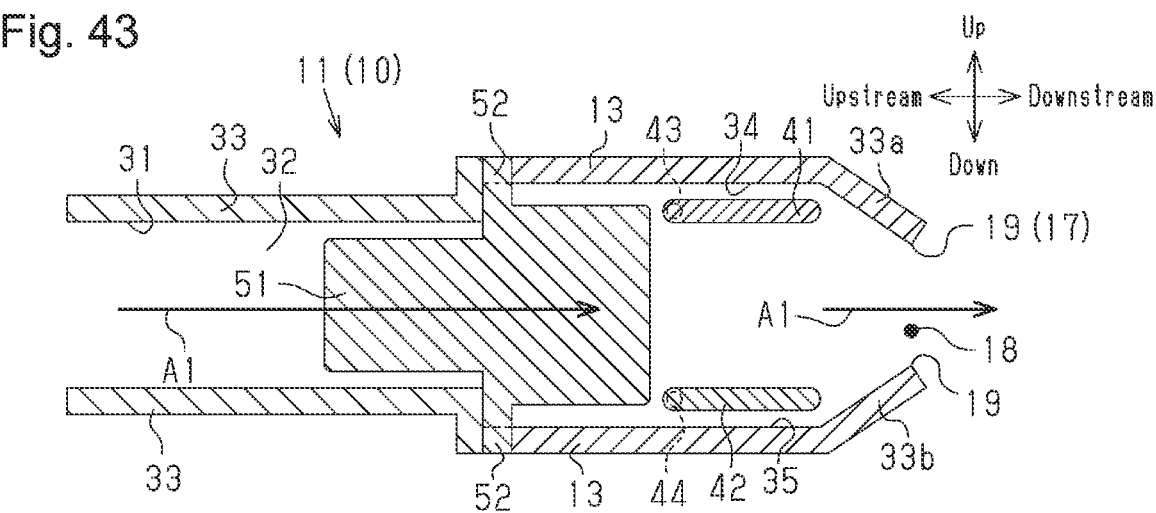
FIG. 43 is a side cross-sectional view of a modification in which the downstream fins only include two second downstream fins, showing the low-profile air-conditioning register in which the two second downstream fins are each located at the neutral position.
Figure 44:
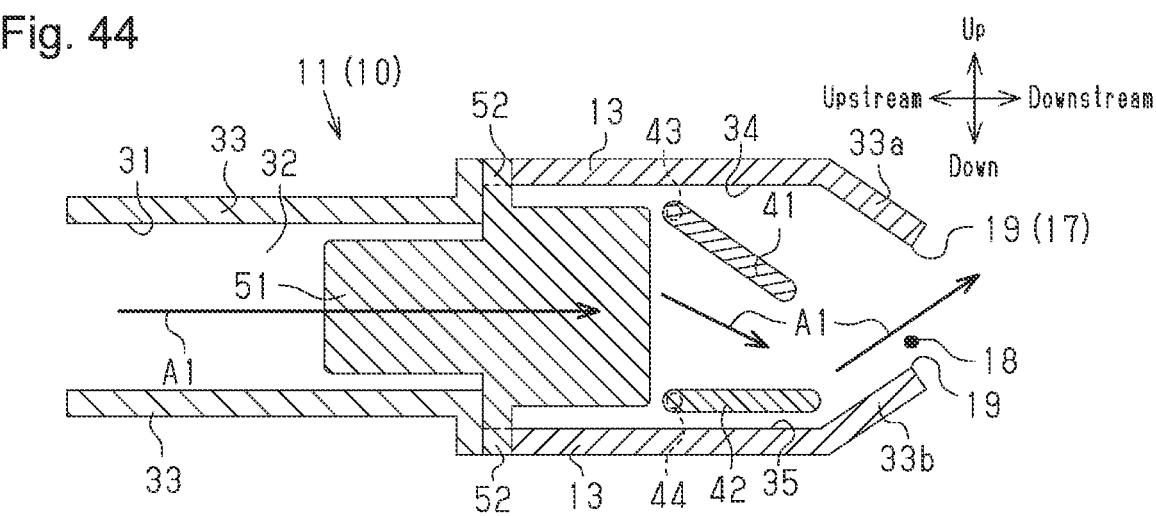
FIG. 44 is a side cross-sectional view of the low-profile air-conditioning register when the operation knob is operated upward from the state shown in FIG. 43.
Figure 45:
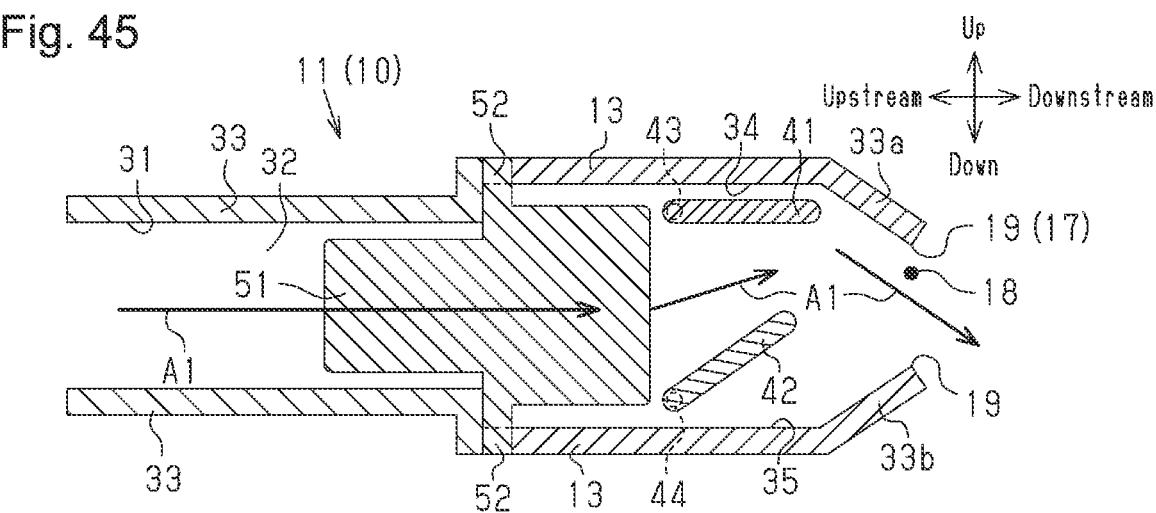
FIG. 45 is a side cross-sectional view of the low-profile air-conditioning register when the operation knob is operated downward from the state shown in FIG. 43.

As shown in FIGS. 43 to 45, in the second embodiment, the downstream fins may include only two second downstream fins 41, 42. Instead of the first downstream fin 36, a portion of the upper horizontal wall 33 adjacent to the long side portion 19 on the upstream side (hereinafter referred to as a downstream portion 33a) may be tilted to become lower toward the downstream side. Likewise, instead of the first downstream fin 37, a portion of the lower horizontal wall 33 adjacent to the long side portion 19 on the downstream side (hereinafter referred to as a downstream portion 33b) may be tilted to become higher toward the downstream side. In other words, the downstream portions 33a, 33b may be tilted such that the distance therebetween decreases toward the downstream side.

This modification includes an upstream transmission mechanism (not shown) and a downstream transmission mechanism (not shown). The downstream transmission mechanism has a function that is different from that of the first embodiment. That is, the function of this downstream transmission mechanism is to transmit the movement of the operation knob in the up-down direction to the two second downstream fins 41, 42 to tilt them. It is preferred that the second downstream fins 41, 42 be tilted in a direction opposite to the operation direction of the operation knob. This is because the air-conditioning air A1 is blown out from the outlet port 17 in the same direction as the direction in which the operating knob is operated.

The operation knob may be located outside the outlet port 17 in the same manner as the first embodiment, or may be inserted into the outlet port 17 in the same manner as the second embodiment. There may be a bezel or may be no bezel.

In this modification, as shown in FIG. 43, when the operation knob (not shown) is located at the reference position, the second downstream fins 41, 42 are each held at the neutral position.

Thus, the air-conditioning air A1 flows along the upstream fins 51 and the vertical wall 32, then flows along the second downstream fins 41, 42, and is blown out straight downstream from the outlet port 17.

When the operation knob at the reference position is operated upward, for example, as shown in FIG. 44, the movement of the operation knob is transmitted to the two second downstream fins 41, 42 by the downstream transmission mechanism. This tilts the upper second downstream fin 41 inward (downward) in the air passage 31 about the fin shaft 43 so that the upper second downstream fin 41 is tilted to become lower toward the downstream side. The lower second downstream fin 42 is held at the neutral position.

The air-conditioning air A1 flowing through the upper portion of the air passage 31 flows along the second downstream fin 41. This changes the flow direction of the air-conditioning air A1 to a direction inward (downward) in the air passage 31.

The tilted second downstream fin 41 faces the downstream portion 33b that is tilted toward the opposite side. Thus, the air-conditioning air A1 that has flowed along the second downstream fin 41 is collected on the downstream portion 33b and strikes the downstream portion 33b so that the air-conditioning air A1 flows along the downstream portion 33b. This changes the flow direction of the air-conditioning air A1 so that the air-conditioning air A1 is blown out obliquely upward from the outlet port 17.

When the operation knob at the reference position is operated downward, for example, as shown in FIG. 45, the movement of the operation knob is transmitted to the two second downstream fins 41, 42 by the downstream transmission mechanism.

This tilts the lower second downstream fin 42 inward (upward) in the air passage 31 about the fin shaft 44 so that the lower second downstream fin 42 is tilted to become higher toward the downstream side. The upper second downstream fin 41 is held at the neutral position.

The air-conditioning air A1 flowing through the lower portion of the air passage 31 flows along the second downstream fin 42. This changes the flow direction of the air-conditioning air A1 to a direction inward (downward) in the air passage 31.

The tilted second downstream fin 42 faces the downstream portion 33a that is tilted toward the opposite side. Thus, the air-conditioning air A1 that has flowed along the second downstream fin 42 is collected on the downstream portion 33a and strikes the downstream portion 33a so that the air-conditioning air A1 flows along the downstream portion 33a. This changes the flow direction of the air-conditioning air A1 so that the air-conditioning air A1 is blown out obliquely downward from the outlet port 17.

When the operation knob of FIG. 44 is operated downward or when the operation knob of FIG. 45 is operated upward, the downstream transmission mechanism performs an operation opposite to that described above. As shown in FIG. 43, while one of the second downstream fins 41, 42 is held at the neutral position, the other one, which has been tilted, is returned to the neutral position.

Thus, the blowing direction of the air-conditioning air A1 from the outlet port 17 can be changed in the up-down direction by holding one of the second downstream fins 41, 42 at the neutral position and tilting the other in response to an operation performed on the operation knob 55 in the up-down direction. This eliminates the need for disposing an additional downstream fin on the upstream side of an intermediate portion of the outlet port 17 in the up-down direction to change the blowing direction of the air-conditioning air A1 in the up-down direction.

This modification provides the same advantages as (3-3) and (3-4); that is, the advantages of reducing the influence of the downstream fins on the actual opening area of the outlet port 17 and limiting an increase in the ventilation resistance due to the downstream fins, thereby reducing the pressure loss.

In the same manner as the fourth embodiment, the second downstream fins 41, 42 may be bent or curved.

The low-profile air-conditioning register 10 may also be employed in a low-profile air-conditioning register in which the long side portions 19 of the outlet port 17 extend in the up-down direction and the short side portions 18 extend in the horizontal direction. The low-profile air-conditioning register 10 may also be employed in a low-profile air-conditioning register in which the short side portions 18 and the long side portions 19 of the outlet port 17 extend in a direction tilted with respect to the up-down direction and the horizontal direction. Further, the shape of the outlet port 17 may be a shape other than a rectangle, such as a horizontally long hexagon, a vertically long hexagon, a trapezoid, a stadium shape, or an oval shape.

Although the embodiments have been described herein, it will be clear to those skilled in the art that the present invention may be embodied in different specific forms without departing from the spirit of the invention The disclosure is not to be limited to the details given herein, but may be modified within the scope and equivalence of the appended claims.

The invention claimed is:

1. A low-profile air-conditioning register, comprising:
a retainer including an air passage having an outlet port at a downstream end of the retainer in a flow direction of air-conditioning air; and
an upstream fin and downstream fins located upstream of the outlet port in the air passage, wherein
the downstream fins include:
two facing first downstream fins extending in a longitudinal direction, and
two facing second downstream fins extending in the longitudinal direction of the first downstream fins on an upstream side of the first downstream fins,
each of the first downstream fins includes a fin shaft,
each of the second downstream fins includes a fin shaft,
a flow direction of the air-conditioning air that has passed through the upstream fin and has not passed through the second downstream fins is defined as an inflow direction,
the two first downstream fins and the two second downstream fins are each tiltable about a corresponding one of the fin shafts between a neutral position along the inflow direction and a tilt position tilted with respect to the inflow direction that approaches an inner side of the air passage toward a downstream side, and
the low-profile air-conditioning register further comprises a downstream gearing, wherein when one of the first downstream fins is tilted toward the tilt position, the downstream gearing holds, at the neutral position, an other one of the first downstream fins and one of the second downstream fins located at a diagonal position with respect to the other one of the first downstream fins and tilts, toward the tilt position, one of the second downstream fins located at a diagonal position with respect to the one of the first downstream fins.

2. The low-profile air-conditioning register according to claim 1, wherein
the outlet port includes two facing side portions,
the outlet port is shaped such that a dimension of each one of the two side portions is longer than an interval between the two side portions,
the two first downstream fins extend in a direction along the side portions as the longitudinal direction on an upstream side of the side portions, and face each other in a direction in which the two side portions face each other, and
the two second downstream fins extend in a direction along the side portions on the upstream side of the first downstream fins, and face each other in the direction in which the two side portions face each other.

3. The low-profile air-conditioning register according to claim 2, wherein
a fin accommodation chamber is disposed at each of two positions located outward from the outlet port of the retainer in the direction in which the two side portions face each other, the fin accommodation chambers being located upstream of the outlet port, and
when the first downstream fins and the second downstream fins are each located at the neutral position, at least part of each of the first downstream fins and the second downstream fins in a thickness direction is accommodated in a corresponding one of the fin accommodation chambers.

4. The low-profile air-conditioning register according to claim 1, wherein
a fin accommodation chamber is disposed at each of two positions located outward from the outlet port of the retainer in a direction in which the two first downstream fins face each other, the fin accommodation chambers being located upstream of the outlet port, and when the first downstream fins and the second downstream fins are each located at the neutral position, at least part of each of the first downstream fins and the second downstream fins in a thickness direction is accommodated in a corresponding one of the fin accommodation chambers.

5. The low-profile air-conditioning register according to claim 1, wherein, in at least part of each of the first downstream fins and a corresponding one of the second downstream fins that is adjacent to the first downstream fin on the upstream side in the longitudinal direction, a length of the second downstream fin in the flow direction is set to be longer than a length of the first downstream fin in the flow direction.

6. The low-profile air-conditioning register according to claim 1, wherein
an upstream end of each of the first downstream fins includes the fin shaft,
a downstream end of each of the second downstream fins includes notches recessed toward the upstream side, the notches being respectively located at opposite sides of the second downstream fin in the longitudinal direction,
an upstream end of each of the first downstream fins includes protrusions protruding toward the upstream side, the protrusions being respectively located on the opposite sides of the first downstream fin in the longitudinal direction,
when the first downstream fins and the second downstream fins respectively adjacent to the first downstream fins on the upstream side are each located at the neutral position, the protrusions are respectively configured to be fitted into the notches,
the fin shaft of each of the first downstream fins is located at a corresponding one of the protrusions, and
a length of a portion of each of the second downstream fins sandwiched between the two notches in the flow direction is set to be longer than a length of a portion of a corresponding one of the first downstream fins sandwiched between the two protrusions.

7. The low-profile air-conditioning register according to claim 1, wherein
the first downstream fins each include an upstream portion, an intermediate portion, and a downstream portion from the upstream side toward the downstream side in the flow direction, and
the upstream portion and the downstream portion of each of the first downstream fins are bent or curved to become farther from the intermediate portion toward the inner side of the air passage as the upstream portion and the downstream portion become farther from the intermediate portion in the flow direction.

8. The low-profile air-conditioning register according to claim 7, wherein, when the first downstream fin is located at the neutral position, the upstream portion and the downstream portion are tilted at 15° or greater with respect to the inflow direction.

9. The low-profile air-conditioning register according to claim 1, wherein
at least one of the two second downstream fins includes an upstream portion, an intermediate portion, and a downstream portion from the upstream side toward the downstream side in the flow direction, and
the upstream portion and the downstream portion of the second downstream fin are bent or curved to become farther from the intermediate portion toward the inner side of the air passage as the upstream portion and the downstream portion become farther from the intermediate portion in the flow direction.

10. A low-profile air-conditioning register, comprising:
a retainer including an air passage having an outlet port at a downstream end of the retainer in a flow direction of air-conditioning air;
an upstream fin and downstream fins located upstream of the outlet port in the air passage; and
an operation knob operably disposed on the retainer, wherein
the outlet port includes:
two facing long side portions; and
two facing short side portions that are respectively orthogonal to the long side portions,
the outlet port has a rectangular shape in which a dimension of each of the two long side portions is longer than an interval between the long side portions,
the downstream fins include:
two first downstream fins extending in a direction along the long side portions on an upstream side of the long side portions and facing each other in a direction along the short side portions; and
two second downstream fins extending in the direction along the long side portions on an upstream side of the first downstream fins and facing each other in the direction along the short side portions,
an upstream end of each of the first downstream fins includes a fin shaft,
an upstream end of each of the second downstream fins includes a fin shaft,
the two first downstream fins and the two second downstream fins are supported on the retainer by the fin shafts of the first downstream fins and the fin shafts of the second downstream fins, respectively,
a flow direction of the air-conditioning air that has passed through the upstream fin and has not passed through the second downstream fins is defined as an inflow direction,
the two first downstream fins and the two second downstream fins are each tiltable about a corresponding one of the fin shafts between a neutral position along the inflow direction and a tilt position tilted with respect to the inflow direction that approaches an inner side of the air passage toward a downstream side, and
the low-profile air-conditioning register further comprises a downstream gearing located at a section from the operation knob to the two first downstream fins and the two downstream fins, wherein when one of the first downstream fins is tilted toward the tilt position by an operation performed on the operation knob, the gearing mechanism holds, at the neutral position, an other one of the first downstream fins and one of the second downstream fins located at a diagonal position with respect to the other one of the first downstream fins and tilts, toward the tilt position, one of the second downstream fins located at a diagonal position with respect to the one of the first downstream fins.

11. The low-profile air-conditioning register according to claim 10, wherein
a fin accommodation chamber is disposed at each of two positions located outward from the outlet port of the retainer in the direction in which the two long side portions face each other, the fin accommodation chambers being located upstream of the outlet port, and when the first downstream fins and the second downstream fins are each located at the neutral position, at least part of each of the first downstream fins and the second downstream fins in a thickness direction is accommodated in a corresponding one of the fin accommodation chambers.

12. The low-profile air-conditioning register according to claim 10, wherein, in at least part of each of the first downstream fins and a corresponding one of the second downstream fins that is adjacent to the first downstream fin on the upstream side in a direction along the long side portions, a length of the second downstream fin in the flow direction is set to be longer than a length of the first downstream fin in the flow direction.

13. The low-profile air-conditioning register according to claim 10, wherein
a downstream end of each of the second downstream fins includes notches recessed toward the upstream side, the notches being respectively located at opposite sides of the second downstream fin in a direction along the long side portions,
an upstream end of each of the first downstream fins includes protrusions protruding toward the upstream side, the protrusions being respectively located on the opposite sides of the first downstream fin in the direction along the long side portions,
when the first downstream fins and the second downstream fins respectively adjacent to the first downstream fins on the upstream side are each located at the neutral position, the protrusions are respectively configured to be fitted into the notches,
the fin shaft of each of the first downstream fins is located at a corresponding one of the protrusions, and
a length of a portion of each of the second downstream fins sandwiched between the two notches in the flow direction is set to be longer than a length of a portion of a corresponding one of the first downstream fins sandwiched between the two protrusions.

14. The low-profile air-conditioning register according to claim 10, wherein
the first downstream fins each include an upstream portion, an intermediate portion, and a downstream portion from the upstream side toward the downstream side in the flow direction, and
the upstream portion and the downstream portion of each of the first downstream fins are bent or curved to become farther from the intermediate portion toward the inner side of the air passage as the upstream portion and the downstream portion become farther from the intermediate portion in the flow direction.

15. The low-profile air-conditioning register according to claim 14, wherein, when the first downstream fin is located at the neutral position, the upstream portion and the downstream portion are tilted at 15° or greater with respect to the inflow direction.

16. The low-profile air-conditioning register according to claim 10, wherein
at least one of the two second downstream fins includes an upstream portion, an intermediate portion, and a downstream portion from the upstream side toward the downstream side in the flow direction, and
the upstream portion and the downstream portion of the second downstream fin are bent or curved to become farther from the intermediate portion toward the inner side of the air passage as the upstream portion and the downstream portion become farther from the intermediate portion in the flow direction.

* * * * *